(12) United States Patent
Capela et al.

(10) Patent No.: US 8,539,386 B2
(45) Date of Patent: Sep. 17, 2013

(54) DEVICE, METHOD, AND GRAPHICAL USER INTERFACE FOR SELECTING AND MOVING OBJECTS

(75) Inventors: Jay Christopher Capela, Santa Cruz, CA (US); Charles J. Migos, San Bruno, CA (US); William John Thimbleby, Sunnyvale, CA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 424 days.

(21) Appl. No.: 12/790,524

(22) Filed: May 28, 2010

(65) Prior Publication Data

US 2011/0181529 A1 Jul. 28, 2011

Related U.S. Application Data

(60) Provisional application No. 61/298,521, filed on Jan. 26, 2010.

(51) Int. Cl.
*G06F 3/00* (2006.01)

(52) U.S. Cl.
USPC .......................................... 715/863; 345/173

(58) Field of Classification Search
USPC ........................................ 345/173; 715/863
See application file for complete search history.

(56) References Cited

U.S. PATENT DOCUMENTS

| | | | |
|---|---|---|---|
| 4,885,786 A | 12/1989 | Anderson et al. | |
| 5,283,561 A | 2/1994 | Lumelsky et al. | |
| 5,327,161 A | 7/1994 | Logan et al. | |
| 5,359,703 A | 10/1994 | Robertson et al. | |
| 5,371,845 A | 12/1994 | Newell et al. | |
| 5,483,261 A | 1/1996 | Yasutake | |
| 5,490,241 A | 2/1996 | Mallgren et al. | |
| 5,511,148 A | 4/1996 | Wellner | |

(Continued)

FOREIGN PATENT DOCUMENTS

| | | |
|---|---|---|
| EP | 1 577 746 A2 | 9/2005 |
| EP | 1 840 717 A1 | 10/2007 |

(Continued)

OTHER PUBLICATIONS http://inkscape.org/doc/basic/tutorial-basic.html Dec. 25, 2005, pp. 4-5.*

(Continued)

*Primary Examiner* — Kieu Vu
*Assistant Examiner* — Andrew Chung
(74) *Attorney, Agent, or Firm* — Morgan, Lewis & Bockius LLP

(57) ABSTRACT

A method performed at a computing device with a touch-sensitive display includes: displaying a plurality of user interface objects on the display, including a currently selected first user interface object; detecting a first contact on the first user interface object; detecting movement of the first contact across the display; moving the first user interface object in accordance with the movement of the first contact; while detecting movement of the first contact across the display: detecting a first finger gesture on a second user interface object; and, in response: selecting the second user interface object; moving the second user interface object in accordance with movement of the first contact subsequent to detecting the first finger gesture; and continuing to move the first user interface object in accordance with the movement of the first contact.

15 Claims, 35 Drawing Sheets

(56) References Cited

U.S. PATENT DOCUMENTS

| | | |
|---|---|---|
| 5,533,183 A | 7/1996 | Henderson, Jr. et al. |
| 5,581,670 A | 12/1996 | Bier et al. |
| 5,675,753 A | 10/1997 | Hansen et al. |
| 5,729,673 A | 3/1998 | Cooper et al. |
| 5,808,601 A | 9/1998 | Leah et al. |
| 5,825,352 A | 10/1998 | Bisset et al. |
| 5,872,559 A | 2/1999 | Shieh |
| 5,910,800 A | 6/1999 | Shields et al. |
| 6,025,844 A | 2/2000 | Parsons |
| 6,065,021 A | 5/2000 | George |
| 6,073,036 A | 6/2000 | Heikkinen et al. |
| 6,075,531 A | 6/2000 | DeStefano |
| 6,208,329 B1 | 3/2001 | Ballare |
| 6,215,490 B1 | 4/2001 | Kaply |
| 6,253,218 B1 | 6/2001 | Aoki et al. |
| 6,278,443 B1 | 8/2001 | Amro et al. |
| 6,323,846 B1 | 11/2001 | Westerman et al. |
| 6,346,935 B1 | 2/2002 | Nakajima et al. |
| 6,392,673 B1 | 5/2002 | Andrew et al. |
| 6,480,813 B1 | 11/2002 | Bloomquist et al. |
| 6,570,557 B1 | 5/2003 | Westerman et al. |
| 6,657,615 B2 | 12/2003 | Harada |
| 6,677,932 B1 | 1/2004 | Westerman |
| 6,690,365 B2 | 2/2004 | Hinckley et al. |
| 6,807,361 B1 | 10/2004 | Girgensohn et al. |
| 6,888,536 B2 | 5/2005 | Westerman et al. |
| 6,903,751 B2 * | 6/2005 | Saund et al. .................. 345/619 |
| 6,928,619 B2 | 8/2005 | Clow et al. |
| 7,030,861 B1 | 4/2006 | Westerman et al. |
| 7,093,192 B2 | 8/2006 | Mullen et al. |
| 7,110,005 B2 | 9/2006 | Arvin et al. |
| 7,134,093 B2 | 11/2006 | Etgen et al. |
| 7,158,158 B1 | 1/2007 | Fleming et al. |
| 7,190,379 B2 | 3/2007 | Nissen |
| 7,216,293 B2 | 5/2007 | Kataoka et al. |
| 7,218,226 B2 | 5/2007 | Wehrenberg |
| 7,287,241 B2 | 10/2007 | Balsiger |
| 7,456,823 B2 | 11/2008 | Poupyrev et al. |
| 7,469,381 B2 | 12/2008 | Ording |
| 7,469,833 B1 | 12/2008 | Kelley et al. |
| 7,477,233 B2 | 1/2009 | Duncan et al. |
| 7,489,324 B2 | 2/2009 | Royal et al. |
| 7,557,797 B2 | 7/2009 | Ludwig |
| 7,614,008 B2 | 11/2009 | Ording |
| 7,619,618 B2 | 11/2009 | Westerman et al. |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,694,231 B2 | 4/2010 | Kocienda et al. |
| 7,705,830 B2 | 4/2010 | Westerman et al. |
| 7,728,823 B2 | 6/2010 | Lyon et al. |
| 7,743,348 B2 | 6/2010 | Robbins et al. |
| 7,812,826 B2 | 10/2010 | Ording et al. |
| 7,856,605 B2 | 12/2010 | Ording et al. |
| 7,904,810 B2 | 3/2011 | Chen et al. |
| 7,934,156 B2 | 4/2011 | Forstall et al. |
| 7,936,341 B2 * | 5/2011 | Weiss ............................ 345/173 |
| 7,956,847 B2 | 6/2011 | Christie |
| 8,023,158 B2 | 9/2011 | Maki et al. |
| 8,024,667 B2 | 9/2011 | Shaw et al. |
| 8,095,884 B2 | 1/2012 | Karunakaran et al. |
| 8,161,400 B2 | 4/2012 | Kwon |
| 8,171,401 B2 | 5/2012 | Sun |
| 8,171,431 B2 | 5/2012 | Grossman et al. |
| 8,176,438 B2 | 5/2012 | Zaman et al. |
| 8,209,630 B2 | 6/2012 | Thimbleby et al. |
| 2002/0015024 A1 | 2/2002 | Westerman et al. |
| 2002/0057292 A1 | 5/2002 | Holtz |
| 2002/0062321 A1 | 5/2002 | Shibata |
| 2002/0109668 A1 | 8/2002 | Rosenberg et al. |
| 2002/0400708 | 8/2002 | Peurach et al. |
| 2002/0161772 A1 | 10/2002 | Bergelson et al. |
| 2003/0014382 A1 | 1/2003 | Iwamoto et al. |
| 2003/0128192 A1 | 7/2003 | van Os |
| 2003/0142137 A1 | 7/2003 | Brown et al. |
| 2003/0210268 A1 | 11/2003 | Kataoka et al. |
| 2004/0066407 A1 | 4/2004 | Regan et al. |
| 2004/0088656 A1 | 5/2004 | Washio |
| 2004/0141009 A1 | 7/2004 | Hinckley et al. |
| 2004/0150668 A1 | 8/2004 | Myers et al. |
| 2004/0174399 A1 | 9/2004 | Wu et al. |
| 2004/0225968 A1 | 11/2004 | Look et al. |
| 2004/0239691 A1 | 12/2004 | Sprang et al. |
| 2005/0052427 A1 | 3/2005 | Wu et al. |
| 2005/0068290 A1 | 3/2005 | Jaeger |
| 2005/0071774 A1 | 3/2005 | Lipsky et al. |
| 2005/0088423 A1 | 4/2005 | Keely et al. |
| 2005/0091008 A1 | 4/2005 | Green et al. |
| 2005/0108620 A1 | 5/2005 | Allyn |
| 2005/0108656 A1 | 5/2005 | Wu et al. |
| 2005/0231512 A1 | 10/2005 | Niles et al. |
| 2005/0289476 A1 | 12/2005 | Tokkonen |
| 2006/0001650 A1 | 1/2006 | Robbins et al. |
| 2006/0022955 A1 | 2/2006 | Kennedy |
| 2006/0026521 A1 | 2/2006 | Hotelling et al. |
| 2006/0033724 A1 | 2/2006 | Chaudhri et al. |
| 2006/0055662 A1 | 3/2006 | Rimas-Ribikauskas et al. |
| 2006/0055684 A1 | 3/2006 | Rimas-Ribikauskas et al. |
| 2006/0085757 A1 | 4/2006 | Andre et al. |
| 2006/0085767 A1 | 4/2006 | Hinckley et al. |
| 2006/0112335 A1 | 5/2006 | Hofmeister et al. |
| 2006/0125803 A1 | 6/2006 | Westerman et al. |
| 2006/0129945 A1 | 6/2006 | Dettinger et al. |
| 2006/0136246 A1 | 6/2006 | Tu |
| 2006/0136833 A1 * | 6/2006 | Dettinger et al. ............. 715/769 |
| 2006/0161870 A1 | 7/2006 | Hotelling et al. |
| 2006/0174568 A1 | 8/2006 | Kinoshita et al. |
| 2006/0184966 A1 | 8/2006 | Hunleth et al. |
| 2006/0190833 A1 | 8/2006 | SanGiovanni et al. |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238521 A1 | 10/2006 | Westerman et al. |
| 2006/0248469 A1 | 11/2006 | Czerwinski et al. |
| 2006/0279532 A1 | 12/2006 | Olszewski et al. |
| 2007/0050726 A1 | 3/2007 | Wakai et al. |
| 2007/0067711 A1 | 3/2007 | Woodall et al. |
| 2007/0079236 A1 | 4/2007 | Schrier et al. |
| 2007/0113198 A1 | 5/2007 | Robertson et al. |
| 2007/0126732 A1 | 6/2007 | Robertson et al. |
| 2007/0152980 A1 | 7/2007 | Kocienda et al. |
| 2007/0152984 A1 | 7/2007 | Ording et al. |
| 2007/0160345 A1 | 7/2007 | Sakai et al. |
| 2007/0177803 A1 | 8/2007 | Elias et al. |
| 2007/0186178 A1 | 8/2007 | Schiller |
| 2007/0192749 A1 | 8/2007 | Baudisch |
| 2007/0198942 A1 | 8/2007 | Morris |
| 2007/0220444 A1 | 9/2007 | Sunday et al. |
| 2007/0229471 A1 | 10/2007 | Kim et al. |
| 2007/0236475 A1 | 10/2007 | Wherry |
| 2007/0245257 A1 | 10/2007 | Chan et al. |
| 2007/0247435 A1 | 10/2007 | Benko et al. |
| 2007/0253025 A1 | 11/2007 | Terayoko |
| 2007/0257890 A1 | 11/2007 | Hotelling |
| 2008/0022197 A1 | 1/2008 | Bargeron et al. |
| 2008/0034317 A1 | 2/2008 | Fard et al. |
| 2008/0036743 A1 | 2/2008 | Westerman et al. |
| 2008/0042978 A1 | 2/2008 | Perez-Noguera |
| 2008/0052945 A1 | 3/2008 | Matas et al. |
| 2008/0066016 A1 | 3/2008 | Dowdy et al. |
| 2008/0072173 A1 | 3/2008 | Brunner et al. |
| 2008/0094368 A1 | 4/2008 | Ording et al. |
| 2008/0100642 A1 | 5/2008 | Betancourt et al. |
| 2008/0109751 A1 | 5/2008 | Fitzmaurice et al. |
| 2008/0140868 A1 | 6/2008 | Kalayjian et al. |
| 2008/0147664 A1 | 6/2008 | Fujiwara et al. |
| 2008/0148181 A1 | 6/2008 | Reyes et al. |
| 2008/0150715 A1 | 6/2008 | Tang et al. |
| 2008/0165141 A1 | 7/2008 | Christie |
| 2008/0165142 A1 | 7/2008 | Kocienda et al. |
| 2008/0167834 A1 | 7/2008 | Herz et al. |
| 2008/0180404 A1 | 7/2008 | Han et al. |

| | | |
|---|---|---|
| 2008/0180405 A1 | 7/2008 | Han et al. |
| 2008/0180406 A1 | 7/2008 | Han et al. |
| 2008/0186285 A1 | 8/2008 | Shimizu |
| 2008/0211766 A1 | 9/2008 | Westerman et al. |
| 2008/0244410 A1 | 10/2008 | Schormann |
| 2008/0259040 A1 | 10/2008 | Ording et al. |
| 2008/0267468 A1 | 10/2008 | Geiger et al. |
| 2008/0270886 A1 | 10/2008 | Gossweiler et al. |
| 2008/0278455 A1 | 11/2008 | Atkins et al. |
| 2008/0297482 A1 | 12/2008 | Weiss |
| 2008/0320391 A1 | 12/2008 | Lemay et al. |
| 2009/0013350 A1 | 1/2009 | Ohlfs et al. |
| 2009/0051660 A1 | 2/2009 | Feland, III et al. |
| 2009/0051946 A1 | 2/2009 | Hibi |
| 2009/0079700 A1 | 3/2009 | Abernathy |
| 2009/0113330 A1 | 4/2009 | Garrison et al. |
| 2009/0122018 A1 | 5/2009 | Vymenets et al. |
| 2009/0150775 A1 | 6/2009 | Miyazaki et al. |
| 2009/0158326 A1 | 6/2009 | Hunt et al. |
| 2009/0164936 A1 | 6/2009 | Kawaguchi |
| 2009/0172606 A1 | 7/2009 | Dunn et al. |
| 2009/0174679 A1 | 7/2009 | Westerman |
| 2009/0183930 A1 | 7/2009 | Yang et al. |
| 2009/0184939 A1 | 7/2009 | Wohlstadter et al. |
| 2009/0228792 A1 | 9/2009 | van Os et al. |
| 2009/0231275 A1 | 9/2009 | Odgers |
| 2009/0237363 A1* | 9/2009 | Levy et al. ............. 345/173 |
| 2009/0239587 A1 | 9/2009 | Negron et al. |
| 2009/0256809 A1 | 10/2009 | Minor |
| 2009/0256857 A1 | 10/2009 | Davidson et al. |
| 2009/0259964 A1 | 10/2009 | Davidson et al. |
| 2009/0282332 A1 | 11/2009 | Porat |
| 2009/0303231 A1 | 12/2009 | Robinet et al. |
| 2009/0307589 A1 | 12/2009 | Inose et al. |
| 2009/0327975 A1* | 12/2009 | Stedman ............. 715/863 |
| 2010/0002002 A1 | 1/2010 | Lipsky et al. |
| 2010/0007623 A1 | 1/2010 | Kaneko et al. |
| 2010/0017734 A1 | 1/2010 | Cummins et al. |
| 2010/0031203 A1* | 2/2010 | Morris et al. ............. 715/863 |
| 2010/0053111 A1 | 3/2010 | Karlsson |
| 2010/0058238 A1 | 3/2010 | Ben Moshe |
| 2010/0088624 A1 | 4/2010 | Bligh et al. |
| 2010/0088641 A1 | 4/2010 | Choi |
| 2010/0095205 A1 | 4/2010 | Kinoshita |
| 2010/0095206 A1 | 4/2010 | Kim |
| 2010/0107101 A1 | 4/2010 | Shaw et al. |
| 2010/0134425 A1 | 6/2010 | Storrusten |
| 2010/0156813 A1 | 6/2010 | Duarte et al. |
| 2010/0162105 A1 | 6/2010 | Beebe et al. |
| 2010/0185949 A1 | 7/2010 | Jaeger |
| 2010/0214571 A1 | 8/2010 | Luo |
| 2010/0228746 A1 | 9/2010 | Harada |
| 2010/0231533 A1 | 9/2010 | Chaudhri |
| 2010/0235794 A1 | 9/2010 | Ording |
| 2010/0283743 A1 | 11/2010 | Coddington |
| 2010/0283750 A1 | 11/2010 | Kang et al. |
| 2010/0313125 A1 | 12/2010 | Fleizach et al. |
| 2010/0313126 A1 | 12/2010 | Jung et al. |
| 2010/0318904 A1 | 12/2010 | Hillis et al. |
| 2010/0325529 A1 | 12/2010 | Sun |
| 2010/0333044 A1 | 12/2010 | Kethireddy |
| 2011/0010672 A1 | 1/2011 | Hope |
| 2011/0012848 A1 | 1/2011 | Li et al. |
| 2011/0012856 A1 | 1/2011 | Maxwell et al. |
| 2011/0029927 A1 | 2/2011 | Lietzke et al. |
| 2011/0029934 A1 | 2/2011 | Locker et al. |
| 2011/0069017 A1 | 3/2011 | Victor |
| 2011/0069018 A1 | 3/2011 | Atkins et al. |
| 2011/0074710 A1 | 3/2011 | Weeldreyer et al. |
| 2011/0093812 A1 | 4/2011 | Fong |
| 2011/0145759 A1 | 6/2011 | Leffert et al. |
| 2011/0163944 A1 | 7/2011 | Bilbrey et al. |
| 2011/0163968 A1 | 7/2011 | Hogan |
| 2011/0179368 A1 | 7/2011 | King et al. |
| 2011/0179373 A1 | 7/2011 | Moore et al. |
| 2011/0185316 A1 | 7/2011 | Reid et al. |
| 2011/0185321 A1 | 7/2011 | Capela et al. |
| 2011/0231796 A1 | 9/2011 | Vigil |
| 2011/0252370 A1 | 10/2011 | Chaudhri |
| 2011/0252380 A1 | 10/2011 | Chaudhri |
| 2011/0252381 A1 | 10/2011 | Chaudhri |
| 2011/0258537 A1 | 10/2011 | Rives et al. |
| 2011/0302519 A1 | 12/2011 | Fleizach et al. |
| 2012/0023453 A1 | 1/2012 | Wagner |
| 2012/0023459 A1 | 1/2012 | Westerman |
| 2012/0030569 A1 | 2/2012 | Migos et al. |
| 2012/0044150 A1 | 2/2012 | Karpin et al. |

FOREIGN PATENT DOCUMENTS

| | | |
|---|---|---|
| EP | 2 060 970 A1 | 5/2009 |
| EP | 2 068 237 A2 | 6/2009 |
| EP | 2 284 675 A2 | 2/2011 |
| WO | WO 00/16186 A2 | 3/2000 |
| WO | WO 2006/020305 A2 | 2/2006 |
| WO | WO 2007/098243 A2 | 8/2007 |
| WO | WO 2008/138046 A1 | 11/2008 |

OTHER PUBLICATIONS

International Search Report and Written Opinion dated May 24, 2011, in International Application No. PCT/US2011/022532, which corresponds to U.S. Appl. No. 12/790,524.

Angell, "Is Bimanual the Future Paradigm for Human Computer interaction?" University of Plymouth, 2006; 36 pages.

Apple.com: "Page Keyboard Shortcuts," Apple.com, downloaded Jan. 18; 2010, http://www.apple.com/support/pages/shortcuts/, 6 pages.

Apted et al., "Tabletop Sharing of Digital Photographs for the Elderly, " CHI 2006 Proceedings, Apr. 2006; Montreal Quebec, Canada, 10 pages.

Baudisch, P., "The Cage: Efficient Construction in 3D using a Cubic Adaptive Grid," Proceedings of the 9th Asnntial ACM Symposium on User Interface Software and Technology, Nov. 6, 1996, 2 pages.

Beaudouin-Lafon et al., "CPN/Tools: A Post-WIMP Interface for Editing and Simulating Coloured Petri Nets, " Proceeding of 22nd International Conference on Applications and Theory of Petri Nets 2001, 10 pages.

Bederson, B, "PhotoMesa: A Zoomable Image Browser Using Quantum Treemaps and Bubblemaps," UIST 2001, Orlando, Florida, Nov. 2001, 10 pages.

Benko et al., "Precise Selection Techniques for Multi-Touch Screens," CHI 2006, Apr. 22-27 2006, 10 pages.

Brandl , et al., "Combining and Measuring the Benefits of Bimanual Pen and Direct-Touch Interaction on Horizontal Interfaces," AVI '08, May 2008; Naples, Italy, 8 pages.

Brandl, P. "Combining and Measuring the Benefits of Bimanuai Pen and Direct-Touch Interaction on Horizontal Interfaces," Media Interaction Lab, May 2008, slide presentation, 26 pages.

Butz et at, "Hybrid Widgets on an Interactive Tabletop, " Ubicomp '07, Sep. 2007, Innsbruck, Austria, 7 pages.

Buxton, W. et al., "A Study in Two-Handed Input," Proceedings of CHI '86, Apr. 1986, Boston, MA, 10 pages.

Buxton, W. et al., "Issues and Techniques in Touch-Sensitive Tablet Input," Computer Graphics 19(3), http://www.dgp.toronto.edu/OTP/papers/bill.buxton/touch.html, Proceedings of SIGGRAPH'85; 15 pages.

Buxton, W. et al., "Multi-Touch Systems that I Have Known and Loved," Jan. 12, 2007; 14 pages, http://www.billbuxton.com/multitouchOverview.html.

Buxton, 'W., "Chapter 5: Case Study 1: Touch Tablets," Haptic Input, Jan. 4, 2009, 20 pages.

Buxton, W., "Chapter 11: Two-Handed Input in Human-Computer interaction," Aug. 22, 2008, 16 pages.

Chen et al., "Relative role of merging and two-handed operation on command selection speed," Int. J. Human-Computer Studies 66 (2006) 729-740 (12); June 2008.

Cho et al., "interaction for Tabletop Computing Environment: An Analysis and Implementation, " Science and Technology (2005), ACM, pp. 11-18.

Couturier et al., "Pointing Fingers: Using Multiple Direct Interactions with Visual Objects to Perform Music, " Proceedings of the 2003 Conference on New Interfaces for Musical Expression, May 2003, Montreal, Canada, 4 pages.

Cutedraw, "Moving, Rotating, Resizing and Flipping Shapes," Cutedraw.com, 2007, http://www.cutedraw.com/Moving,%20Rotating,%20Resizing%20Flipping%20Shapes.php, 5 pages.

Derene, G., "Microsoft Surface: Behind-the-Scenes First Look," Popuies Mechanics.com, Jul. 1, 2007, http://www.popularmechanics.com/technology/gadgets/news/4217348?page=3, 4 pages.

Faas, R., "Spaces: A look at Apple's take on virtuai desktops in Leopard," Computerworld, Nov. 21, 2006, http://www.computerworld.com/s/article/print/9005267/Spaces_A_loo . . . tual_desktops_in_Leoparad?taxonornyName . . . 3 pages.

FingerWorks, "Installation and Operation Guide for the TouchSteam," Copyright® 2002, 14 pages, www.fingerworks.com.

FingersWorks, "Quick Reference Guide for iGesture Products, " Copyright® 1999-2002, 4 pages, www.fingerworks.com.

FingerWorks, "Quick Reference Guide for TouchStream ST/LP, " Copyright® 2001-2003, 4 pages, www.fingerworks.com.

FingerWorks, "Installation and Operation Guide for Igesture Products w/Keys, " Copyright® 2002, 10 pages, www.fingerworks.com.

FingerWorks, "TouchStream LP Silver, " Apr. 27, 2005, 18 pages, http://www.fingerworks.com FingerWorks Forums, "Finger works Support Forums—Product Comments—TouchStream KeyBoards—Is the Multitouch Lemur, " Dec. 24, 2004, http://64233.167.104/search?q=cache:sjVdtyFBvRMJ.forums.finger, 2 pages.

Google docs "Drawings; Moving, resizing and rotating objects," Google.com: downloaded Jan. 18, 2010, http://docs.google.com/support/bin/answer.py?hl=en&answer=141914, 1 pages Guimbretiere et. ai., "Benefits of Merging Command Selection and Direct Manipulation," ACM Transaction on Computer-Human Interaction, vol. 12, No. 3, Sep. 2005, 17 pages.

Guimbretière, F., "Curriculu, Vitae, " 2008, 5 pages.

Hinckley, K., "Haptic Issues for Virtual Manipulation," University of Virginia, Dissertation presented Dec. 1996, http://research.microsoft.com/en-us/um/people/kenh/all-published-papers/hinckley-thesis-haptic-issues-for-virtual-manipulation.pdf, 216 pages.

Hinckley et al., "Interaction and Modeling Techniques for Desktop Two-Handed Input," UIST '98, San Francisco, CA, Nov. 1998, 10 pages.

Hodges et al., "ThinSight: Versatile Multi-touch Sensing for Thin Form-factor Dispalys, " UIST '07, Oct. 7-10, 2007, Newport, Rhode Island, USA, 10 pages.

Hudson, S., "Adaptive Semantic Snapping-A technique for Semantic Feedback at the Lexical Level, " Proceedings of the ACM CHI 90 Human Factors in Computing Systems Conference Apr. 1990, Seattle, VVashington, 6 pages.

IBM, "Resizing shapes by dragging sizing handles," IBM WebSphere Help System, 1999, http://publibb.boulder.ibm.com/infocenter/wsadhelp/v5r1m2/index.jsp?topic=/com.rational.xtools.umivisualizer.doc/topics/tresizedrag.html, 1 pages.

Jin et al., "GIA: design of a gesture-based interaction photo album," Pers Ubiquit Cornput, Jul. 1, 2004, 7 pages.

Kane et al., "Slide Rule: Making Mobile Touch Screens Accessible to Blind People Using Multi-Touch Interaction Techniques," Proceedings of ACM SIGACCESS Conference on Computers and Accessibility, Halifax, Nova Scotia, Canada, Oct. 2008, 8 pages.

Karsenty et al., "Inferring Graphical Constraints with Rockit, " Digital-Paris Research Laboratory, Mar. 1992, www.hpl.hp.com/techreports/Compaq-DEC/PRL-RR-17.pdf. 30 pages.

Kristensson et al., "InfoTouch: An Explorative Multi-Touch Visualization Interface for Tagged Photo Collections, " Proceedings NordiCHI 2008, Oct. 20-22, 2008, 4 pages.

KLurata et al., "Tangible Tabletop Interface for an Expert to Collaborate with Remote Field Works, "ColiabTech 2005, Jul. 16, 2005, slides, 27 pages.

Kurata et al., "Tangible Tabletop Interface for an Expert to Collaborate with Remote Field Workers, " CollabTech 2005, Jul. 16, 2005, 6 pages.

Kurtenback et. al., The Design of a GUI Paradigm based Tablets, Two hands, and Transparency, Mar. 27. 1997, 8 pages.

Lee et al., "A Multi-Touch Three Dimensional Touch-Sensitive Tablet, " CHI 85 Proceedings, Apr. 1985, pp. 21-25.

Malik, S. et al., "Visual Touchpad: A Two-handed Gesture Input Device, " ICMI'04, Oct. 13-15, 2004, 8 pages.

rnarkandtanya, "Imagining multi-touch in outlook.," May 2008, 3 pages.

Markusson, D., "Interface Development of a Multi-Touch Photo Browser, " Umeå University, Master's Thesis presented Apr. 18, 2008, 76 pages.

Matsushita et al., "Dual Touch: A Two-Handed Interface for Pen-Based PDSs, " UIST '00, Nov. 2000, San Diego, CA, 2 pages.

Matsushita et al., "HoloWall: Designing a Finger, Hand, Body, and Object Sensitive Wall, " UIST '97 Banff, Alberta, Canada, Oct. 1997, 2 pages.

Media Interaction Lab. "Bimanual Pen & Touch, " Nov. 2008, http://mi-lab.org/projects/bimanual-pen-touch, 5 pages.

Microsoft.com, "Quickly copy formatting with the Format Painter, " Microsoft.com, 2003, http://office.microsoft.com/enus/help/HA012176101033.aspx, 1 page.

Microsoft.com, "Resize and object, "Microsoft Office Online, 2010, http://office.microsoft.com/en-us/publisher/HP051139751033.aspx, 2 pages.

Moscovich et al., "Indirect Mappings of Multi-touch input Using One and Two Hands, " CHI 2008, Apr. 2008, Florence, Italy, 9 pages.

Moscovich et al., "Multi-finger Cursor Techniques, " GI '06 Proceedings of Graphics Interface 2006, Jun. 2006, Quebec City, Quebec, Canada, 7 pages.

Moscovich, T., "Multi-touch Interaction, " CHI 2006, Montréal, Canada, Apr. 2006, 4 pages.

Moscovich, T., "Principles and Applications of Multi-touch Interaction, " Brown University, Dissertation presented May 2007, 114 pages.

Mueller et al., "Visio 2007 for Dummies, " John Wiley & Sons, Dec. 2006, pp. 178-181.

Murphy, P., "Review: SBSH Calendar Touch, " justanothermobilemonday.com, Dec. 8. 2008, http://justanothermobilemonday.com/Wordpress/2008/12/08/review-sbsh-calendar-touch/, 7 pages.

Raskin, A., "Enso 2.0 Design Thoughts, "Aza's Thoughts, Dec. 6, 2008, http://www.azarask.in/blog/post/ensop-20-design-thoughts/, 16 pages.

Raskin, A., "Visual Feedback: Why Modes Kill, " Humanized, Dec. 2006, 18 pages.

Sahlin et al., "Flash® CS4 All-in-One For Dummies®, "Dec. 3, 2008, John Wiley & Sons, 4 pages.

Shen, C., "Interactive tabletops: User Interface, Metaphors and Gestures, " SIGGRAPH2007. Aug. 2007, 14 pages.

Shen et al., "Informing the Design of Direct-Touch Tabletops, " IEEE Sep./Oct. 2006, pp. 36-46.

Tse et al., "Enabling Interaction with Single User Applications through Speech and Gestures on a Multi-User Tabletop, " Mitsubishi Electric Research Laboratories, Dec. 2005, 9 pages.

Ullmer et al., "The metaDESK: Models and Prototypes for Tangible User Interfaces, " UIST '97, Oct. 1997, Baniff, Alberta Canada, 10 pages.

Westerman, W., "Hand Tracking Finger Indentification and Chordic Manipulation on a Multi-touch Surface, " Doctoral Dissertation, submitted Spring 1999, 363 pages.

Wikipedia, "Spaces (software), " Wikipedia, the free encyclopedia, Jul. 15, 2009, http://en.wikipedia.org/wiki/Spaces_(software), 3 pages.

Wikipedia, "Virtual desktop, " Wikipedia, the free encyclopedia, Jul. 20, 2009, http://en.wikipedia.org/wiki/Virtual_desktop. 3 pages.

Wilson, A. "Robust Computer Vision-Basede Detection of Pinching for One and Two-Handed Gesture Input, " UIST '06, Oct. 2006, Montreux, Switzerland, 4 pages.

Wu, et al., "Multi-Finger and Whole Hand Gestural Interaction Techniques for Multi-User Tabletop Display, " UIST '03, Nov. 5-7, 2003, Vancouver, BC, Canada, ® ACM 2003, 10 pages.

Yee, K., "Two-Handed Interaction on a Tablet Display, " SIGCHI 2004, Apr. 2004, Vienna, Austria, 4 pages.

YouTube, "A Multi-Touch Three Dimensional Touch-Sensitive Tablet, " 3 minute video uploaded to YouTube by wasbuxton on Nov. 18, 2009, http://www.youtube.com/watch?v=Arrus9CxUiA, 3 pages.

YouTube, "3d desktop," 6:50 minute video to YouTube by frankcde on Sep. 18, 2006, http://www.youtube.com/watch?v=j_lxBwvf3Vk&feature=related, 2 pages.
YouTube, "Auto Design on Jeff Han's Perceptive Pixel Multi-Touch," 2:11 minute video uploaded to YouTube by AutodeskLabs on Jul. 27, 2007, http://www.youtube.com/watch?v=O7ENumwMohs&feature=related, 2 pages.
YouTube, "Cubit—Open Source Multi-touch Display," 5:04 minute video uploaded to YouTube by Krisharava on May 2, 2008, http://www.youtube.com/watch?v=RJTVULGnZQ0, 3 pages.
YouTube, "Gesture Registration, Relaxation, and Reuse for Multi-Point, "4:22 minute video uploaded to YouTube by tabletopresearch201 on May 19, 2008, http://www.youtube.com/watch?v=dT4dXuah2yM, 2 pages.
YouTube, "HP Touch Smart tx2—Multi-Touch Part 2," 0:15 minute video uploaded to YouTube by unwirelife on Dec. 19, 2008, http://www.youtube.com/watch?v=Yon3vRwc94A, 3 pages.
YouTube, "I3 MultiTouch interactive Table," 2:15 minute video uploaded by I3pgroup on Nov. 16, 2007, http://www.youtube.com/watch?v=M2oijV-bRrw&feature=related, 2 pages.
YouTube, "IndetityMine's multitude of Multi-Touch apps, " 3:27 minute video uploaded to YouTube by ContinuumShow on Nov. 6, 2008, http://www.youtube.com/watch?v=HcpdNb9LHns, 3 pages.
YouTube, "Jeff Han's 8 ft. Multi-Touch Display Wall, " 4:39 minute video uploaded to YouTube by alai6666 on May 16, 2007, http://www.youtube.com/watch?v=JfFwgPuEdSK&feature=related, 2 pages.
YouTube, "LG. Philips 52-inch multi-touch display, " 1:36 minute video uploaded to YouTube by engadget on Jan. 8, 2008, http://www.youtube.com/watch?v=9qO-diujq4&feature=related, 2 pages.
YouTube, "Lucid Touch: a See-Through Multi-Touch Mobile Device, " 3:29 minute video upload by dwigdor Aug. 21, 2007, http://www.youtube.com/watch?v=qbMQ7urAvuc, 2 pages.
YouTube, "Microsoft Surface Demo, " 2:10 minute video uploaded to YouTube by zac96 on Aug. 17, 2007, http://www.youtube.com/watch?v=rKgU6ubBgJA&feature=related, 2 pages.
YouTube, "Microsoft Surface Demo @ CES 2008, " 9:58 minute video uploaded to YouTube by GerbiBod7 on Jan. 8, 2008, http://www.youtube.com/watch?v=Zxk_WywMTzc&feature=related, 2 pages.
YouTube, "Minority Report Interface Prototype," 1:52 minute video uploaded to YouTube by alevalli on Jul. 12, 2006, http://www.youtube.com/watch?v=3bn-zZX9kdc, 3 pages.
YouTube, "Multi-Touch Interaction: Browser Control," 1:12 minute video uploaded to YouTube by HCiKonstanz on Sep. 12, 2008, http://www.youtube.com/watch?v=jTOK5Zbfm4U, 2 pages.
YouTube, "Mutli-touch interface (from Adobe TED), " 9:33 minute video uploaded to YouTube by f0xmuld3r on Aug. 3, 2006, http://www.youtube.com/watch?v=UcKqyn-gUbY, 2 pages.
YouTube, "Mult Touch (new touchscreen technology), " 3:31 minute video uploaded to YouTube by chanfrado on Mar. 17, 2006, http://www.youtube.com/watch?v=1ftJhDBZqss&feature=related, 2 pages.
YouTube, "Multi-touch Time and Geo Tagging Photosharing with IntuiFace, " 2:21 minute video uploaded to YouTube by IntuiLab on Jan. 31, 2008, http://www.youtube.com/watch?v=ftsx21liFvo, 3 pages.
YouTube, "PhotoApp (Multi-Touch), " 1:45 video uploaded to YouTube by NePsihus on Dec. 30, 2007 http://www.youtube.com/watch?v=RJTVULGnZQ0, 3 pages.
YouTube, "Photoshop MT-Desktop Digital Imaging on FTIR multitouc, " 5:38 minute video uploaded to YouTube by thomasglaeser on Feb. 7, 2007, http://www.youtube.com/watch?v=JmHNr9EH1IU&feature=related, 2 pages.
YouTube, "Photo Touch: Multi-touch Photo Organization for your Mac, " 8:03 minute video uploaded to YouTube by cocoadex on Mar. 30, 2008, http://www.youtube.com/watch?v=D7x7jV3P1-0, 3 pages.
YouTube, "Smart Surface Beta, " 1:56 minute video uploaded to YouTube by vanderlin on Mar. 29, 2008, http://www.youtube.com/watch?v=68wFqxdXENw&feature=related, 3 pages.

YouTube, "TDesk Multiuser, " 1:11 minute video uploaded to YouTube by bestsheep1 on Sep. 6, 2007, http://www.youtube.com/watch?v=PjsO-lbll34&feature=related, 2 pages.
YouTube, "Will Multi-touch Photo Gallery, " 1:25 minute video uploaded to YouTube by darthstoo on Apr. 10, 2008, http://www.youtube.com/watch?v=0CYVxQ2OM9s, 3 pages.
Invitation to Pay Additional Fees dated Apr. 29, 2010, received in International Application No. PCT/US2009/057899, which corresponds to U.S. Appl. No. 12/567,405, 8 pages, (Victor).
International Search Report and Written Opinion dated Jun. 14, 2010, received in International Application No PCT/US2009/057899, which corresponds to U.S. Appl. No. 12/567,405, 23 pages, (Victor).
International Search Report and Written Opinion dated Jul. 1, 2011, received in International Application No. PCT/US2011/022519, which corresponds to U.S. Appl. No. 12/790,504, 11 pages, (Capela).
International Search Report and Written Opinion dated Apr. 27, 2011, received in International Application No. PCT/US2011/022525, which corresponds to U.S. Appl. No. 12/790,508.
International Search Report and Written Opinion dated Dec. 13, 2011, received in International Patent Application No. PCT/US2011/045552, which corresponds to U.S. Appl. No. 12/848,067, 12 pages, (Migos).
International Preliminary Report on Patentability dated Feb. 14, 2013, received in International Application No. PCT/US2011/045552, which corresponds to U.S. Appl. No. 12/846,067, 8 pages, (Migos).
Office Action dated May 17, 2012, received in U.S. Appl. No. 12/567,405, 21 pages, (Victor).
Final Office Action dated Dec. 17, 2012, received in U.S. Appl. No. 12/567,405, 19 pages, (Victor).
Office Action dated Jul. 6, 2012, received in U.S. Appl. No. 12/567,171, 13 pages, (Missig).
Final Office Action dated Jan. 3, 2013, received in U.S. Appl. No. 12/567,171, 20 pages, (Missig).
Office Action dated Aug. 30, 2012, received in U.S. Appl. No. 12/567,206, 13 pages, (Missig).
Office Action dated Jun. 7, 2012, received in U.S. Appl. No. 12/768,623, 12 pages, (Weeldreyer).
Final Office Action dated Jan. 22, 2013, received in U.S. Appl. No. 12/768,623, 37 pages, (Weeldreyer).
Office Action dated Aug. 4, 2011, received in U.S. Appl. No. 12/567,460, 14 pages, (Victor).
Notice of Allowance dated Jan. 18, 2012, received in U.S. Appl. No. 12/567,460, 8 pages, (Victor).
Notice of Allowance dated Aug. 10, 2012, received in U.S. Appl. No. 12/567,460, 14 pages, (Victor).
Notice of Allowance Dec. 24, 2012, received in U.S. Appl. No. 12/567,460, 17 pages, (Victor).
Office Action dated Sep. 16. 2011, received in U.S. Appl. No. 12/567,553, 12 pages, (Victor).
Final Office Action dated Mar. 12, 2012, received in U.S. Appl. No. 12/567,553, 15 pages, (Victor).
Notice of Allowance dated Jun. 12, 2012, received in U.S. Appl. No. 12/567,553, 8 pages, (Victor).
Notice of Allowance dated Aug. 10, 2012, received in U.S. Appl. No. 12/567,553, 13 pages, (Victor).
Notice of Allowance dated Dec. 24 2012, received in U.S. Appl. No. 12/567,553, 12 pages, (Victor).
Notice of Allowance dated Dec. 19 2012, received in U.S. Appl. No. 12/567,570, 10 pages, (Victor).
Office Action dated Oct. 3, 2012, received in U.S. Appl. No. 12/790,504, 23 panes, (Capela).
Office Action dated Nov. 7, 2012, received in U.S. Appl. No. 12/790,508, 38 pages, (Capela).
Office: Action dated Feb. 2, 2012, received in U.S. Appl. No. 12/790,516, 11 pages (Capela).
Office Aciton dated Aug. 27, 2012, received in U.S. Appl. No. 12/790,516, 10 pages (Capela).
Office Action dated Aug. 9, 2012, received in U.S. Appl. No. 12/848,063 14 pages, (Migos).
Office Action dated Jun. 6, 2012, received in U.S. Appl. No. 12/848,067, 17 pages (Migos).

Final Office Action dated Jan. 10, 2013, received in U.S. Appl. No. 12/848,067, 43, (Migos).
Office Action dated Jun. 29, 2012, received in U.S. Appl. No, 12/848,074, 12 pages, (Migos).

* cited by examiner

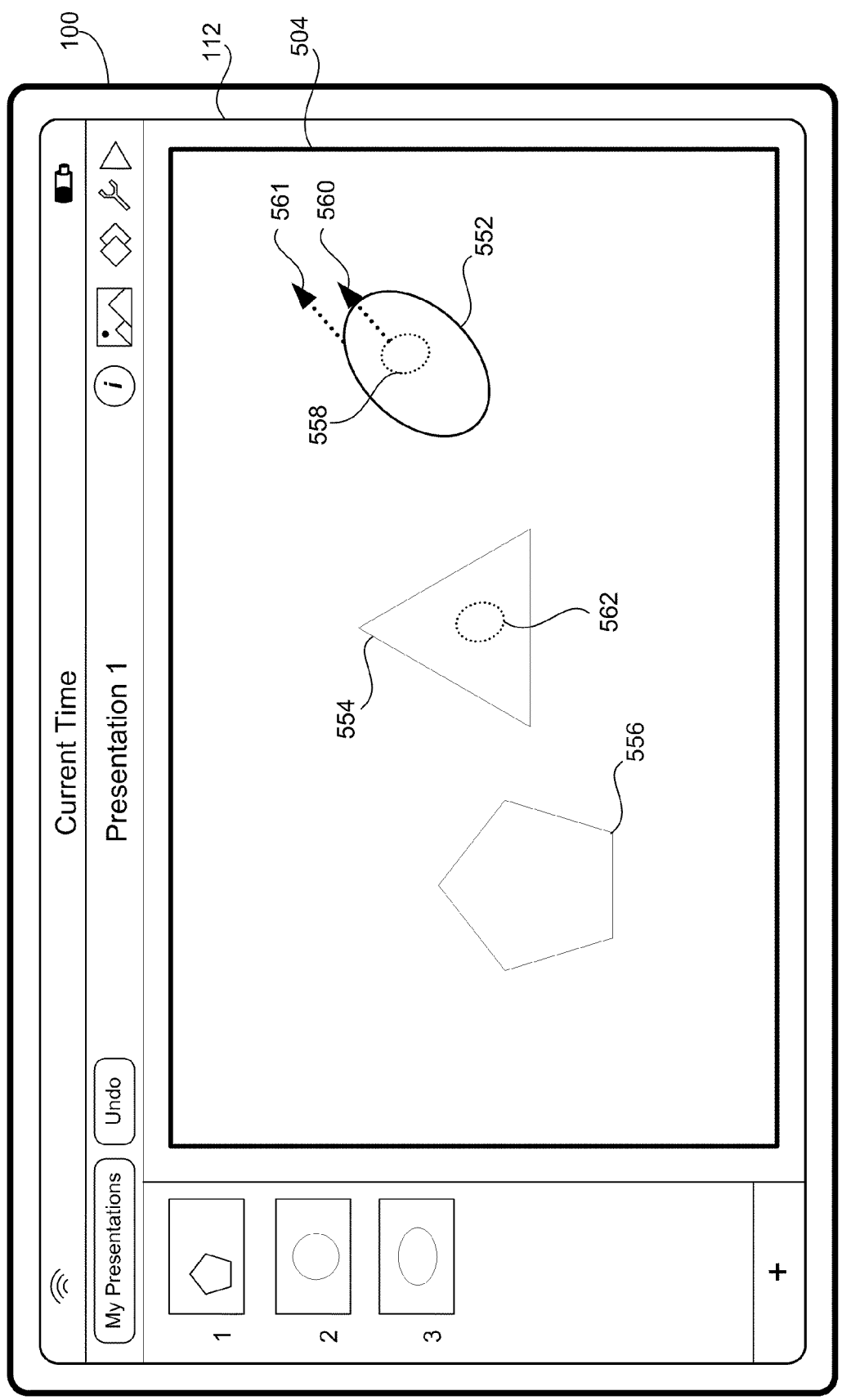

DEVICE, METHOD, AND GRAPHICAL USER INTERFACE FOR SELECTING AND MOVING OBJECTS

RELATED APPLICATIONS

This application claims priority to U.S. Provisional Application Ser. No. 61/298,521, filed Jan. 26, 2010, entitled "Device, Method, and Graphical User Interface for Selecting and Moving Objects," which is incorporated herein by reference in its entirety.

TECHNICAL FIELD

The disclosed embodiments relate generally to electronic devices with touch-sensitive surfaces, including but not limited to electronic devices with touch-sensitive surfaces configured to select and move user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects. Exemplary user interface objects include digital images, video, text, icons, and other graphics. A user may need to perform such manipulations on user interface objects in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for selecting and moving objects are cumbersome and inefficient. For example, existing mouse and keyboard-based methods require memorizing particular keys sequences for selecting and moving objects, which is tedious and creates a significant cognitive burden on a user. In addition, existing mouse and keyboard-based methods take longer than necessary, thereby wasting energy. This latter consideration is particularly important in battery-operated devices.

SUMMARY

Accordingly, there is a need for computing devices with faster, more efficient methods and interfaces for selecting and moving objects that do not require the use of a keyboard or mouse. Such methods and interfaces may complement or replace conventional methods for selecting and dragging objects. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a computing device with a touch-sensitive display. The method includes: displaying a user interface object on the touch-sensitive display; detecting a first contact on the user interface object; detecting movement of the first contact across the touch-sensitive display in a first direction; and, while detecting movement of the first contact across the touch-sensitive display in the first direction: when a second contact is not detected on the touch-sensitive display, moving the user interface object in the first direction in accordance with the movement of the first contact; and, when a second contact is detected on the touch-sensitive display: moving the user interface object in a horizontal direction across the touch-sensitive display in accordance with the movement of the first contact when a first predefined condition is satisfied; and moving the user interface object in a vertical direction across the touch-sensitive display in accordance with the movement of the first contact when a second predefined condition is satisfied.

In accordance with some embodiments, a method is performed at a computing device with a touch-sensitive display. The method includes: displaying a user interface object on the touch-sensitive display; detecting a first contact on the user interface object; detecting movement of the first contact across the touch-sensitive display in a first direction; and, while detecting movement of the first contact across the touch-sensitive display in the first direction: when a second contact is not detected on the touch-sensitive display, moving the user interface object in the first direction in accordance with the movement of the first contact; and, when a second contact is detected on the touch-sensitive display, constraining the user interface object to move in either a horizontal direction, a vertical direction, or a diagonal direction across the touch-sensitive display in accordance with a corresponding horizontal, vertical, or diagonal component of movement of the first contact.

In accordance with some embodiments, a method is performed at a computing device with a touch-sensitive display. The method includes: displaying a user interface object on the touch-sensitive display; detecting a first contact on the user interface object; detecting movement of the first contact across the touch-sensitive display in a first direction; and, while detecting movement of the first contact across the touch-sensitive display in the first direction: when a second contact is not detected on the touch-sensitive display, moving the user interface object in the first direction in accordance with the movement of the first contact; and, when a second contact is detected on the touch-sensitive display, constraining the user interface object to move in either a horizontal direction or a vertical direction across the touch-sensitive display in accordance with a corresponding horizontal or vertical component of movement of the first contact.

In accordance with some embodiments, a method is performed at a computing device with a touch-sensitive display. The method includes: displaying a plurality of user interface objects on the touch-sensitive display, including a currently selected first user interface object; detecting a first contact on the first user interface object; detecting movement of the first contact across the touch-sensitive display; moving the first user interface object in accordance with the movement of the first contact; while detecting movement of the first contact across the touch-sensitive display: detecting a first finger gesture on a second user interface object in the plurality of user interface objects; and, in response to detecting the first finger gesture on the second user interface object: selecting the second user interface object; moving the second user interface object in accordance with movement of the first contact subsequent to detecting the first finger gesture; and continuing to move the first user interface object in accordance with the movement of the first contact.

In accordance with some embodiments, a computing device includes a touch-sensitive display, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a computing device with a touch-sensitive display, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a computing device with a touch-sensitive display, cause the device to perform the operations of any of the methods described above. In accordance with some embodiments, a computing device includes: a touch-sensitive display; and means for performing the operations of any of the methods described above. In accordance with some embodiments, an information processing apparatus, for use in a computing device with a touch-sensitive display, includes means for performing the operations of any of the methods described above.

Thus, computing devices with touch-sensitive displays are provided with faster, more efficient methods and interfaces for selecting and moving objects, thereby increasing the effectiveness, efficiency, and user satisfaction with such devices. Such methods and interfaces may complement or replace conventional methods for selecting and moving objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
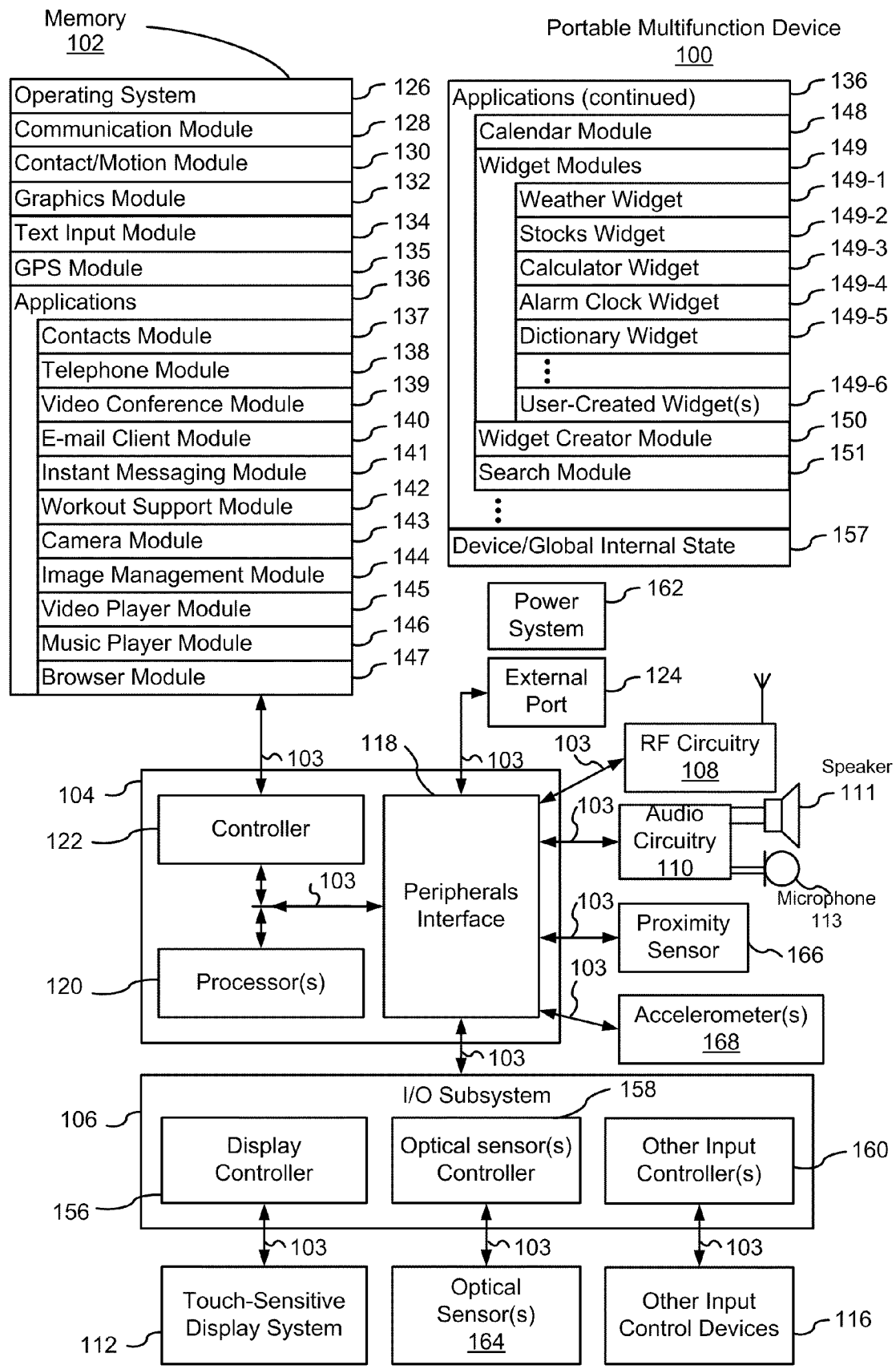
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
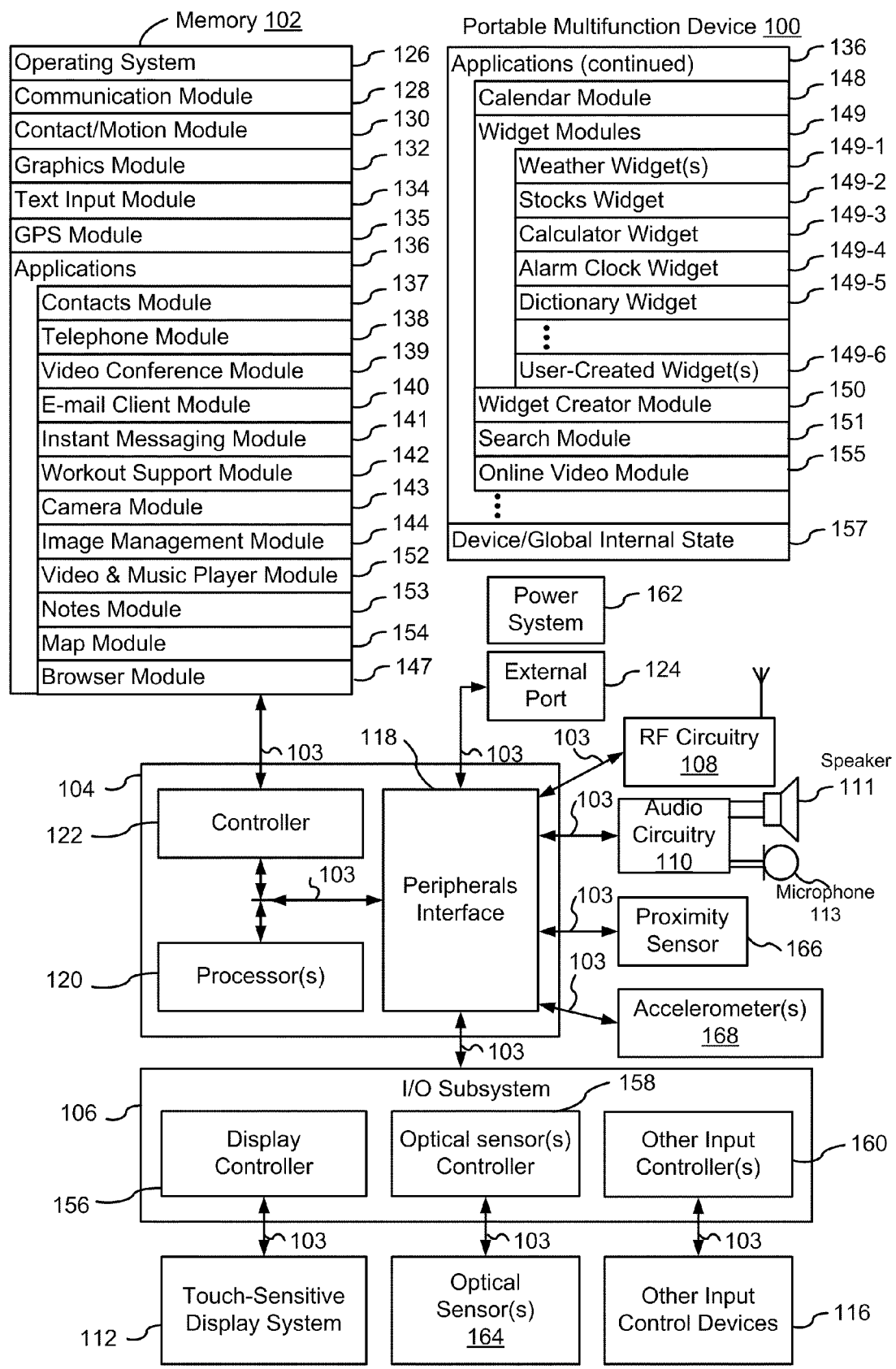

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
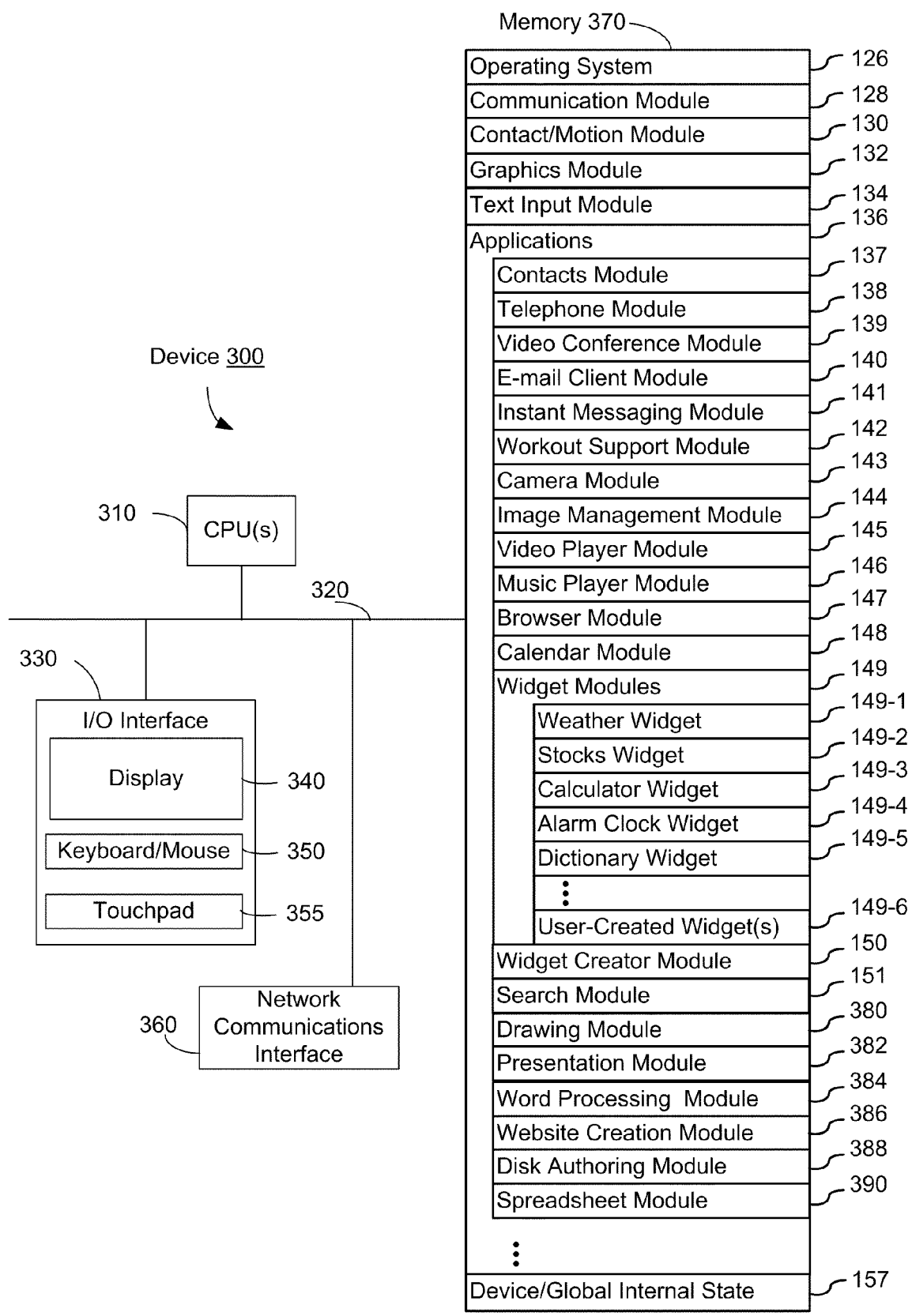
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
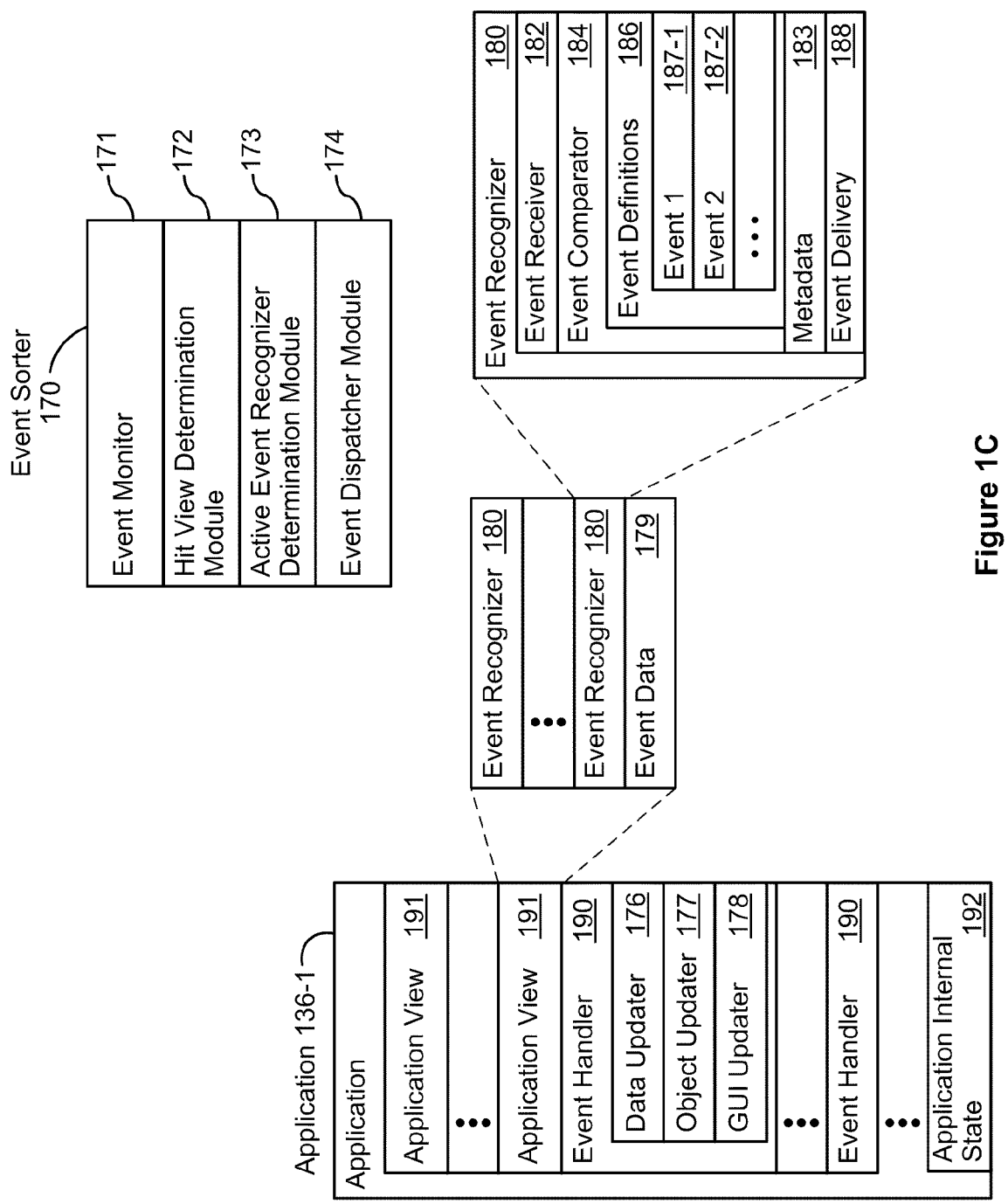
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
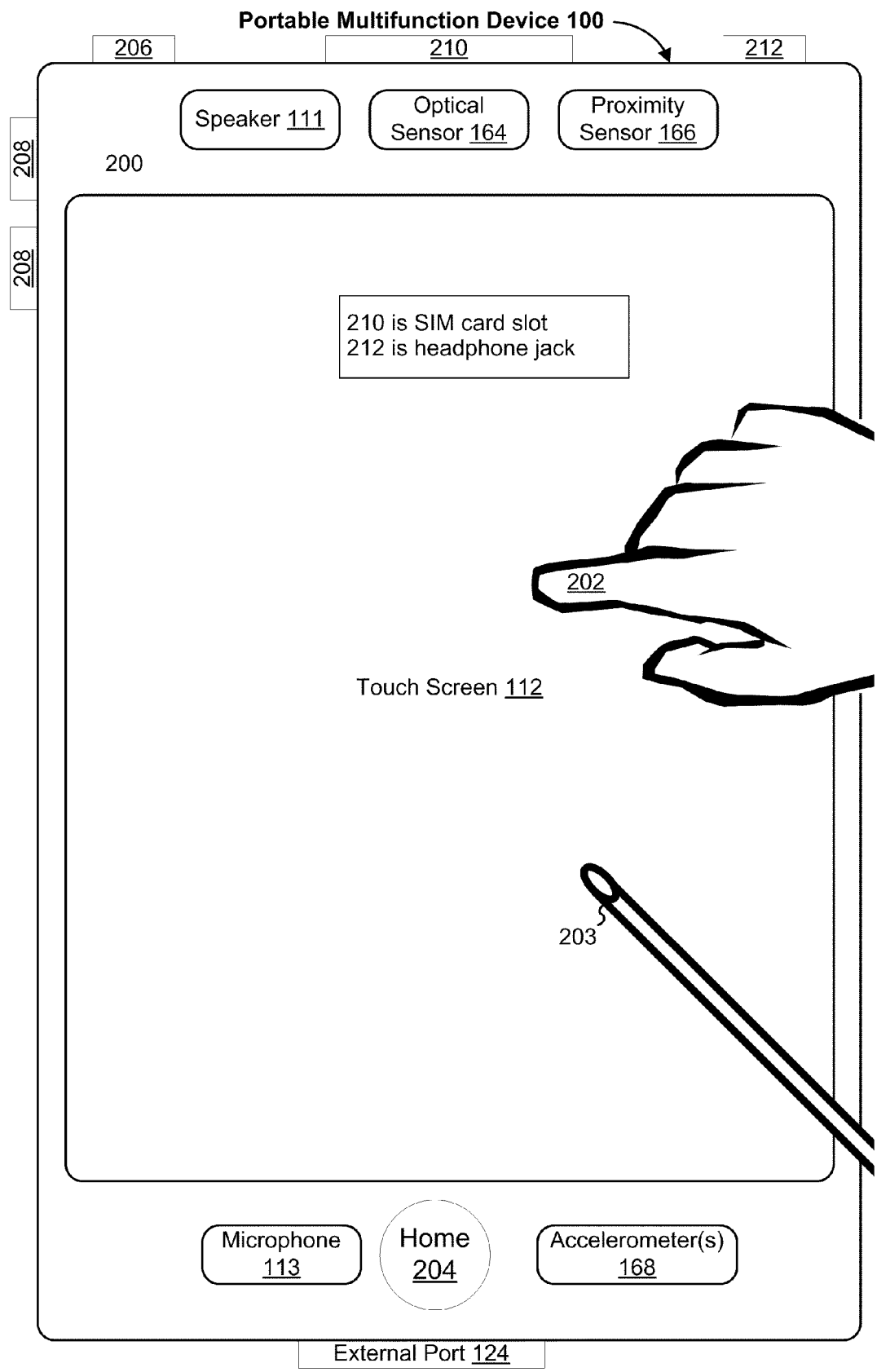
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
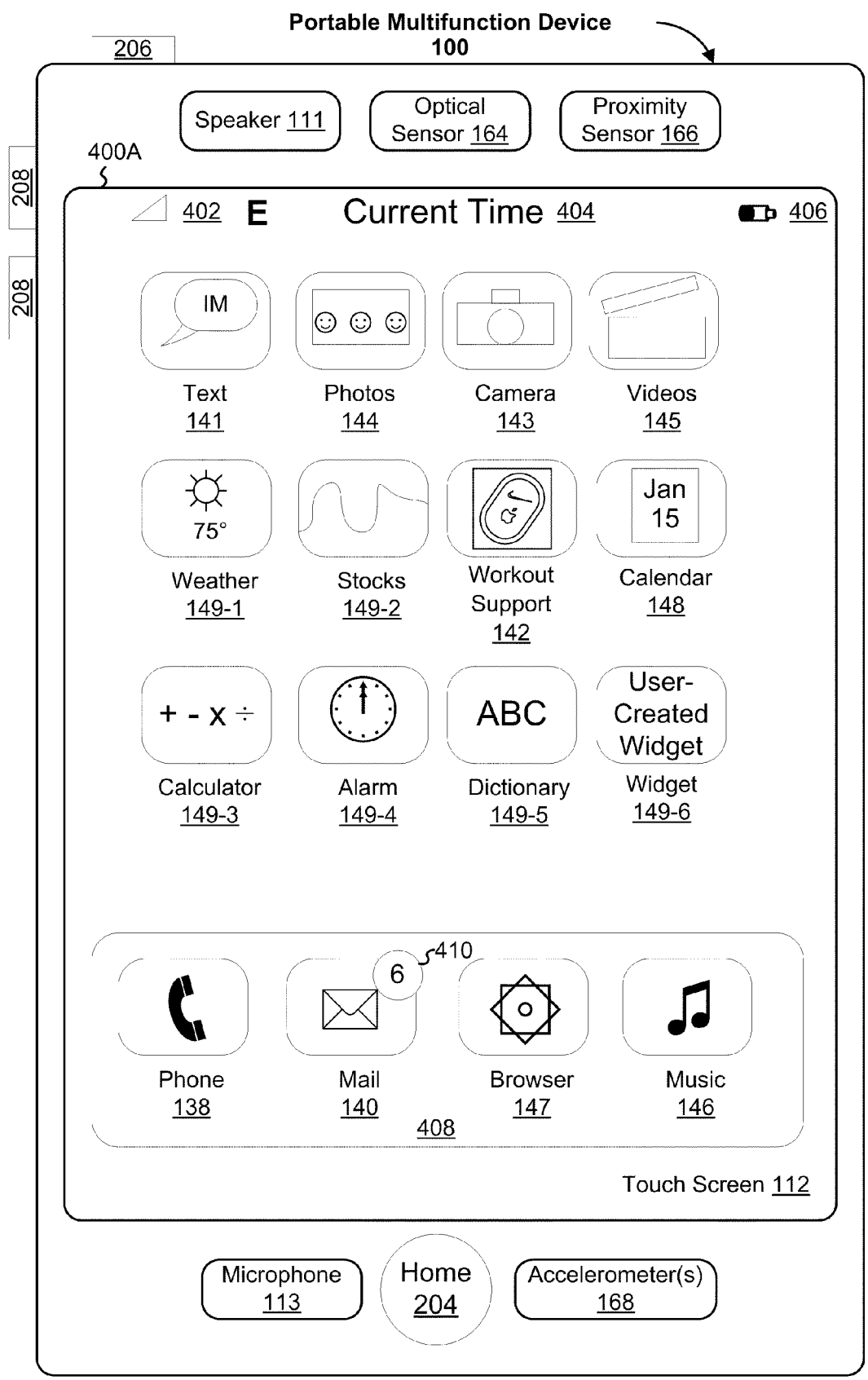
FIGS. 4A and 4B illustrate exemplary user interfaces for a menu of applications on a portable multifunction device in accordance with some embodiments.
Figure 4B:
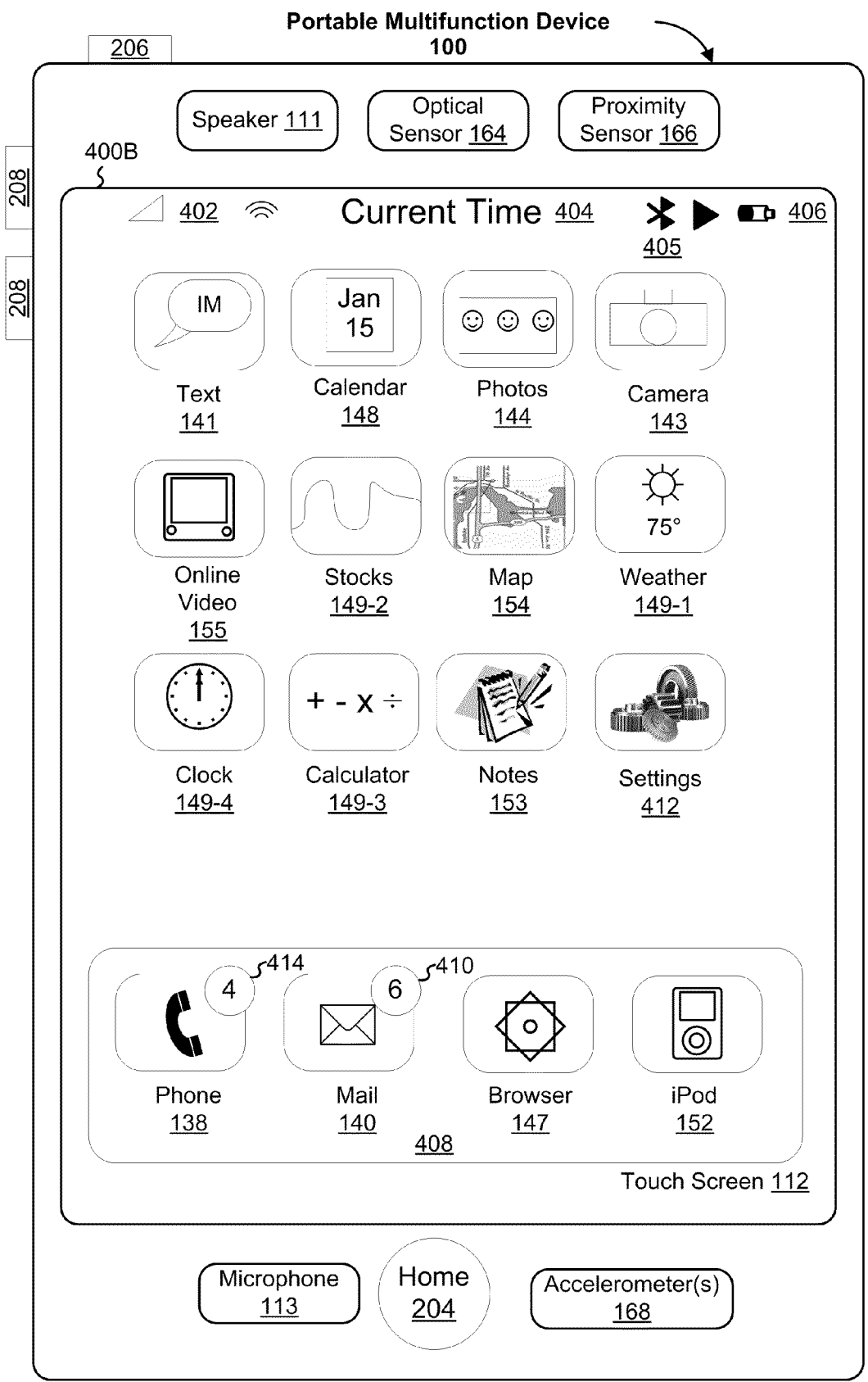

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for device 100 and its various applications 136, as described further below;
  Video and music player module 152, also referred to as iPod (trademark of Apple Inc.) module 152; and
  Online video module 155, also referred to as YouTube (trademark of Google Inc.) module 155.

Figure 4C:
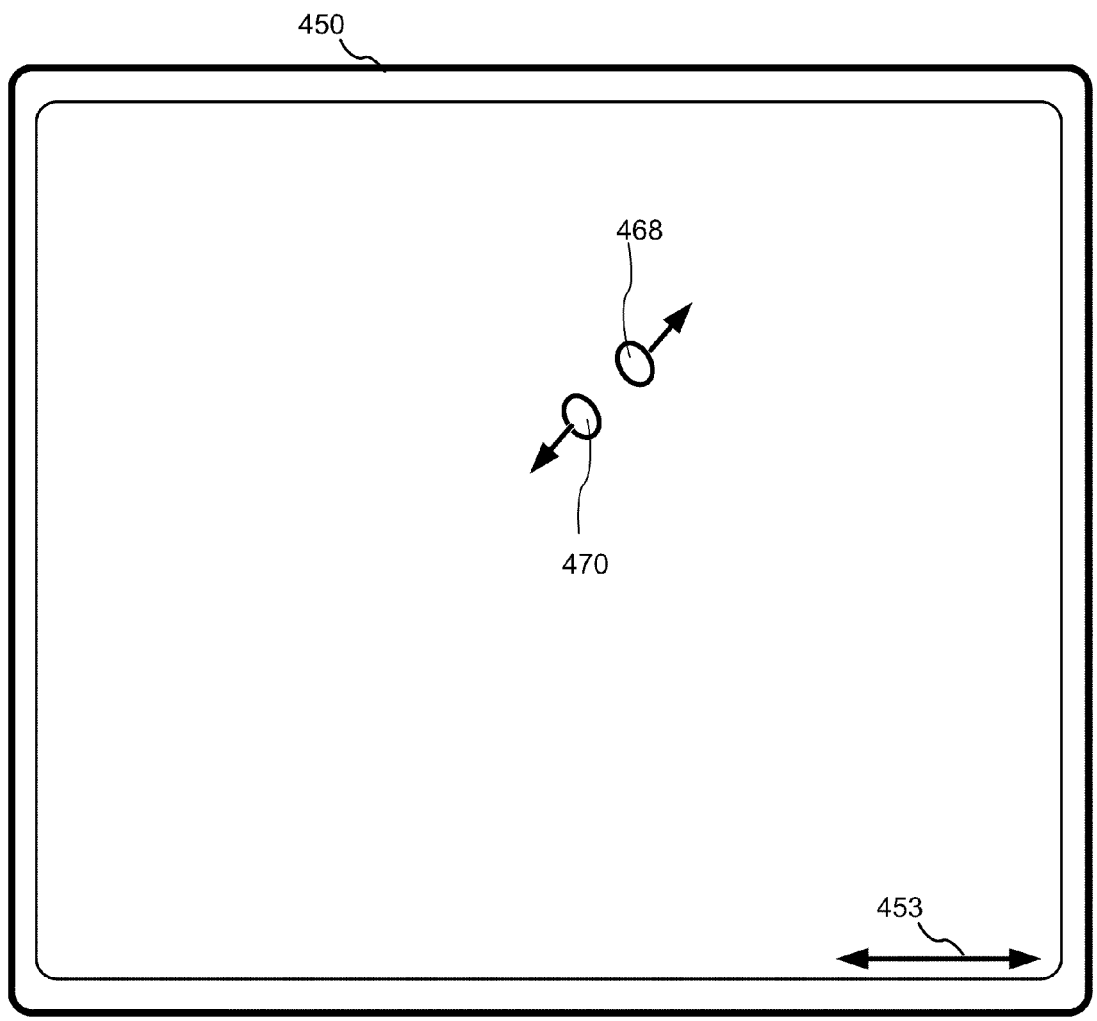
FIG. 4C illustrates an exemplary user interface for a multifunction device with a touch-sensitive surface that is separate from the display in accordance with some embodiments.
Figure 4C:
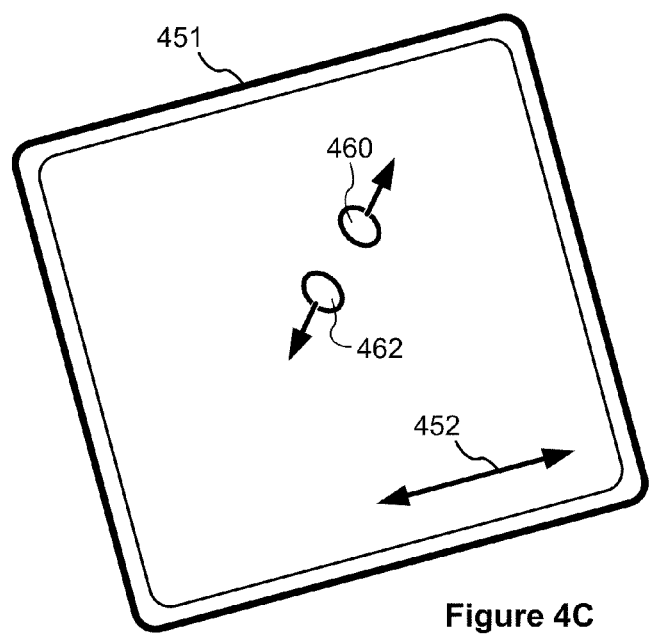

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Attention is now directed towards embodiments of user interfaces ("UI") and associated processes that may be implemented on a multifunction device with a display and a touch-sensitive surface, such as device 300 or portable multifunction device 100.

Figure 5A:
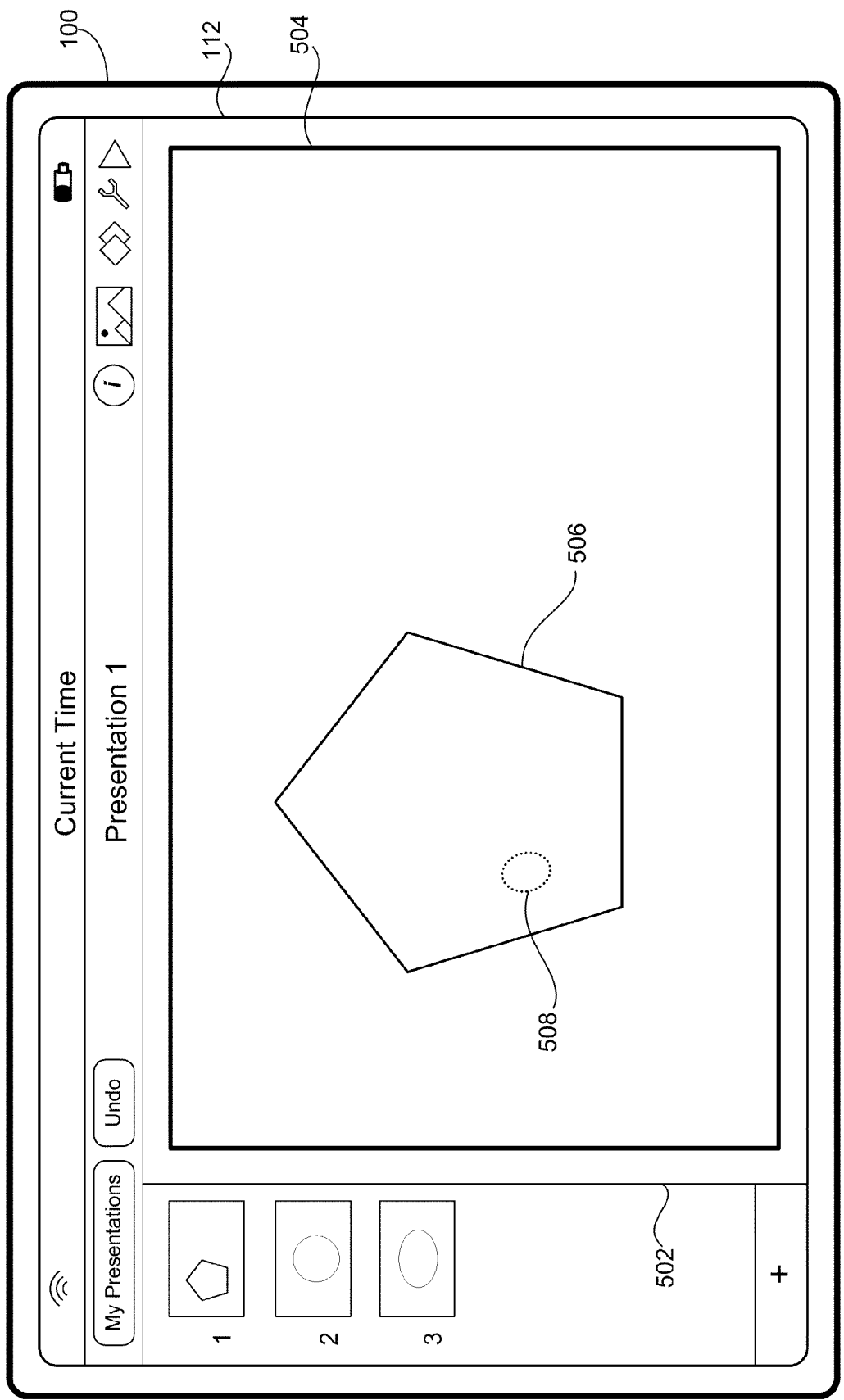
FIGS. 5A-5T illustrate exemplary user interfaces for selecting and moving objects in accordance with some embodiments.
Figure 5B:
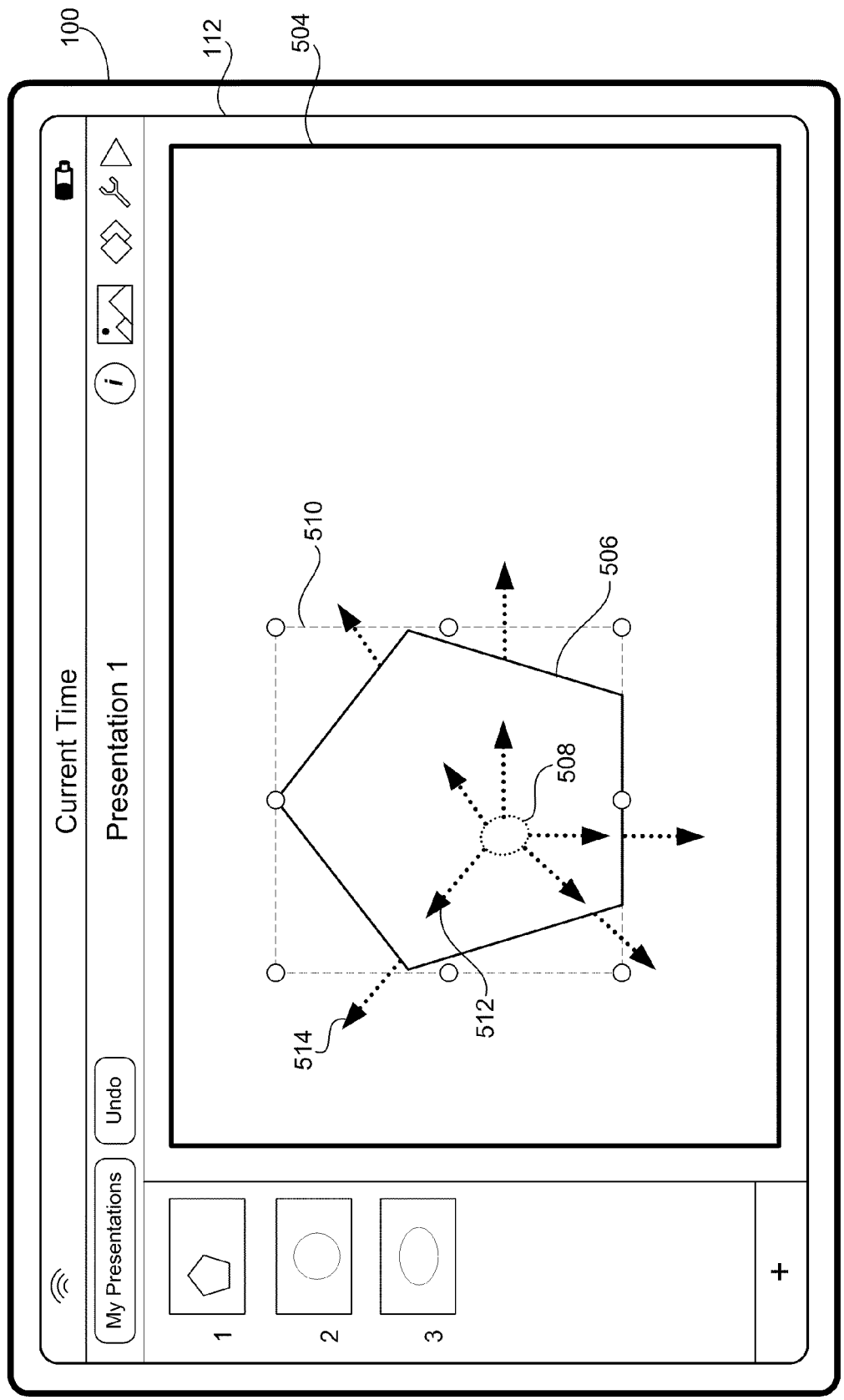
Figure 5C:
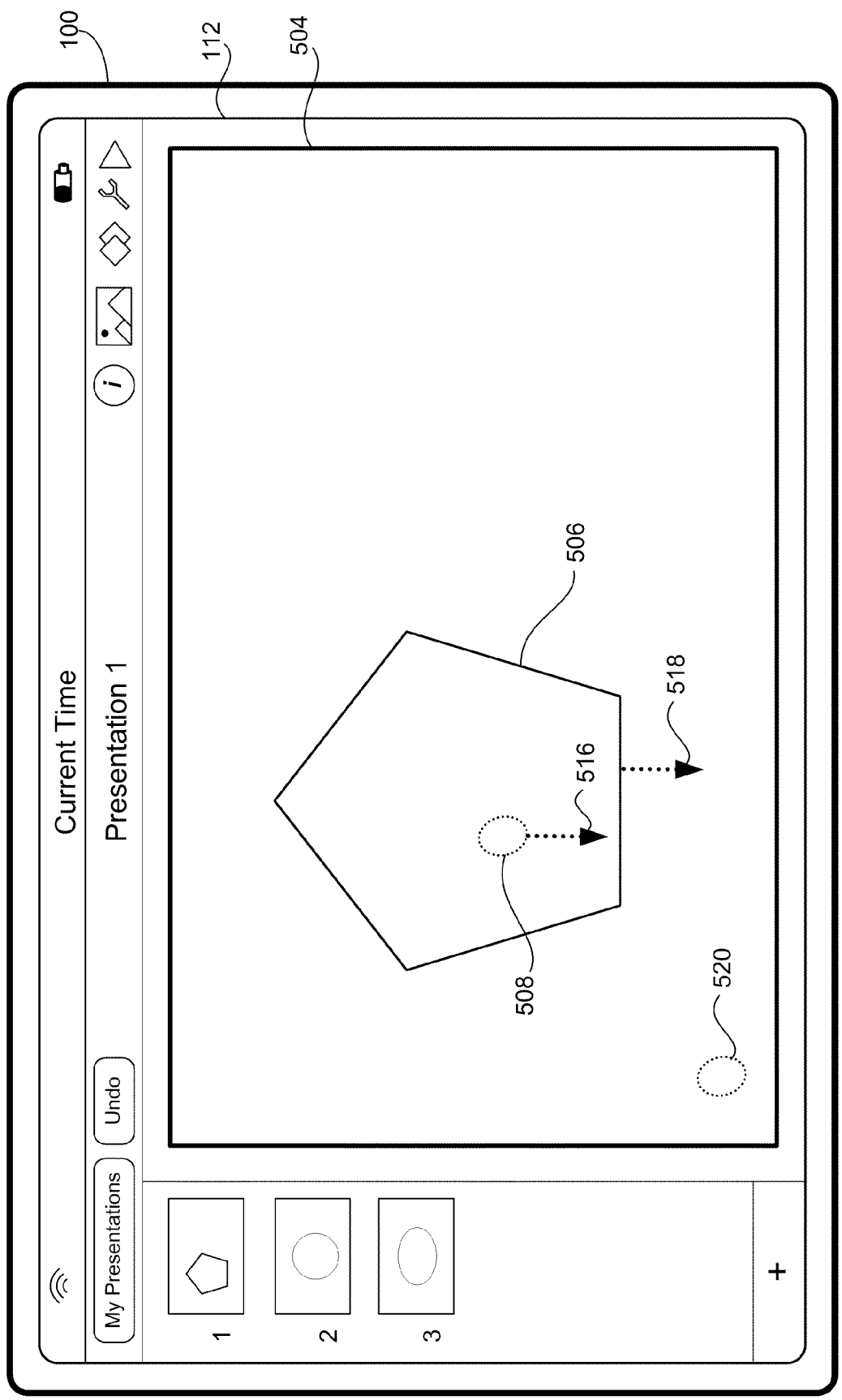
Figure 5D:
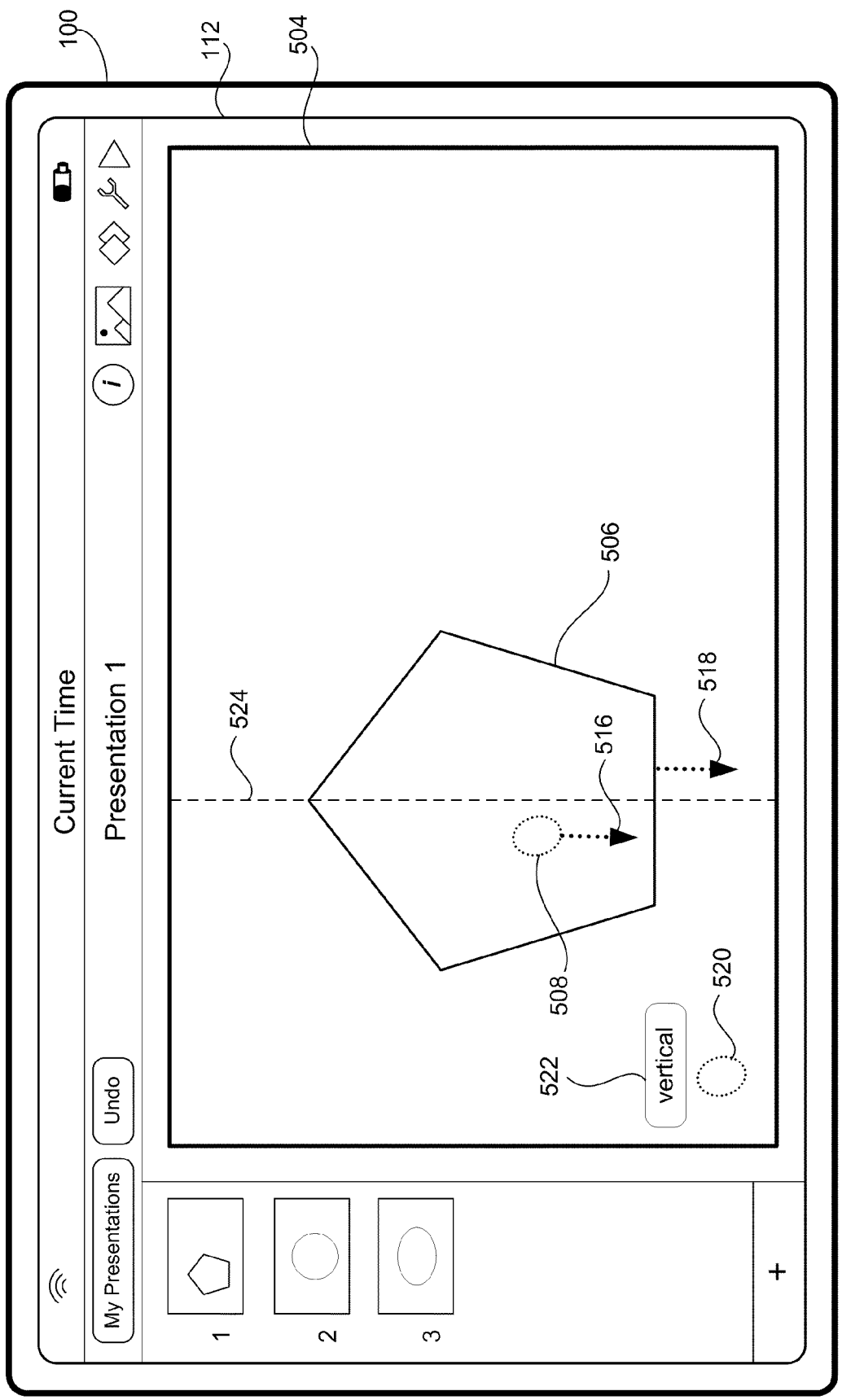
Figure 5E:
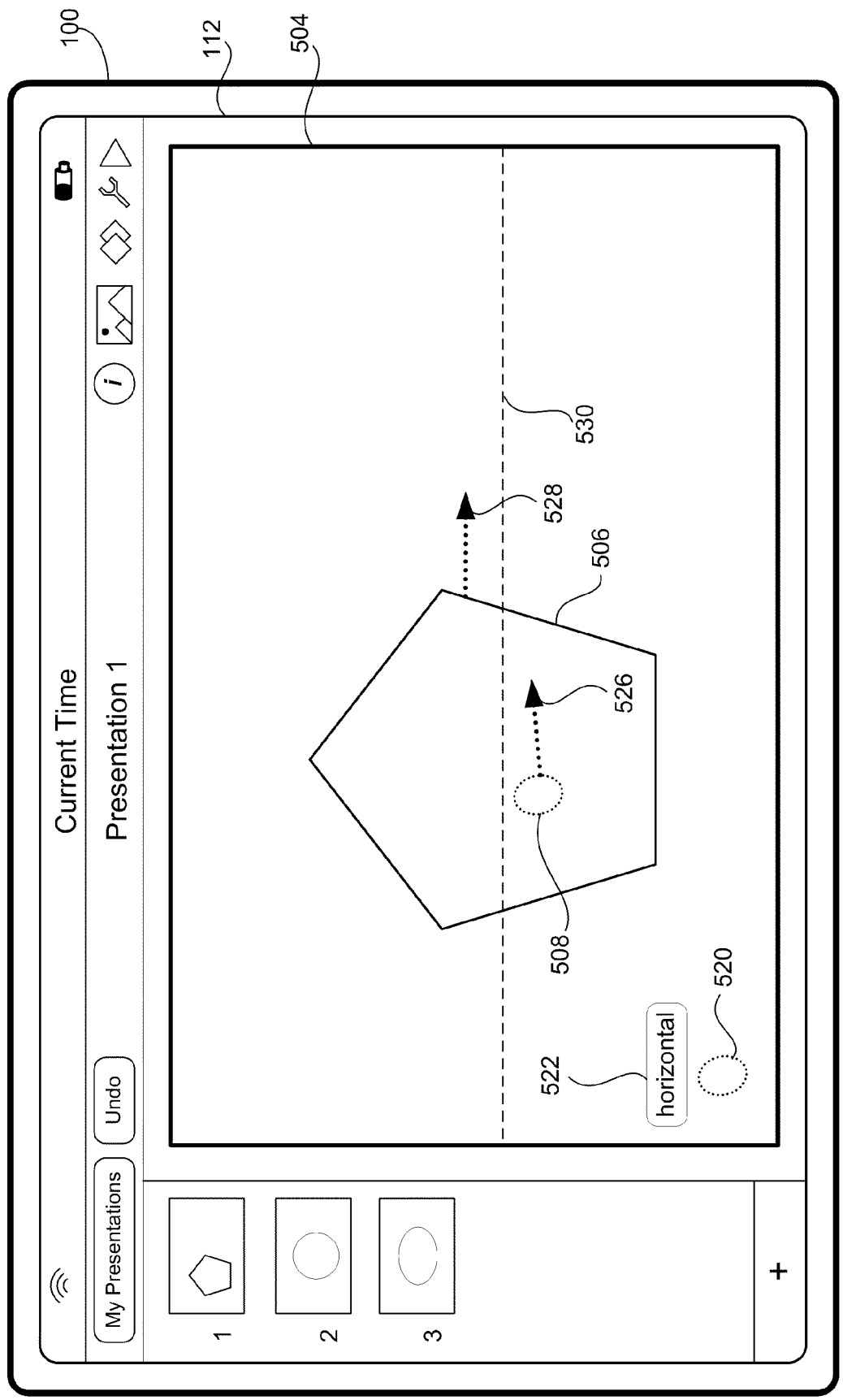
Figure 5F:
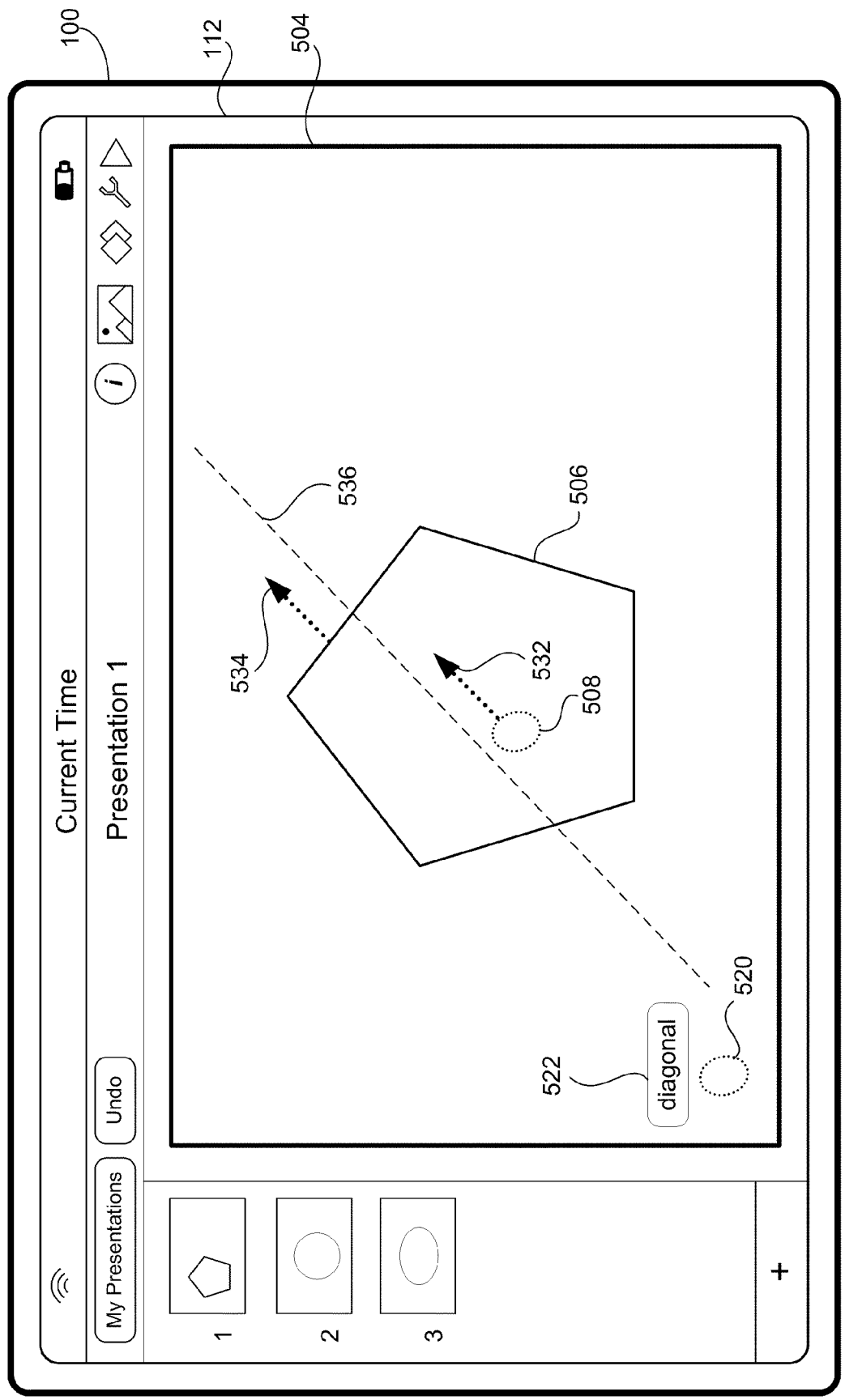
Figure 5G:
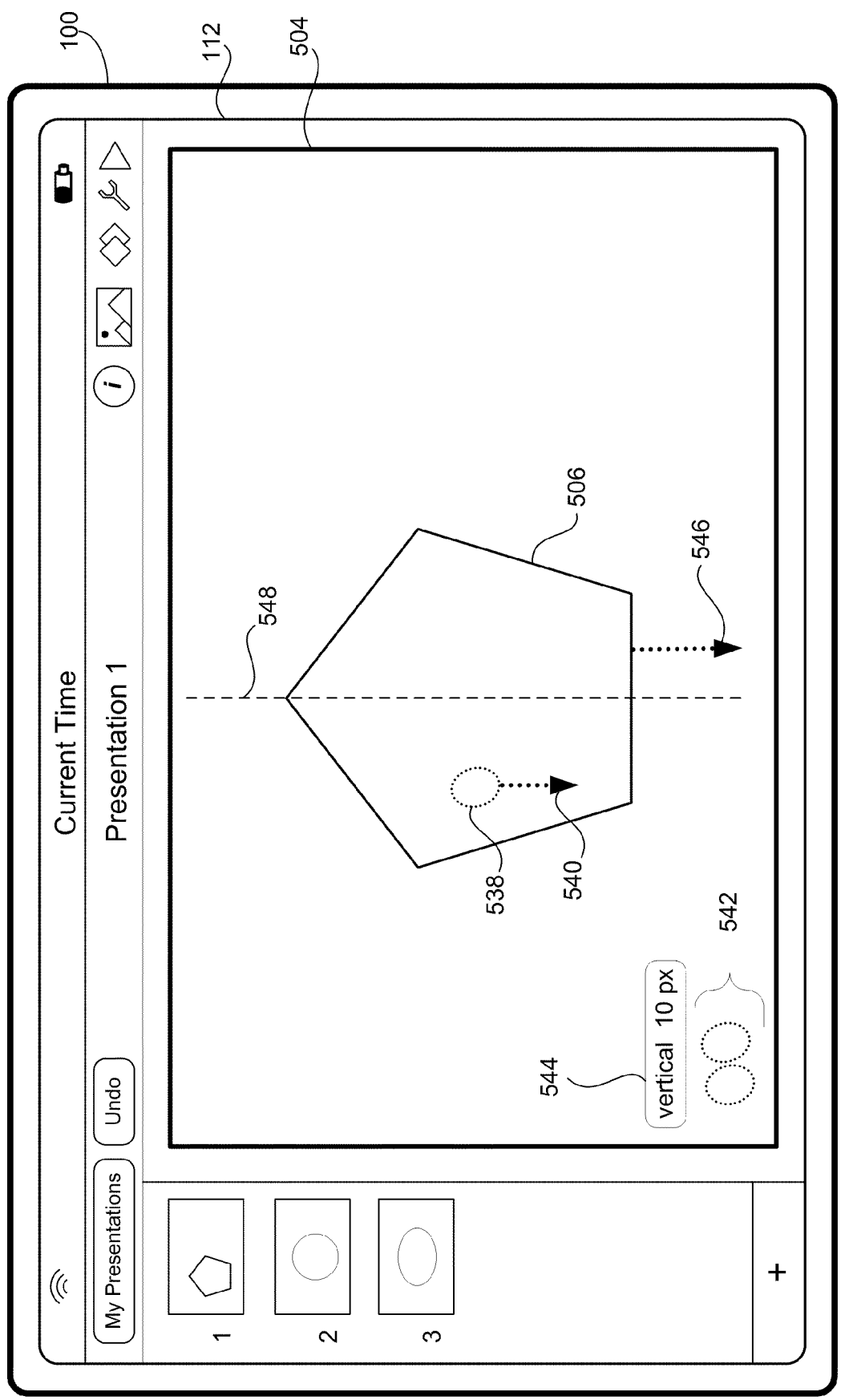
Figure 5H:
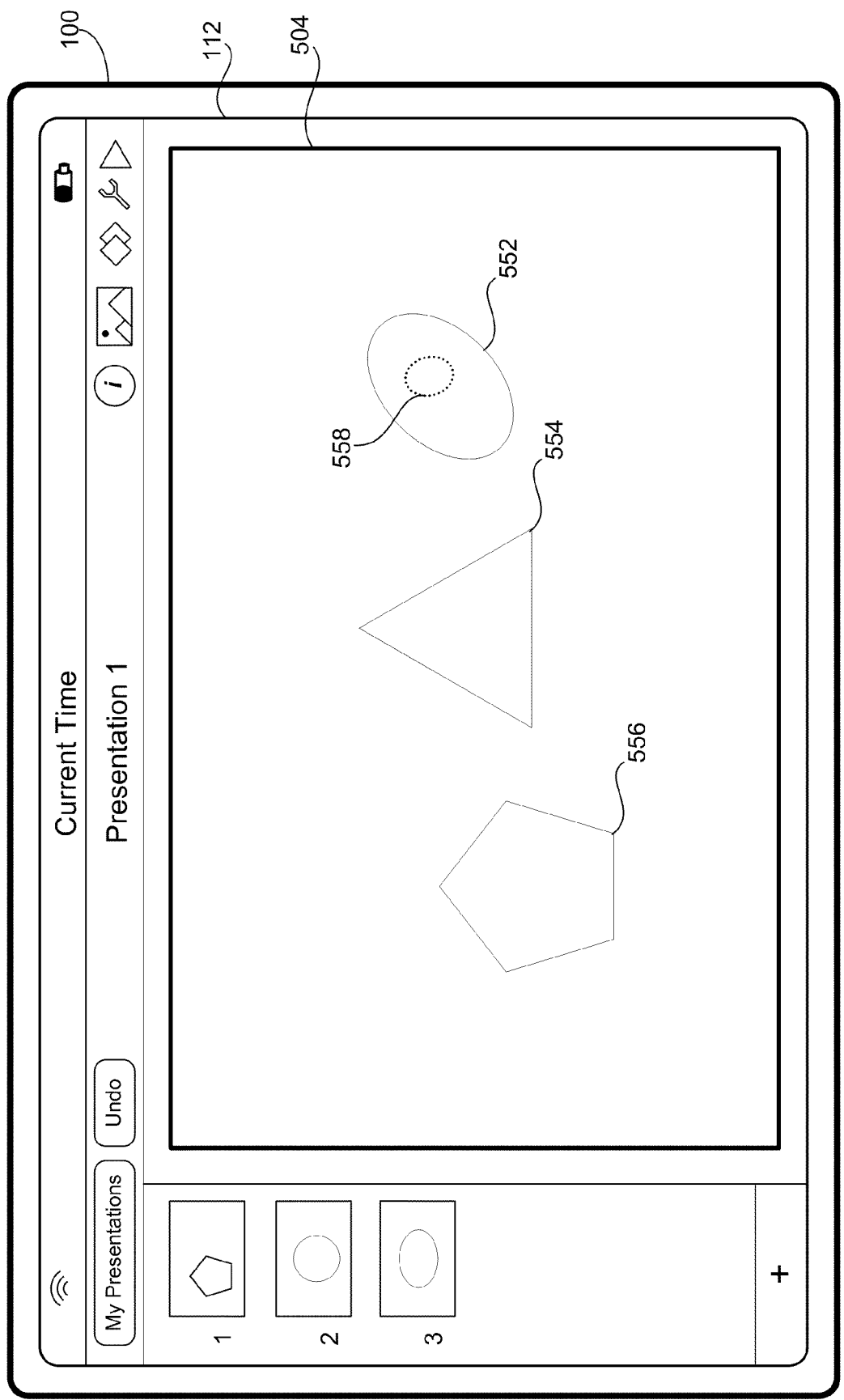
Figure 5J:
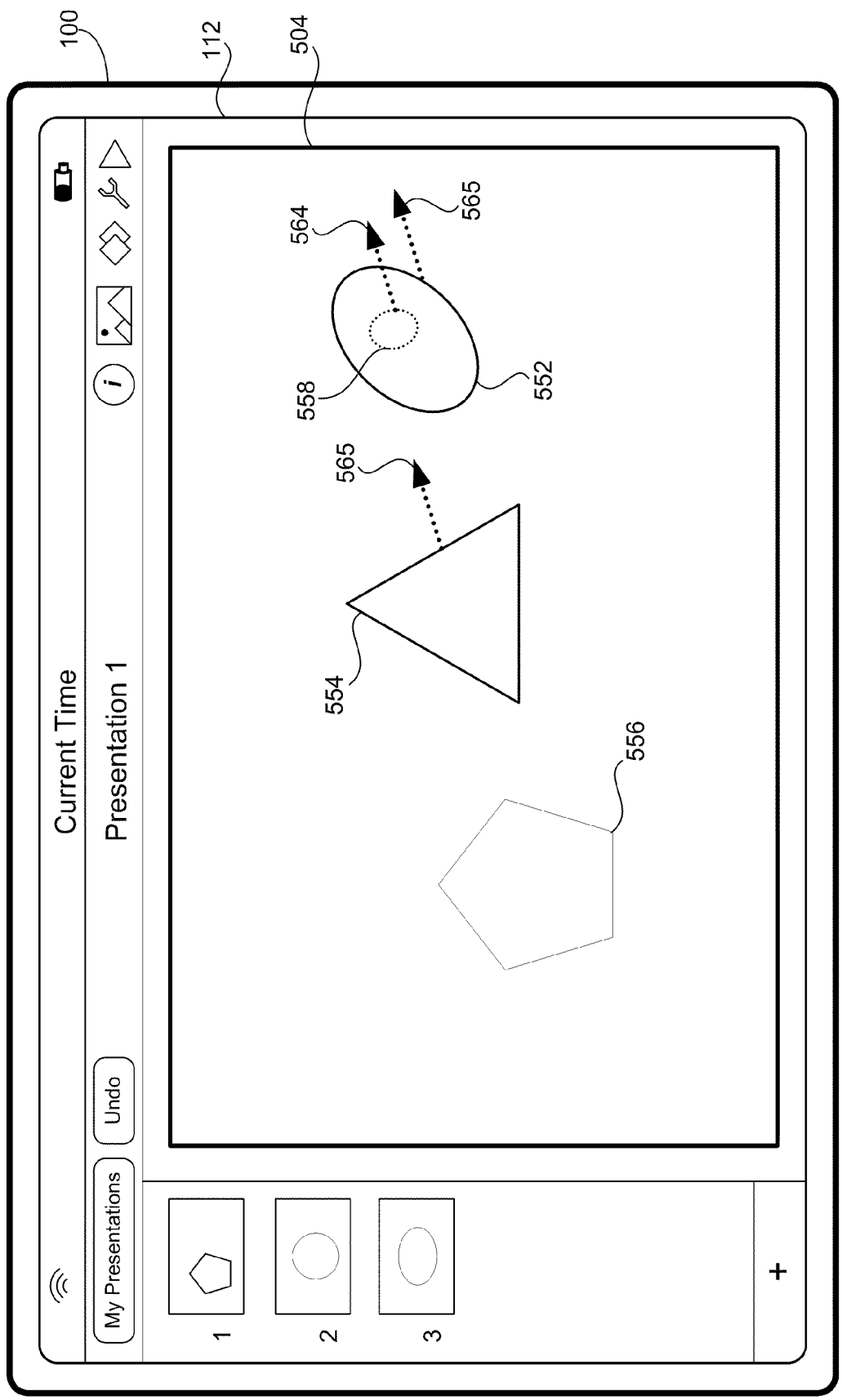
Figure 5K:
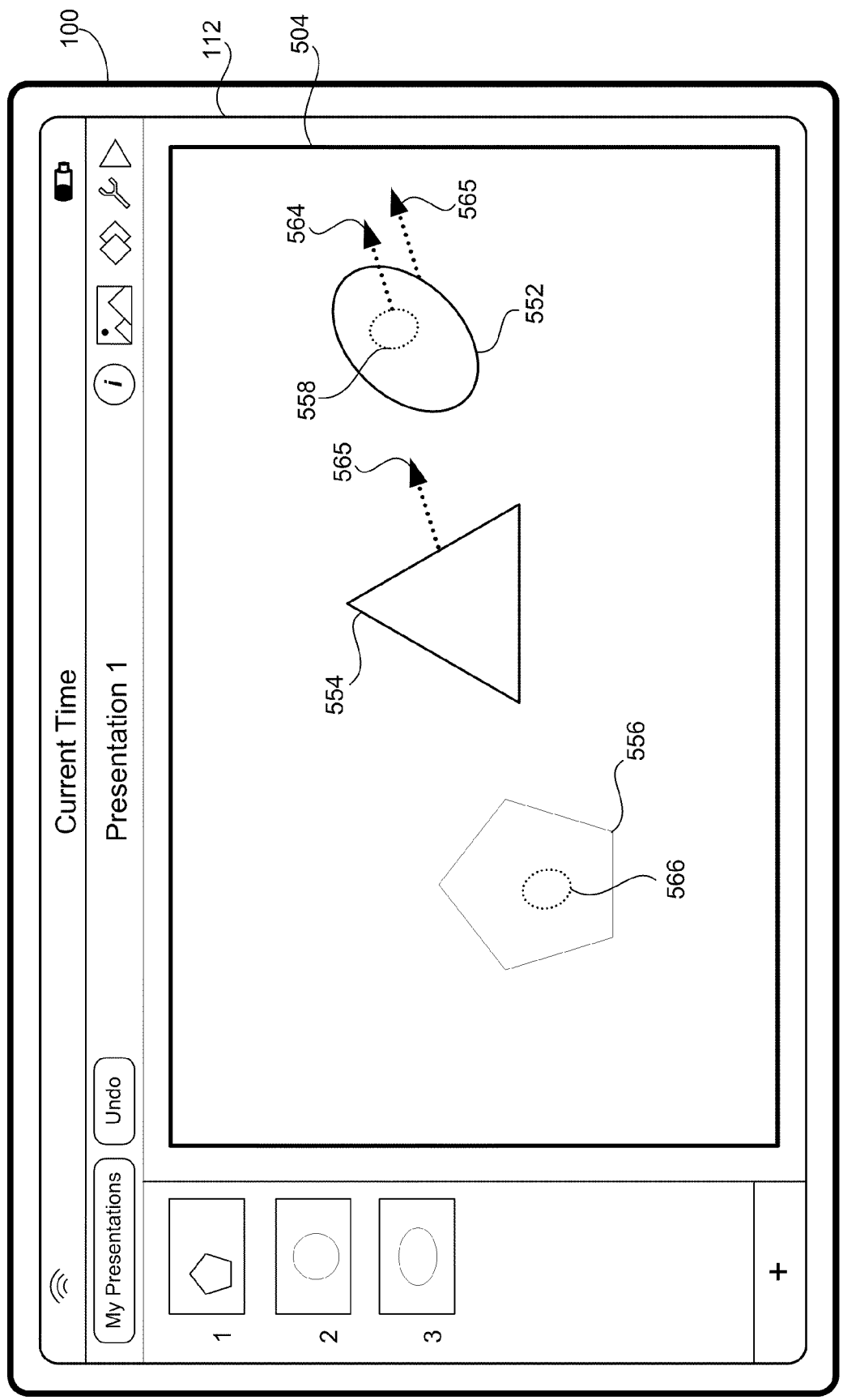
Figure 5L:
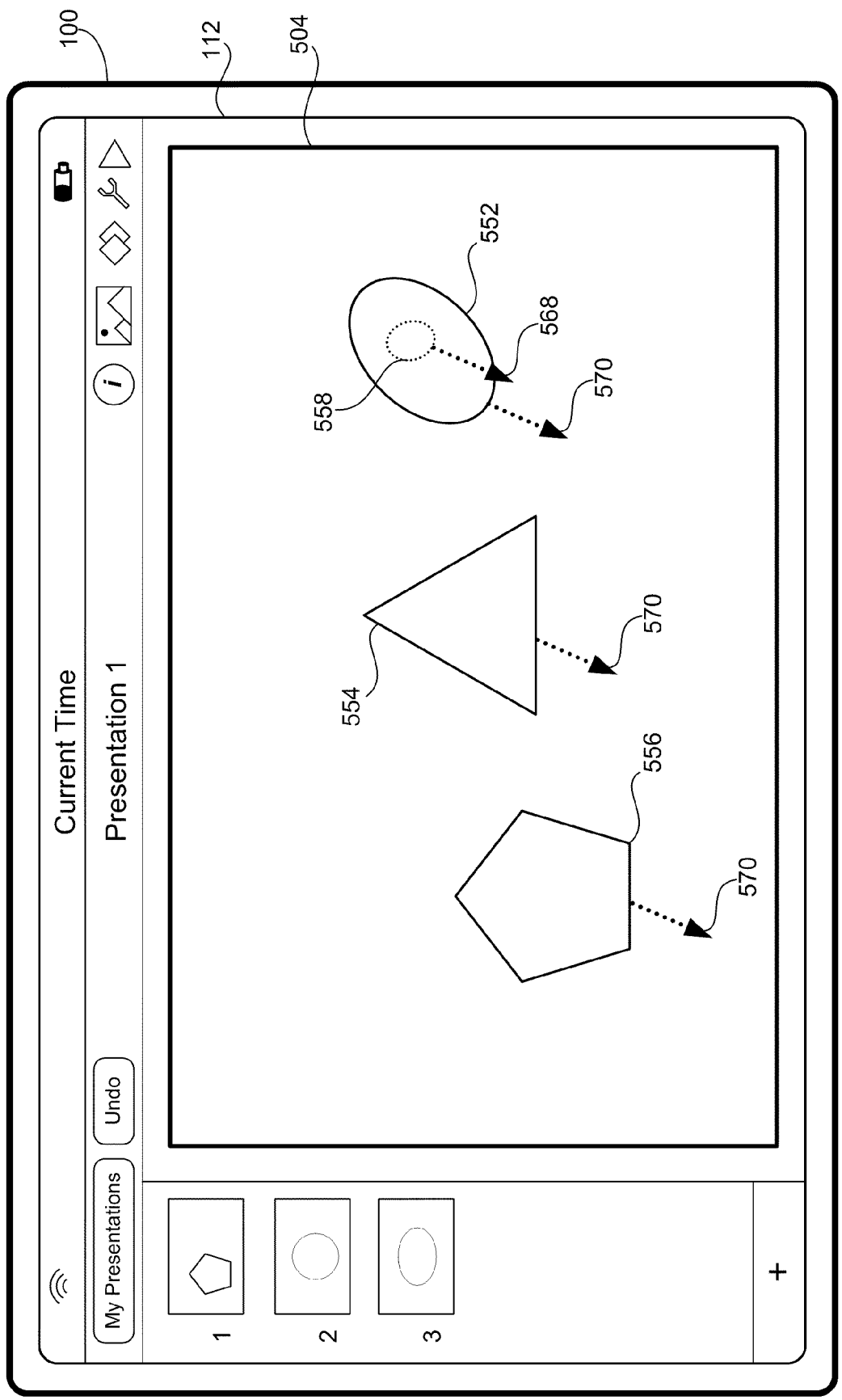
Figure 5M:
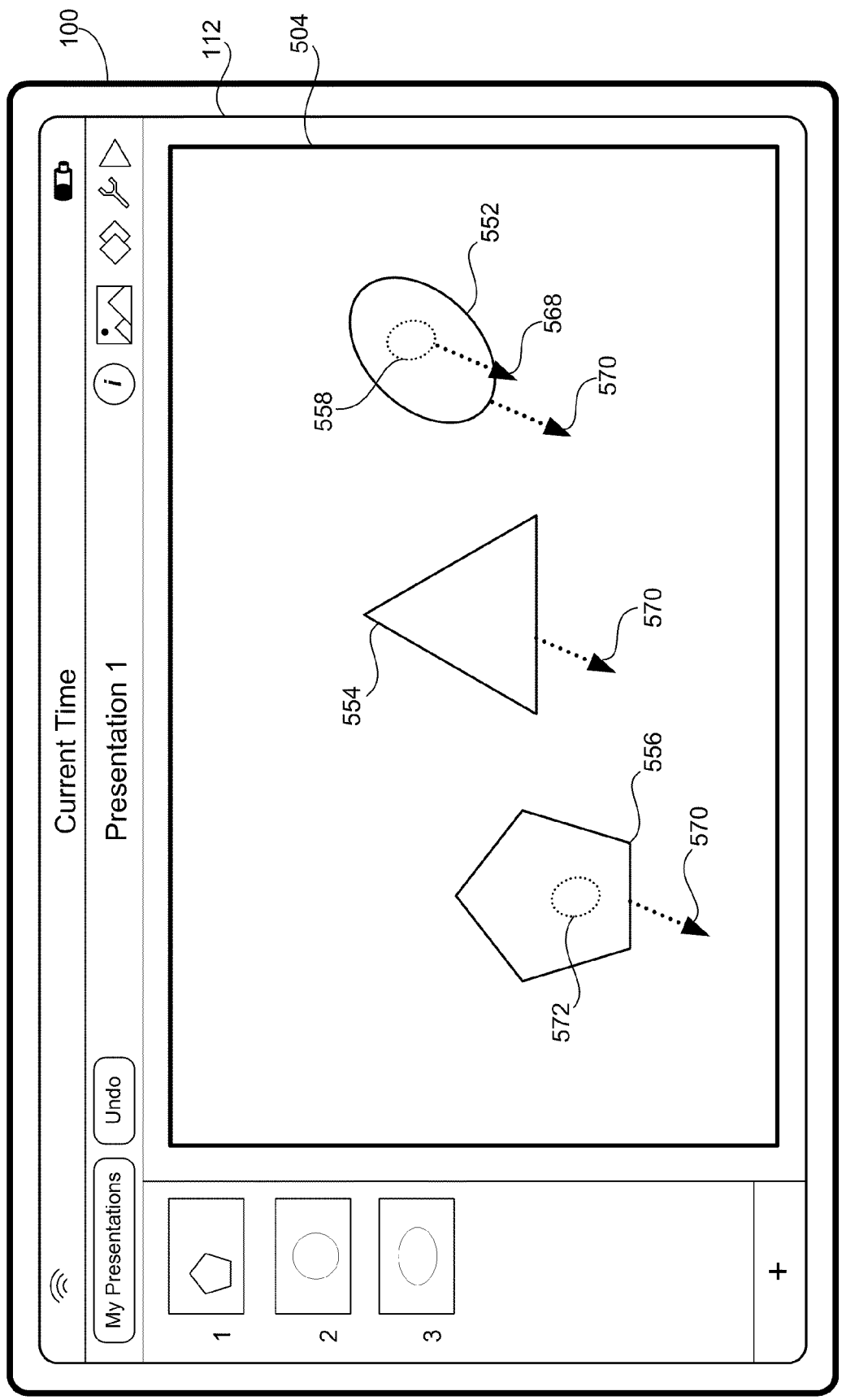
Figure 5N:
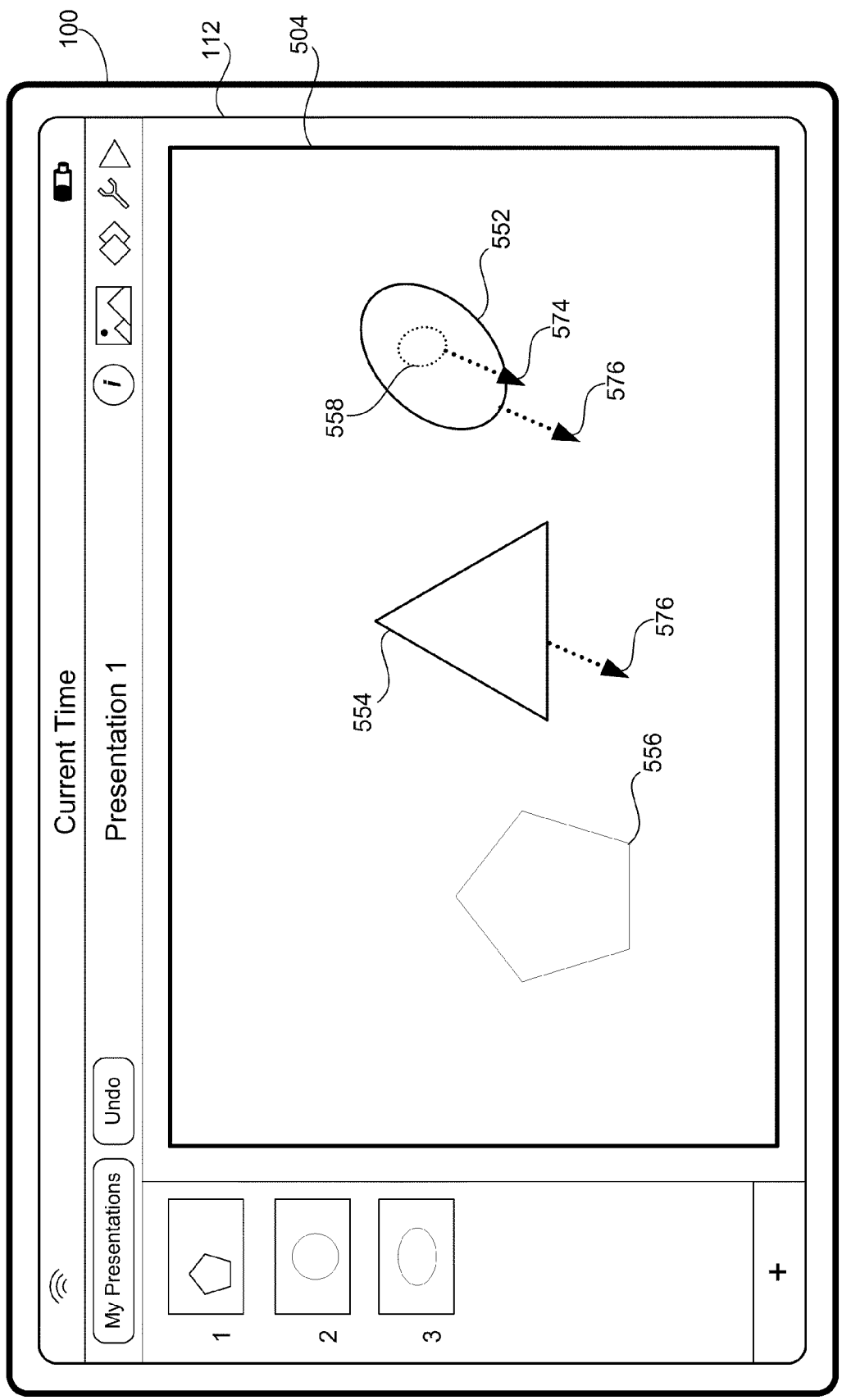
Figure 5O:
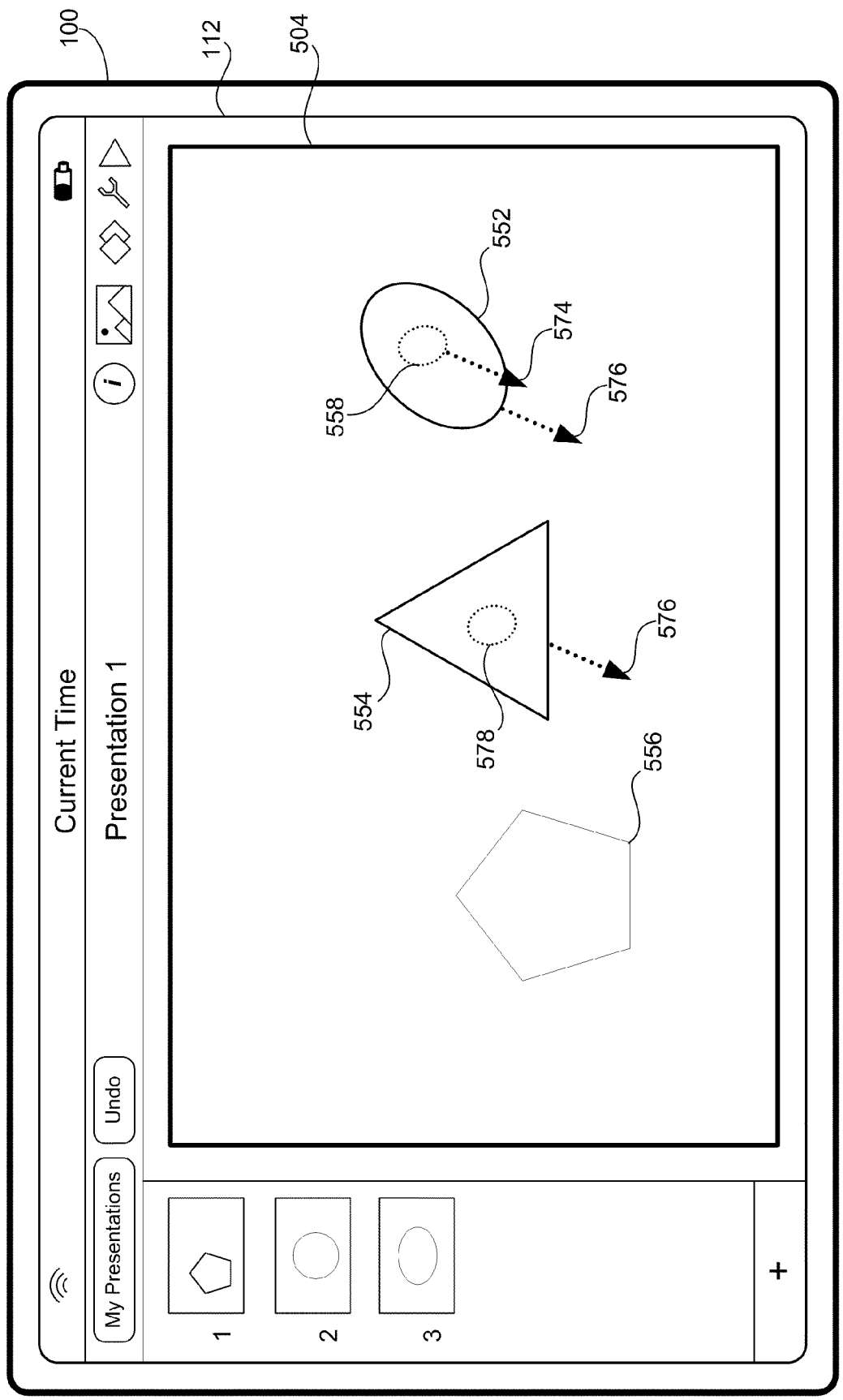
Figure 5P:
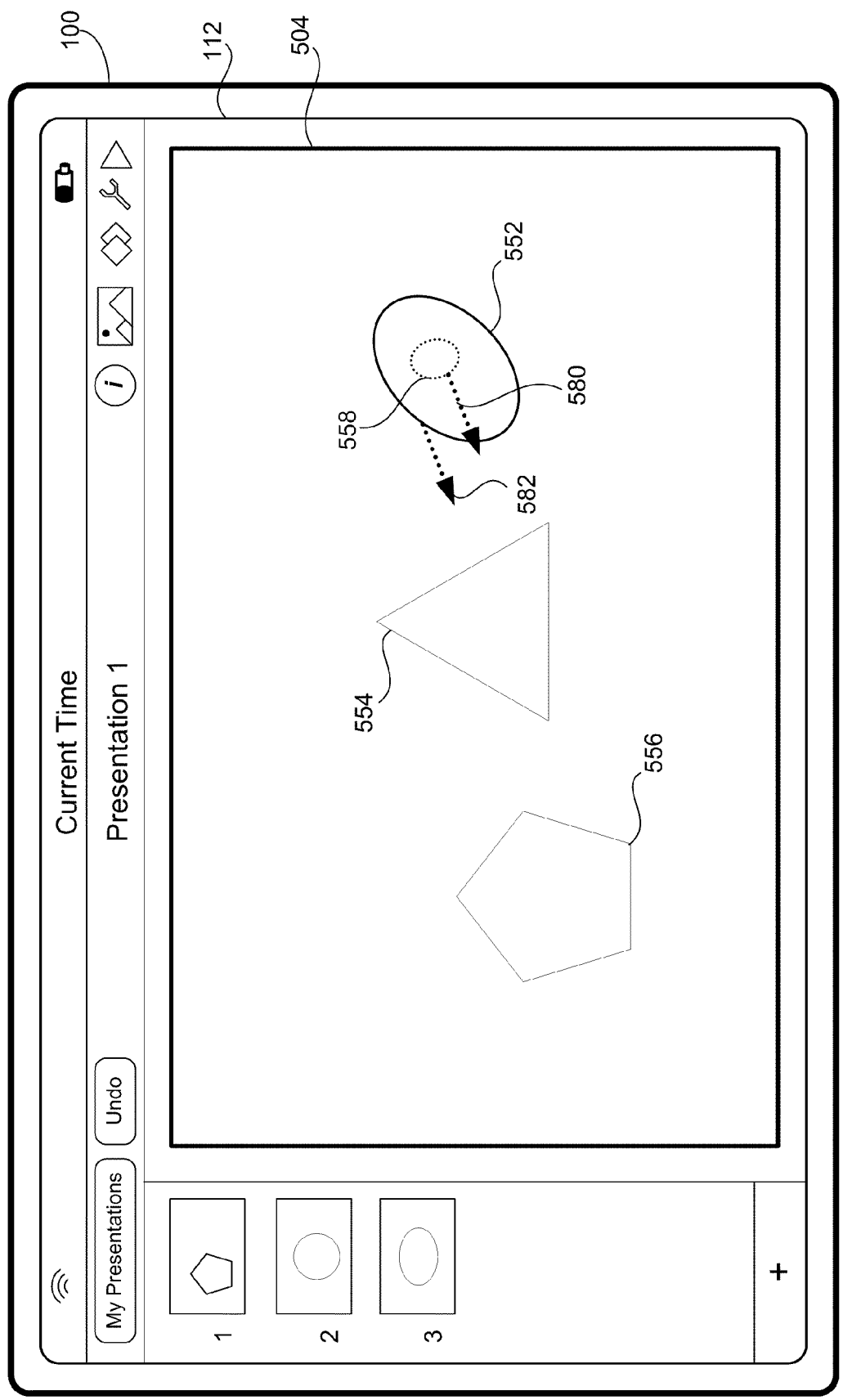
Figure 5Q:
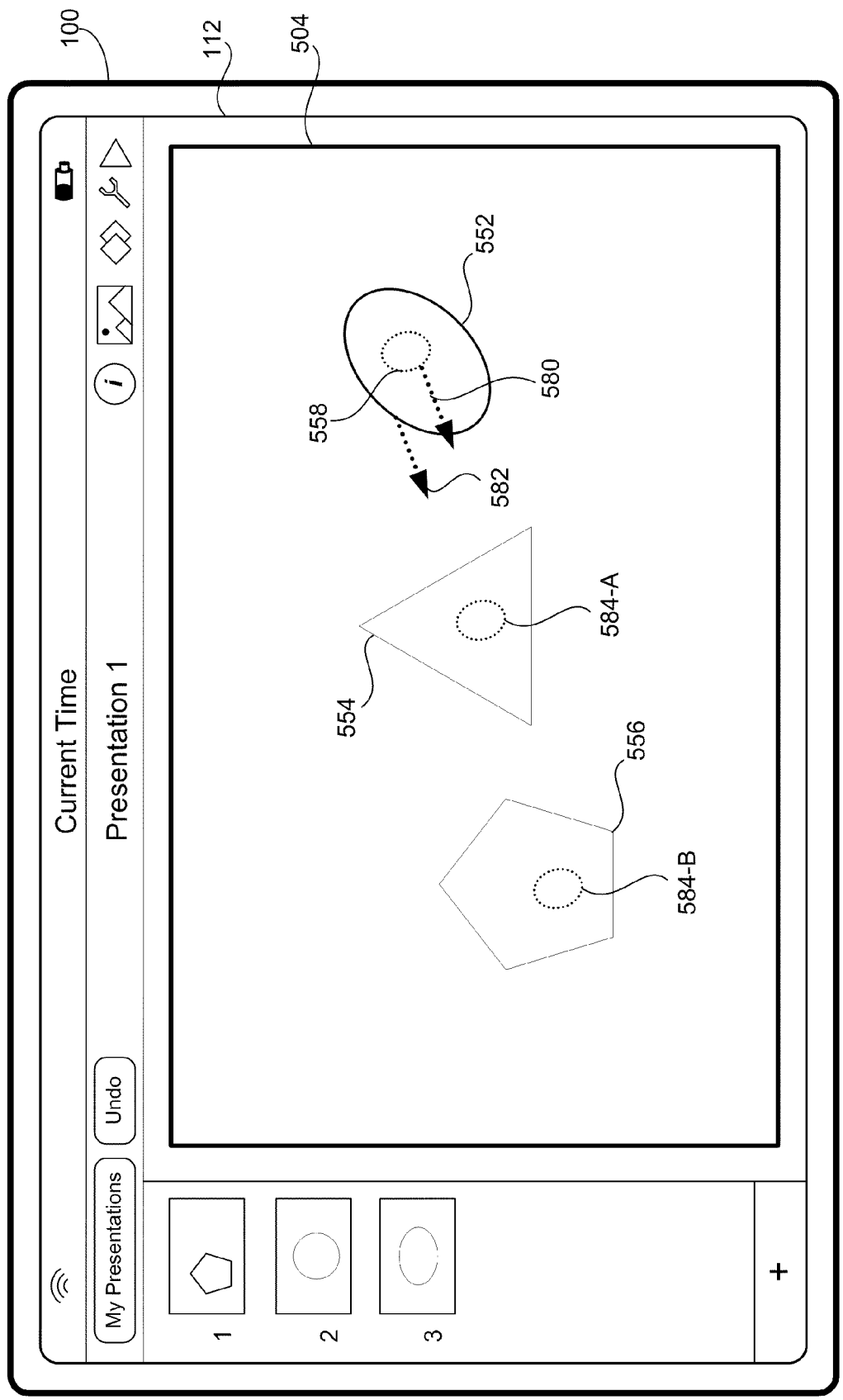
Figure 5R:
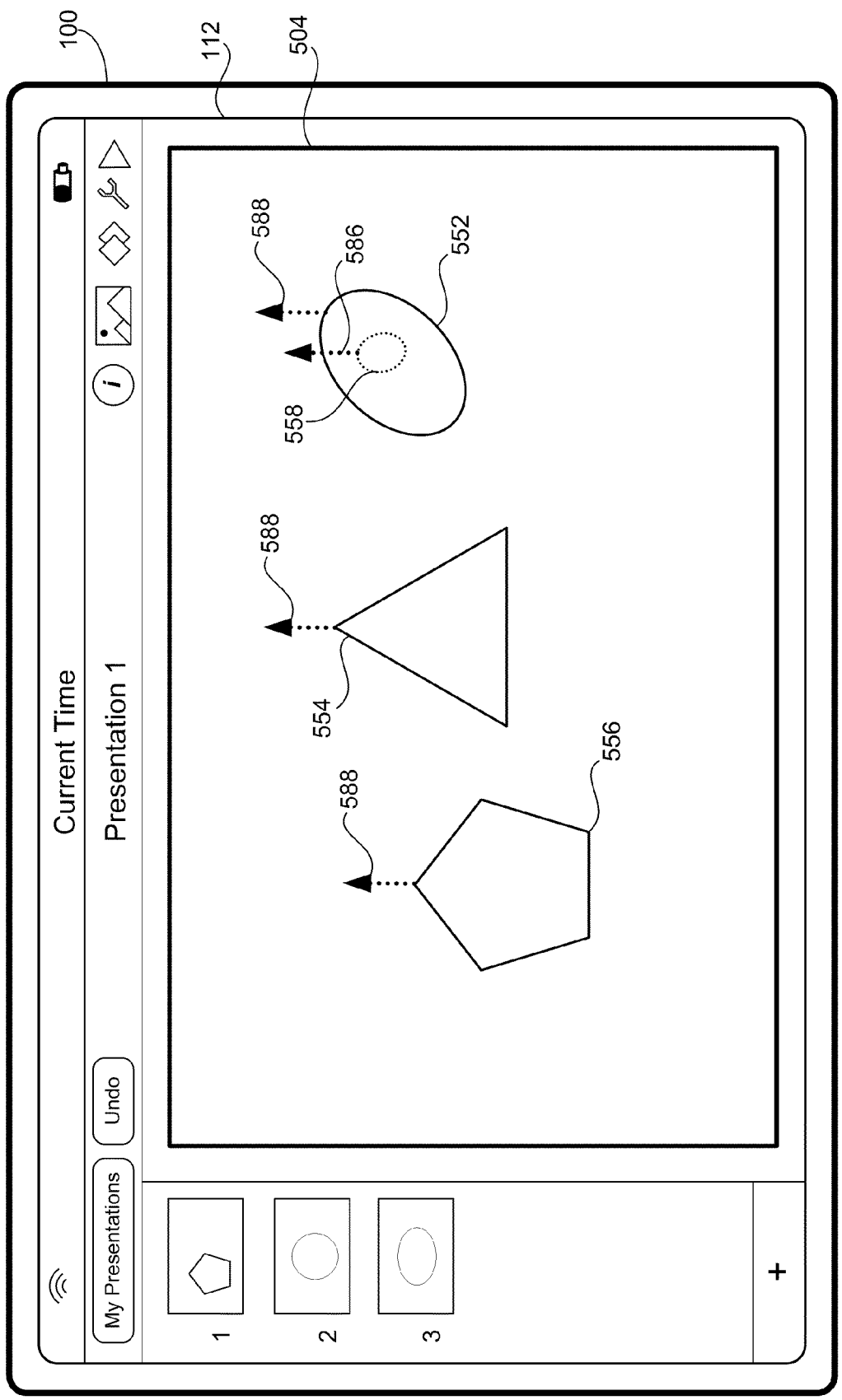
Figure 5S:
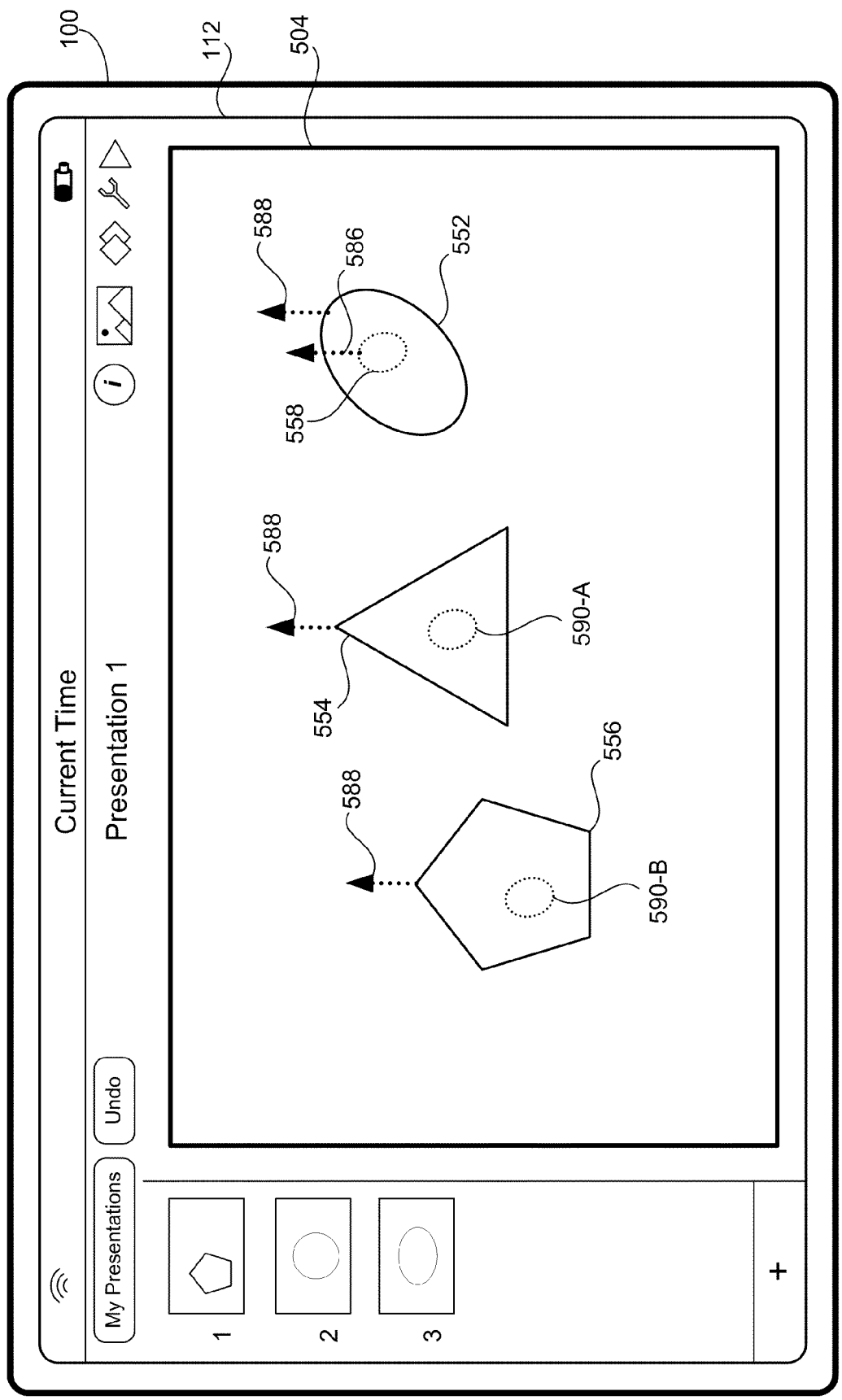
Figure 5T:
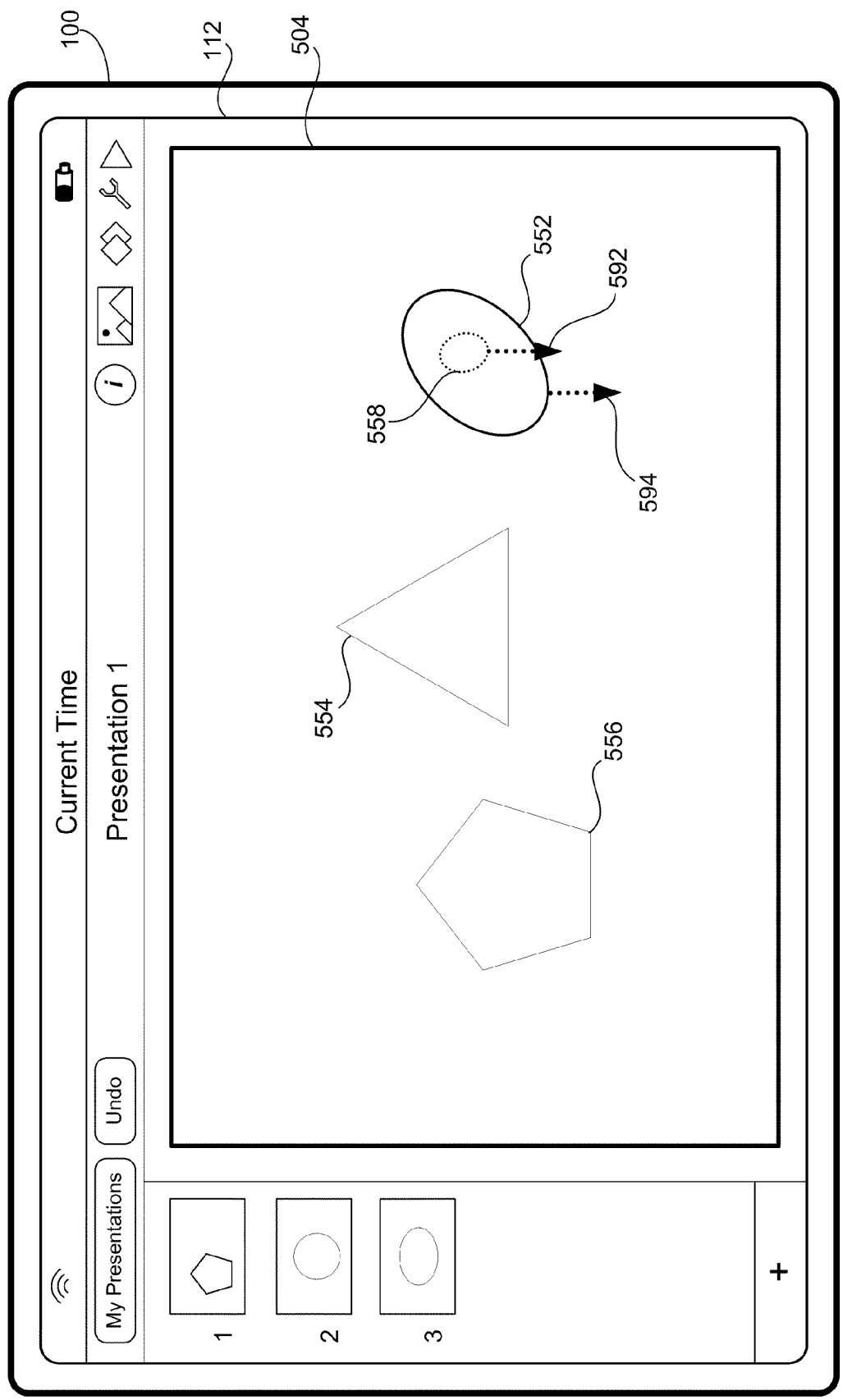

FIGS. 5A-5T illustrate exemplary user interfaces for selecting and moving objects in accordance with some embodiments. The user interfaces in these figures are used to illustrate the processes described below, including the processes in FIGS. 6A-6B, 7, 8, 9A-9C.

In FIGS. 5A-5T, some finger contact sizes and contact movement sizes, as well as some object movement sizes, may be exaggerated for illustrative purposes. No depiction in the figures bearing on finger contact movements should be taken as a requirement or limitation for the purpose of understanding sizes and scale associated with the methods and devices disclosed herein.

UI 500A (FIG. 5A) depicts an exemplary user interface for manipulating user interface objects on touch screen 112 of device 100. UI 500A may be a user interface for a drawing application, a presentation application, an image editing or manipulation application, or any other application where graphical or user interface objects may be manipulated. UI 500A includes a content area 502 and a canvas 504 within content area 502. Content area 502 is an area of the user interface where the content of interest is displayed. Canvas 504 within content area 502 represents the area to which content may be added and will be visible, as in a canvas for a painting. For example, in a presentation or drawing application, canvas 504 represents a page where the presentation or drawing, respectively, will appear and be visible. Canvas 504 and the contents within (e.g., user interface objects) may be zoomed in and out within content area 502.

One or more user interface objects may be placed on canvas 504. For example, in UI 500A, user interface object 506 is on canvas 504. Various manipulation operations may be performed on user interface object 506, including but not limited to resizing the object, entering text within the object, rotating the object, and moving the object within canvas 504, by performing, for example, one or more gestures on user interface object 506. FIG. 5A depicts a contact 508 that is detected as made and held at a location within the boundary of user interface object 506.

UI 500B (FIG. 5B) depicts a contact 508 that is detected within the boundary of user interface object 506. In some embodiments, a bounding box 510 is displayed in response to detection of contact 508, indicating that user interface object 506 has been selected for manipulation.

While contact 508 is detected without interruption, contact 508 may be moved in any direction on touch screen 112 to drag user interface object 506 in the direction of the movement. For example, if contact 508 moves 512 diagonally toward the top left corner, then user interface object 506 also moves 514 diagonally toward the top left corner.

UI 500C (FIG. 5C) depicts user interface object 506 being dragged downward. Contact 508 moves 516 downward along a substantially vertical path. In response to detection of the movement of contact 508, user interface object 506 moves 518 in substantially the same direction 516 as the contact 508; user interface object 506 is dragged downward by moving contact 508.

While user interface object 506 is being dragged by contact 508, a contact 520 (FIG. 5C) is detected in an empty area of canvas 504 (e.g., the lower left corner). UI 500D (FIG. 5D) depicts, in response to continuous detection of contact 520, constraint of movement 518 of user interface object 506, in response to movement 516 of contact 508, to movement along a vertical axis. Thus, contact 520 modifies the dragging/moving of user interface object 506. Movement 518 of user interface object 506 remains downward, without sideways movement, notwithstanding slight deviations of movement 516 of contact 508 from a downward straight line path. If movement 516 changes direction and goes upward instead, the movement of user interface object 506 also changes direction and goes upward as well, but the movement of user interface object 506 remains constrained along a vertical axis while contact 520 is detected.

In some embodiments, movement 518 is constrained to vertical movement when movement 518 is detected as primarily vertical (e.g., the vertical component of movement 518 has a larger magnitude than that of the horizontal component, or movement 518 is within a predefined range of angles from the vertical).

In some embodiments, as shown in FIG. 5D, in response to detection of contact 520, a callout 522 and/or a vertical guide line 524 is displayed to indicate to the user that movement of user interface object 506 by dragging is constrained to vertical movement. In UI 500D, callout 522 displays the word "vertical," indicating that movement 518 is constrained to vertical movement.

In some embodiments, while contact 520 continues to be detected, movement 518 of user interface object 506 may change direction and be constrained along a different axis. For example, UI 500E (FIG. 5E) depicts, while contact 520 continues to be detected, contact 508 moving 526 in a substantially horizontal direction. In response to detection of the movement 526 of contact 508, user interface object 506 moves 528 horizontally in substantially the same direction as movement 526; the movement of user interface object 506 is constrained to be along the horizontal. In some embodiments, to indicate the horizontal constraint, the word "horizontal" is displayed in callout 522 and/or a horizontal guide line 530 is displayed.

UI 500F (FIG. 5F) depicts, while contact 520 continues to be detected, contact 508 moving 532 diagonally, substantially at a 45-degree angle. In response to detection of the movement 532 of contact 508, user interface object 506 moves 534 at a 45-degree angle, in substantially the same direction as movement 532; the movement of user interface object 506 is constrained to be along a 45-degree diagonal. In some embodiments, to indicate the diagonal constraint, the word "diagonal" is displayed in callout 522 and/or a diagonal guide line 536 is displayed.

As described above, while the movement of user interface object 506 is constrained to be along one axis, the constraint axis may be changed by changing the direction of the movement (e.g., movement 516) of contact 508 that is dragging the user interface object 506. In some embodiments, the constraint axis changes if the magnitude of the movement of contact 508 in the new direction exceeds a predefined threshold. For example, in FIGS. 5D-5E, the constraint axis changes from a vertical axis (as depicted in FIG. 5D) to a horizontal axis (as depicted in FIG. 5E) if the magnitude of movement 526 in the horizontal direction exceeds a predefined amount (e.g., 50, 100, or 200 pixels). In some embodiments, the predefined amount of movement for effecting the change in constraint axis, as described above, is a function (e.g., a linear function) of the distance between the current position of user interface object 506 and the starting position of user interface object 506; the further user interface object 506 is from the starting position, the larger the amount that movement 526 needs to be in order to change the constraint axis. In some embodiments, the constraint axis changes if the magnitude of the component of the movement of contact 508 along the current constraint axis is exceeded by the magnitude of the component of the movement of contact 508 along a different constraint axis. The magnitudes in question may be measured for the entire duration when contact 508 is continuously detected or for a subset of that duration (e.g., for the most recent movement of contact 508), or for the entire distance moved by contact 508 or for a subset of that distance (e.g., for the most recent N pixels of movement of contact 508, where N is an integer, such as 50, 100, or 200).

In some embodiments, additional effects may be achieved by using more than one finger in the movement modifier contact (e.g., contact 520). UI 500G (FIG. 5G) depicts a contact 538 detected within the boundary of user interface object 506 and downward movement 540 of contact 538. A two-finger movement modifier contact 542 at the lower left corner of canvas 504 is detected. In response to detection of contact 542, movement 546 of user interface object 506 in response to movement 540 of contact 538 is constrained to vertical movement in 10 pixel increments, as indicated by callout 544 and vertical guide line 548. By using a second finger in contact 542 instead of just one finger, the additional effect of constraining the movement of the user interface object 506 to increments of a predefined number of pixels is applied along with the constraint of the movement along an axis.

UI 500H (FIG. 5H) depicts canvas 504 and three user interface objects 552, 554, and 556 on canvas 504. A contact 558 is detected within the boundary of user interface object 552. In UI 500I (FIG. 5I), movement 560 of contact 558 is detected. In response to movement 560 of contact 558, user interface object 552 moves 561 in substantially the same direction as contact 558; user interface object 552 is dragged by contact 558.

UI 500I also depicts a gesture 562 (e.g., a tap gesture) being detected within the boundary of user interface object 554 while contact 558 continues to be detected and is moving 560; user interface object 554 is being selected for grouping with user interface object 552. In response to detection of gesture 562, user interface objects 552 and 554 are grouped together for dragging. In some embodiments, selection of one or more additional user interface objects for grouping with user interface object 552 may be performed while user interface object 552 is being dragged (e.g., contact 558 is moving) or is stationary (but with contact 558 continuing to be detected).

UI 500J (FIG. 5J) depicts dragging of user interface objects 552 and 554 as a group. After adding user interface object 554 into the group, as depicted in FIG. 5I, movement 564 of contact 558, continuing from movement 560, is detected. In response to detection of movement 564, user interface objects 552 and 554 move 565 in substantially the same direction as movement 564.

Following from FIG. 5J, UI 500K (FIG. 5K) depicts an addition of a third user interface object into the group that includes user interface objects 552 and 554. A gesture 566 (e.g., a tap gesture) is detected within the boundary of user interface object 556 while movement 564 of contact 558 continues to be detected; user interface object 556 is being selected for grouping with user interface objects 552 and 554. In response to detection of gesture 566, user interface objects 552, 554, and 556 are grouped together for dragging.

UI 500L (FIG. 5L) depicts dragging of user interface objects 552, 554, and 556 as a group. After adding user interface object 556 into the group, as depicted in FIG. 5K, movement 568 of contact 558, continuing from movement 564, is detected. In response to detection of movement 568, user interface objects 552, 554, and 556 move 570 in substantially the same direction as movement 568.

Following from FIG. 5L, UI 500M (FIG. 5M) depicts removal of user interface object 556 from the group that also includes user interface objects 552 and 554. A gesture 572 (e.g., a tap gesture) is detected within the boundary of user interface object 556 while movement 568 of contact 558 continues to be detected; user interface object 556 is deselected from the group that also included user interface objects 552 and 554. In response to detection of contact 572, user interface objects 552 and 554 are no longer grouped together with user interface object 556 for dragging.

UI 500N (FIG. 5N) depicts dragging of user interface objects 552 and 554 after deselection of user interface object 556. After deselection user interface object 556 from the group, as depicted in FIG. 5M, movement 574 of contact 558, continuing from movement 568, is detected. In response to detection of movement 574, user interface objects 552, 554 move 576 in substantially the same direction as movement 574, but user interface object 556 does not.

Following from FIG. 5N, UI 500O (FIG. 5O) depicts removal of user interface object 554 from the group that also includes user interface object 552. A gesture 578 (e.g., a tap gesture) is detected within the boundary of user interface object 554 while movement 574 of contact 558 continues to be detected; user interface object 554 is deselected from the group that also included user interface object 552. In response to detection of contact 578, user interface object 552 is no longer grouped together with user interface object 554 for dragging.

UI 500P (FIG. 5P) depicts dragging of user interface object 552 after deselection of user interface object 554. After deselecting user interface object 554 from the group, as depicted in FIG. 5O, movement 580 of contact 558, continuing from movement 574, is detected. In response to detection of movement 580, user interface object 552 moves 582 in substantially the same direction as movement 580, but user interface object 554 does not.

It should be noted that the events depicted in FIGS. 5O-5P may follow from the events depicted in FIG. 5J as well (e.g., if gesture 566 did not occur, i.e., user interface object 556 was not selected).

In some embodiments, multiple user interface objects may be selected or deselected at once using a multi-finger gesture. For example, UI 500Q (FIG. 5Q) depicts addition of second and third user interface objects into the group that includes user interface object 552. A two-finger gesture 584 (e.g., a two-finger tap gesture) is detected while movement 580 of contact 558 continues to be detected, with a first finger 584-A of gesture 584 detected within the boundary of user interface object 554 and a second finger 584-B of gesture 584 detected within the boundary of user interface object 556; user interface objects 554 and 556 are selected for grouping with user interface object 552. In response to detection of gesture 584, user interface objects 552, 554, and 556 are grouped together for dragging.

UI 500R (FIG. 5R) depicts dragging of user interface objects 552, 554, and 556 as a group. After adding user interface objects 554, 556 into the group, as depicted in FIG. 5Q, movement 586 of contact 558, continuing from movement 580, is detected. In response to detection of movement 586, user interface objects 552, 554, and 556 move 588 in substantially the same direction as movement 586.

UI 500S (FIG. 5S) depicts removal of user interface objects 554, 556 from the group that also includes user interface object 552. A two-finger gesture 590 (e.g., a two-finger tap gesture) is detected while movement 586 of contact 558 continues to be detected, with a first finger 590-A of gesture 590 detected within the boundary of user interface object 554 and a second finger 590-B of gesture 590 detected within the boundary of user interface object 556; user interface objects 554 and 556 are deselected from the group that also includes user interface object 552. In response to detection of contact 590, user interface objects 554 and 556 are no longer grouped together with user interface object 552 for dragging.

UI 500T (FIG. 5T) depicts dragging of user interface object 552 after deselection of user interface objects 554 and 556. After deselecting user interface object 554, 556 from the group, as depicted in FIG. 5S, movement 592 of contact 558, continuing from movement 586, is detected. In response to detection of movement 592, user interface object 552 moves 594 in substantially the same direction as movement 592, but user interface objects 554 and 556 do not.

Figure 6A:
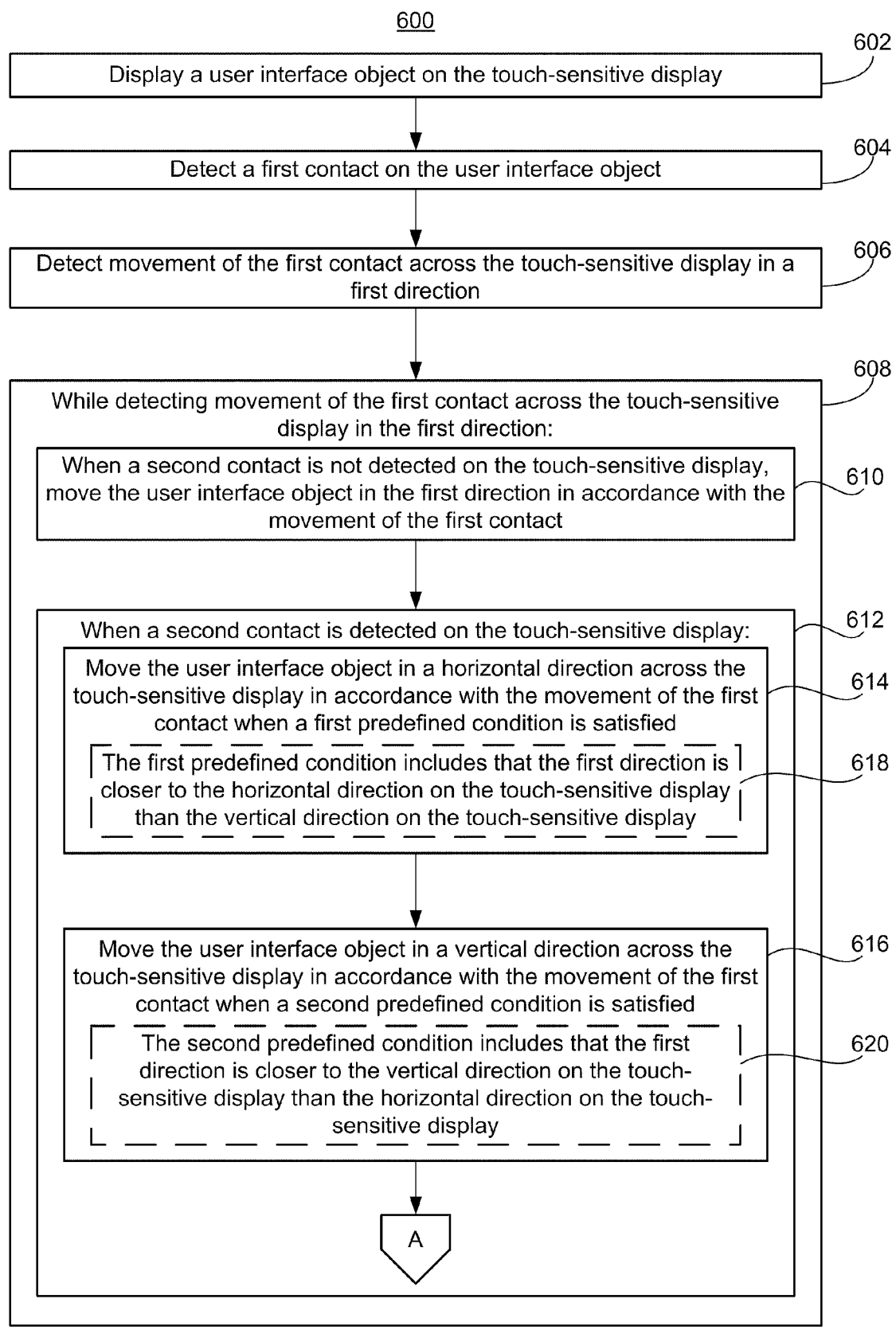
FIGS. 6A-6B are flow diagrams illustrating a method of object dragging in accordance with some embodiments.
Figure 6B:
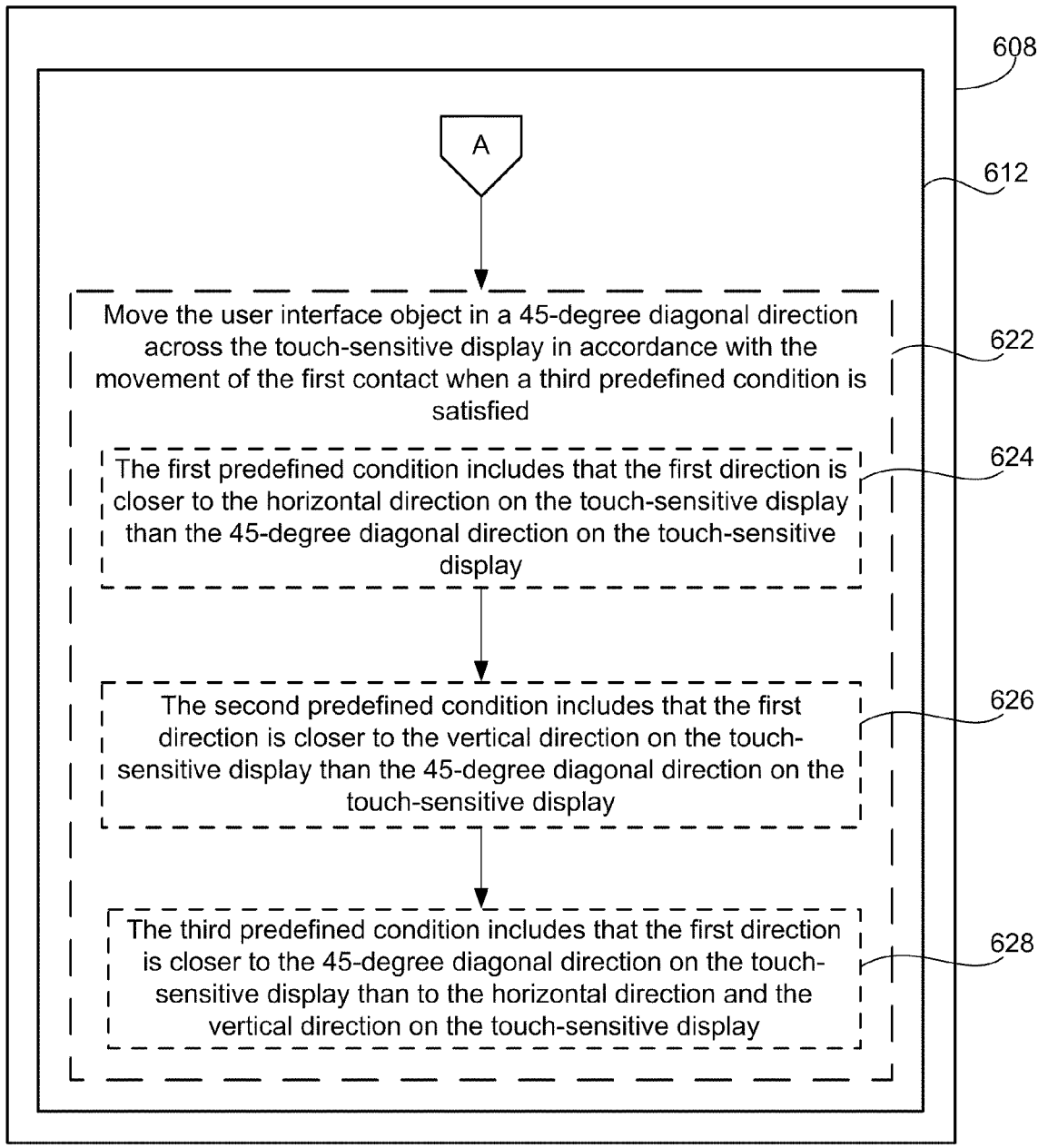

FIGS. 6A-6B are flow diagrams illustrating a method 600 of object dragging in accordance with some embodiments. The method 600 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to drag/move objects without using a keyboard. The method reduces the cognitive burden on a user when dragging objects, thereby creating a more efficient human-machine interface. For battery-operated computing devices, enabling a user to drag objects faster and more efficiently conserves power and increases the time between battery charges.

The device displays (602) a user interface object on the touch-sensitive display (e.g., a digital image, video, text, geometric object, or other object in a drawing application, presentation application, word processing application, spreadsheet application, website creation application, or other application). For example, in FIG. 5A, user interface object 506 is displayed on canvas 504 of a presentation application.

The device detects (604) a first contact (e.g., a finger contact) on the user interface object. For example, in FIG. 5B, contact 508 is detected on user interface object 506.

The device detects (606) movement of the first contact across the touch-sensitive display in a first direction. In some embodiments, the first direction is the average direction of movement of the first contact from the initial position of the first contact on the touch-sensitive surface to the current position of the first contact on the touch-sensitive surface. In some embodiments, the first direction is the instantaneous direction of movement of the first contact on the touch-sensitive surface. For example, in FIG. 5B, a movement (e.g., movement 512) of contact 508 is detected.

While detecting (608) movement of the first contact across the touch-sensitive display in the first direction, when a second contact is not detected on the touch-sensitive display, the device moves (610) the user interface object in the first direction in accordance with the movement of the first contact. For example, in FIG. 5B, while contact 508 is detected and another contact is not detected on touch screen 112, user interface object 506 moves 514 in the same direction as movement 512 of contact 508; user interface object 506 is effectively dragged by contact 508.

While detecting (608) movement of the first contact across the touch-sensitive display in the first direction, when a second contact is detected (612) on the touch-sensitive display, the device moves (614) the user interface object in a horizontal direction across the touch-sensitive display in accordance with the movement of the first contact when a first predefined condition is satisfied, and the device moves (616) the user interface object in a vertical direction across the touch-sensitive display in accordance with the movement of the first contact when a second predefined condition is satisfied. In other words, the object is constrained to move in a horizontal direction when the second contact is detected on the touch-sensitive display and the first predefined condition is met, and the object is constrained to move in a vertical direction when the second contact is detected on the touch-sensitive display and the second predefined condition is met.

As an example, in FIG. 5C, contact 520 and movement 516 of contact 508 are detected on touch screen 112. FIG. 5D depicts user interface object 506 moving 518 vertically following the direction of movement 516, with movement 516 having satisfied the second predefined condition (e.g., being a substantially vertical movement). In FIG. 5E, contact 520 and movement 526 of contact 508 are detected on touch screen 112. In response, user interface object 506 moves 528 horizontally following the direction of movement 526, with movement 526 having satisfied the second predefined condition (e.g., being a substantially horizontal movement).

In some embodiments, detecting the second contact anywhere on the touch-sensitive surface will result in constrained movement of the user interface object. In some embodiments, the second contact needs to be detected at a predefined location (e.g., an empty area of canvas 504) or on a predefined object (e.g., a movement modifier object displayed on touch screen 112) in order to constrain the movement of the user interface object.

In some embodiments, the first predefined condition includes (618) that the first direction is closer to the horizontal direction on the touch-sensitive display than the vertical direction on the touch-sensitive display. For example, in FIG. 5E, movement 526 is closer to the horizontal direction than the vertical direction. Thus, movement 526 satisfies the first condition and user interface object 506 moves 528 horizontally.

In some embodiments, the second predefined condition includes (620) that the first direction is closer to the vertical direction on the touch-sensitive display than the horizontal direction on the touch-sensitive display. For example, in FIG. 5D, movement 516 is closer to the vertical direction than the horizontal direction. Thus, movement 516 satisfies the second condition and user interface object 506 moves 518 vertically.

In some embodiments, whether the first direction is closer to the horizontal or vertical direction is determined by comparing the magnitude of the horizontal component of the movement to the magnitude of the vertical component of the movement, with the first direction being closer to whichever direction that has the larger component. In some other embodiments, whether the first direction is closer to the horizontal or vertical direction is determined by comparing the angle by which the first direction deviates from the horizontal and the angle by which the first direction deviates from the vertical, with the first direction being closer to whichever direction from which the angle of deviation is smaller.

In some embodiments, when the second contact is detected (612) on the touch-sensitive display, the device moves (622) the user interface object in a 45-degree diagonal direction across the touch-sensitive display in accordance with the movement of the first contact when a third predefined condition is satisfied. In other words, the object is constrained to move in a diagonal, 45-degree direction when the second contact is detected on the touch-sensitive display and the third predefined condition is met. For example, in FIG. 5F, contact 520 and movement 532 of contact 508 are detected on touch screen 112. In response, user interface object 506 moves 534 diagonally, at a 45-degree angle, following the direction of movement 532, with movement 532 having satisfied the third predefined condition (e.g., being a diagonal movement of approximately 45-degrees).

In some embodiments, the first predefined condition includes (624) the first direction is closer to the horizontal direction on the touch-sensitive display than the 45-degree diagonal direction on the touch-sensitive display. For example, in FIG. 5E, movement 526 is closer to the horizontal direction than the 45-degree diagonal direction. Thus, movement 526 satisfies the first condition and user interface object 506 moves 528 horizontally.

In some embodiments, the second predefined condition includes (626) that the first direction is closer to the vertical direction on the touch-sensitive display than the 45-degree diagonal direction on the touch-sensitive display. For example, in FIG. 5D, movement 516 is closer to the vertical direction than the 45-degree diagonal direction. Thus, movement 516 satisfies the second condition and user interface object 506 moves 518 vertically.

In some embodiments, the third predefined condition includes (628) that the first direction is closer to the 45-degree diagonal direction on the touch-sensitive display than to the horizontal direction and the vertical direction on the touch-sensitive display. For example, in FIG. 5F, movement 532 is closer to the 45-degree diagonal direction than to the horizontal direction and the vertical direction. Thus, movement 532 satisfies the third condition and user interface object 506 moves 534 in a 45-degree diagonal direction.

In some embodiments, whether the first direction is closer to the horizontal, vertical, or diagonal 45-degree direction is determined based on the angle of the first direction. If the direction is within a range of plus-minus 30-degrees from the horizontal, then the first direction is closer to the horizontal. If the direction is within a range of plus-minus 30-degrees from the vertical, then the first direction is closer to the vertical. If the direction is within a range of plus-minus 15-degrees from the 45-degree diagonal, then the first direction is closer to the 45-degree diagonal. In some other embodiments, whether the first direction is closer to the horizontal, vertical, or 45-degree diagonal direction is determined by comparing the magnitudes of the horizontal component, vertical component, and 45-degree diagonal component of the movement, with the first direction being closer to whichever direction that has the larger component.

It should be noted that the details of method 600 above (e.g., FIGS. 6A-6B) are also applicable in an analogous manner to the methods described below. For brevity, these details are not repeated below.

Figure 7:
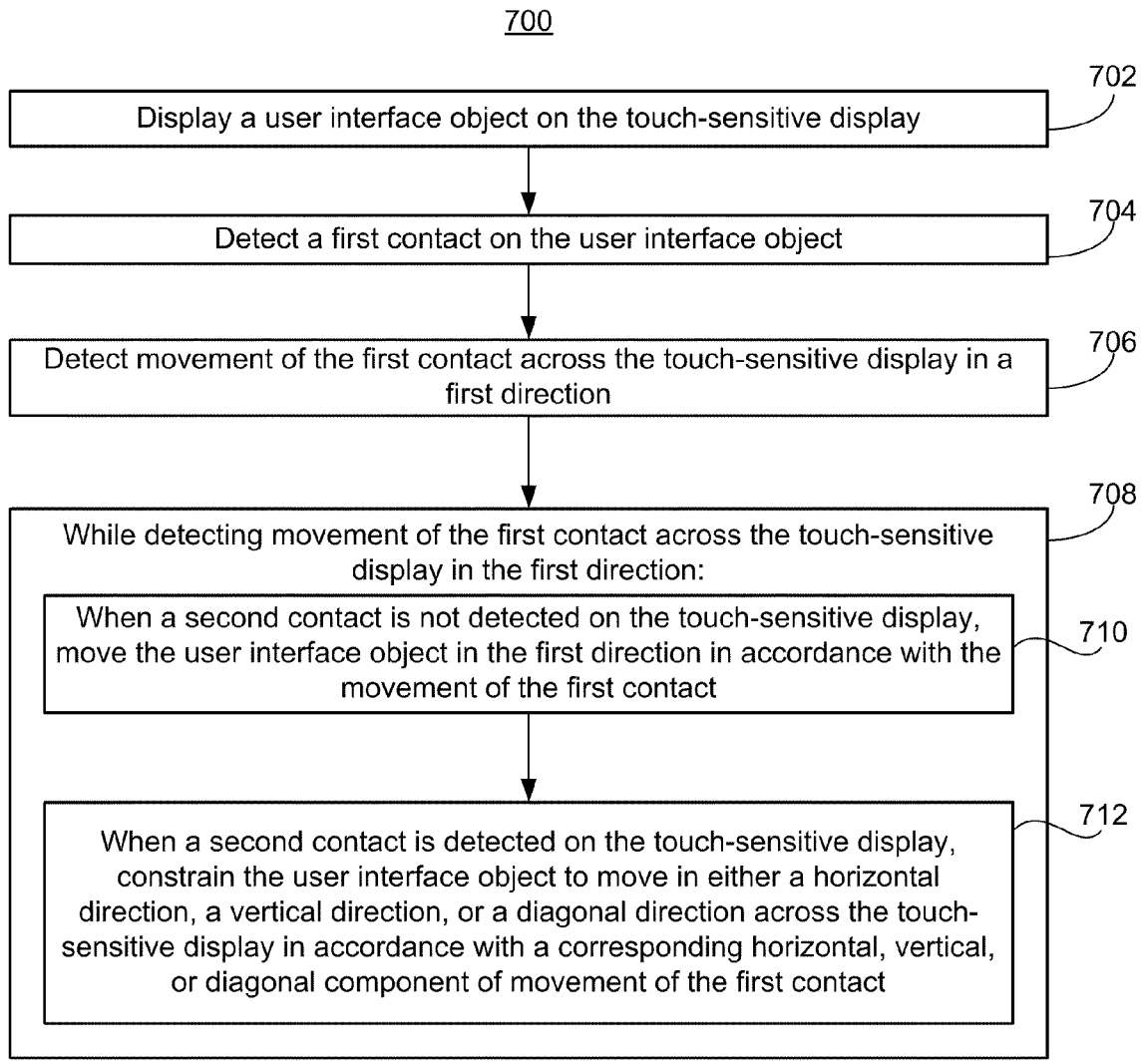
FIG. 7 is a flow diagram illustrating a method of object dragging in accordance with some embodiments.

FIG. 7 is a flow diagram illustrating a method 700 of object dragging in accordance with some embodiments. The method 700 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way drag/move objects without using a keyboard. The method reduces the cognitive burden on a user when dragging objects, thereby creating a more efficient human-machine interface. For battery-operated computing devices, enabling a user to drag objects faster and more efficiently conserves power and increases the time between battery charges.

The device displays (702) a user interface object on the touch-sensitive display (e.g., a digital image, video, text, geometric object, or other object in a drawing application, presentation application, word processing application, spreadsheet application, website creation application, or other application). For example, in FIG. 5A, user interface object 506 is displayed on canvas 504 of a presentation application.

The device detects (704) a first contact (e.g., a finger contact) on the user interface object. For example, in FIG. 5B, contact 508 is detected on user interface object 506.

The device detects (706) movement of the first contact across the touch-sensitive display in a first direction. In some embodiments, the first direction is the average direction of movement of the first contact from the initial position of the first contact on the touch-sensitive surface to the current position of the first contact on the touch-sensitive surface. In some embodiments, the first direction is the instantaneous direction of movement of the first contact on the touch-sensitive surface. For example, in FIG. 5B, a movement (e.g., movement 512) of contact 508 is detected.

While detecting (708) movement of the first contact across the touch-sensitive display in the first direction, when a second contact is not detected on the touch-sensitive display, the device moves (710) the user interface object in the first direction in accordance with the movement of the first contact. For example, in FIG. 5B, while contact 508 is detected and another contact is not detected on touch screen 112, user interface object 506 moves 514 in the same direction as movement 512 of contact 508; user interface object 506 is effectively dragged by contact 508.

While detecting (708) movement of the first contact across the touch-sensitive display in the first direction, when a second contact is detected on the touch-sensitive display, the device constrains (712) the user interface object to move in either a horizontal direction, a vertical direction, or a diagonal direction across the touch-sensitive display in accordance with a corresponding horizontal, vertical, or diagonal component of movement of the first contact. For example, in FIG. 5D, contact 520 and movement 516 of contact 508 are detected on touch screen 112. In response, user interface object 506 is constrained to move 518 vertically following the vertical component of movement 516. In FIG. 5E, contact 520 and movement 526 of contact 508 are detected on touch screen 112. In response, user interface object 506 is constrained to move 528 horizontally following the horizontal component of movement 526. In FIG. 5F, contact 520 and movement 532 of contact 508 are detected on touch screen 112. In response, user interface object 506 is constrained to move 534 diagonally, at a 45-degree angle, following the 45-degree diagonal component of movement 532.

Figure 8:
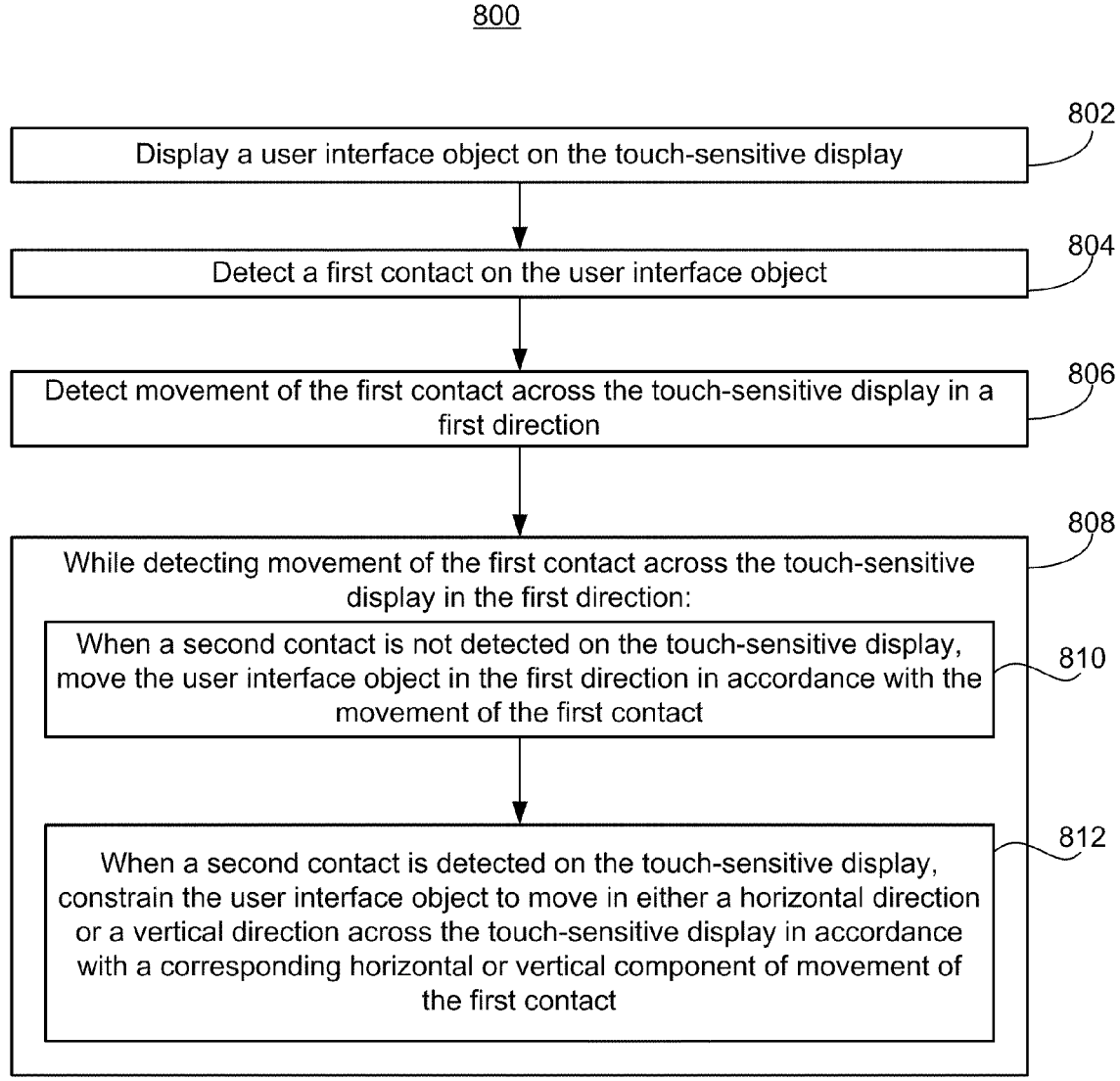
FIG. 8 is a flow diagram illustrating a method of object dragging in accordance with some embodiments.

FIG. 8 is a flow diagram illustrating a method 800 of object dragging in accordance with some embodiments. The method 800 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to drag/move objects without using a keyboard. The method reduces the cognitive burden on a user when dragging objects, thereby creating a more efficient human-machine interface. For battery-operated computing devices, enabling a user to drag objects faster and more efficiently conserves power and increases the time between battery charges.

The device displays (802) a user interface object on the touch-sensitive display (e.g., a digital image, video, text, geometric object, or other object in a drawing application, presentation application, word processing application, spreadsheet application, website creation application, or other application). For example, in FIG. 5A, user interface object 506 is displayed on canvas 504 of a presentation application.

The device detects (804) a first contact (e.g., a finger contact) on the user interface object. For example, in FIG. 5B, contact 508 is detected on user interface object 506.

The device detects (806) movement of the first contact across the touch-sensitive display in a first direction. In some embodiments, the first direction is the average direction of movement of the first contact from the initial position of the first contact on the touch-sensitive surface to the current position of the first contact on the touch-sensitive surface. In some embodiments, the first direction is the instantaneous direction of movement of the first contact on the touch-sensitive surface. For example, in FIG. 5B, a movement (e.g., movement 512) of contact 508 is detected.

While detecting (808) movement of the first contact across the touch-sensitive display in the first direction, when a second contact is not detected on the touch-sensitive display, the device moves (810) the user interface object in the first direction in accordance with the movement of the first contact. For example, in FIG. 5B, while contact 508 is detected and another contact is not detected on touch screen 112, user interface object 506 moves 514 in the same direction as movement 512 of contact 508; user interface object 506 is effectively dragged by contact 508.

While detecting (808) movement of the first contact across the touch-sensitive display in the first direction, when a second contact is detected on the touch-sensitive display, the device constrains (812) the user interface object to move in either a horizontal direction or a vertical direction across the touch-sensitive display in accordance with a corresponding horizontal or vertical component of movement of the first contact. For example, in FIG. 5D, contact 520 and movement 516 of contact 508 are detected on touch screen 112. In response, user interface object 506 is constrained to move 518 vertically following the vertical component of movement 516. In FIG. 5E, contact 520 and movement 526 of contact 508 are detected on touch screen 112. In response, user interface object 506 is constrained to move 528 horizontally following the horizontal component of movement 526.

Figure 9A:
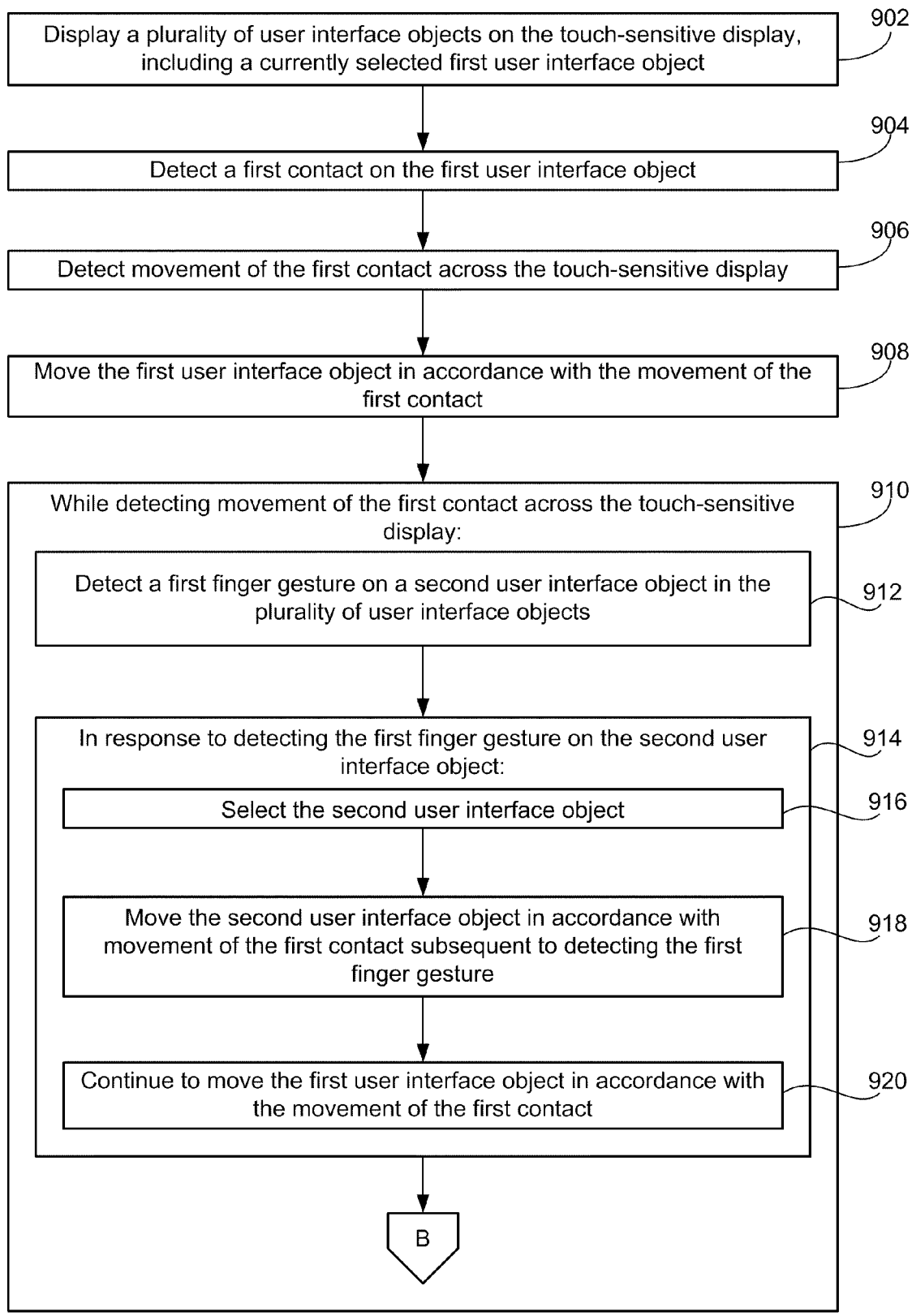
FIGS. 9A-9C are flow diagrams illustrating a method of selecting and moving a second object while moving a first object in accordance with some embodiments.
Figure 9B:
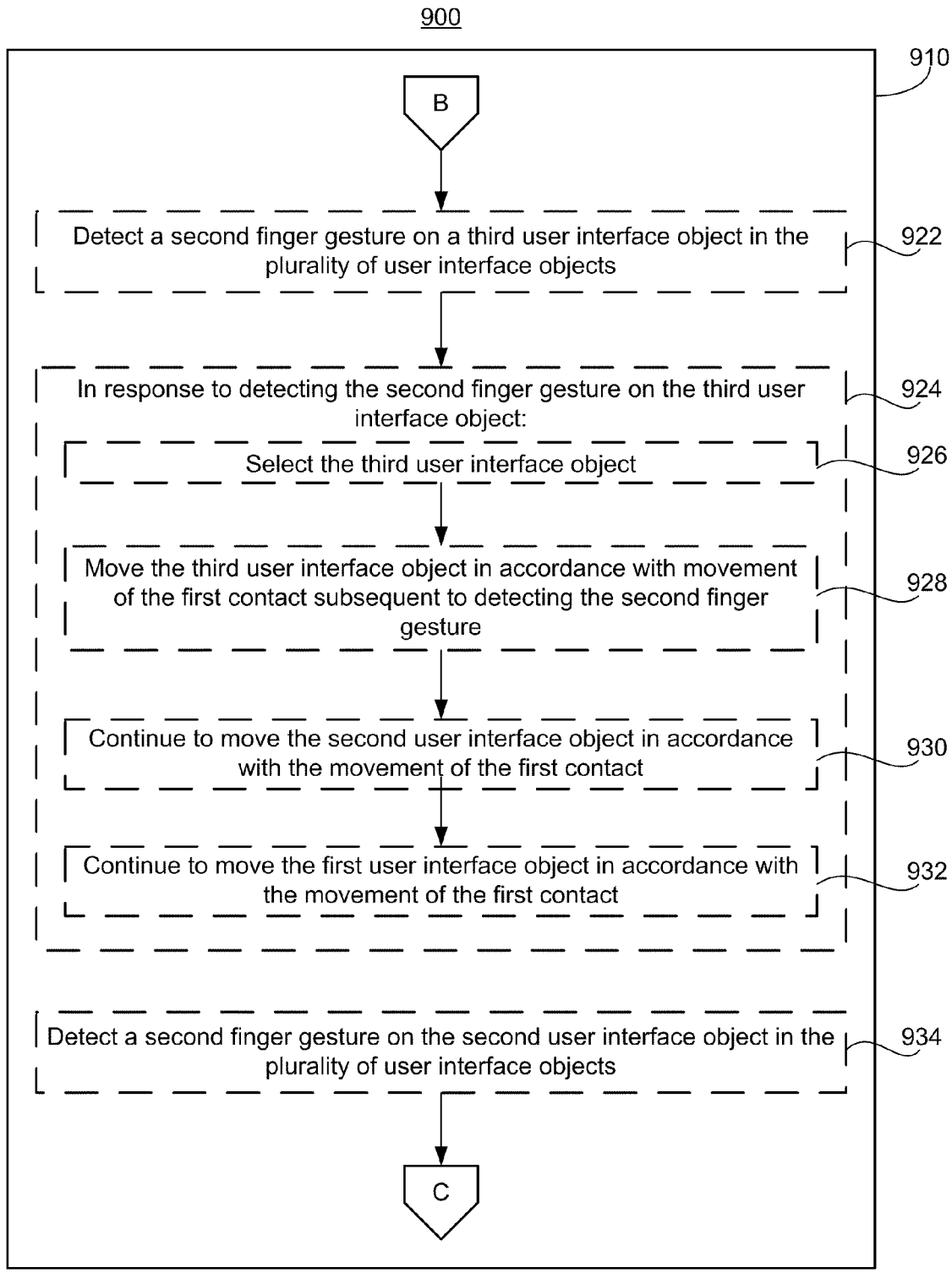
Figure 9C:
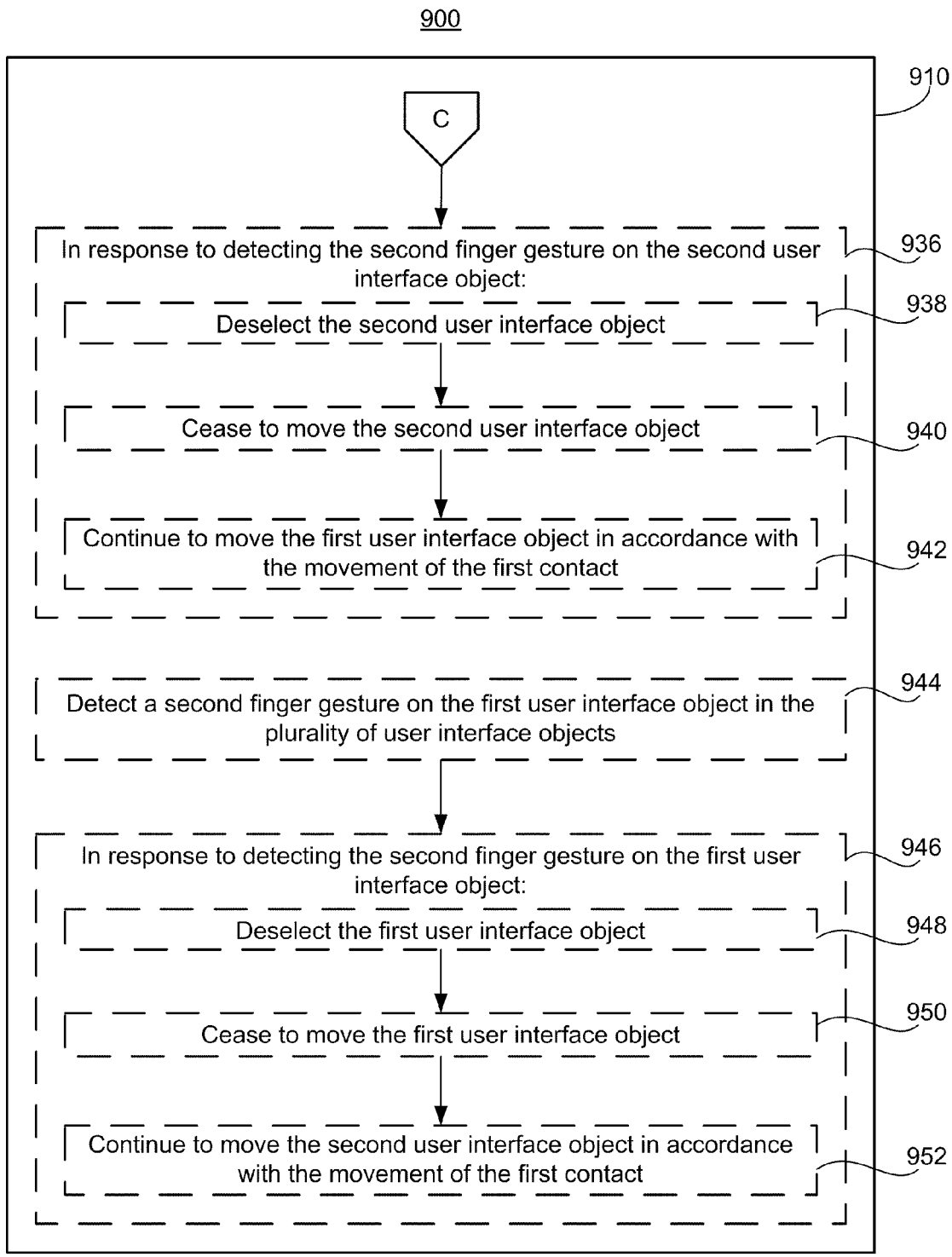

FIGS. 9A-9C are flow diagrams illustrating a method 900 of selecting and moving a second object while moving a first object in accordance with some embodiments. The method 900 is performed at a computing device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to select and move additional objects while moving a first object. The method reduces the cognitive burden on a user when selecting and moving objects, thereby creating a more efficient human-machine interface. For battery-operated computing devices, enabling a user to select and move objects faster and more efficiently conserves power and increases the time between battery charges.

The device displays (902) a plurality of user interface objects on the touch-sensitive display, including a currently selected first user interface object (e.g., a digital image, video, text, geometric object, or other object in a drawing application, presentation application, word processing application, spreadsheet application, website creation application, or other application). For example, in FIGS. 5H-5I, user interface objects 552, 554, and 556 are displayed on canvas 504 of a presentation application. In response to detection of contact 558 on user interface object 552, user interface object 552 is selected.

The device detects (904) a first contact (e.g., a finger contact) on the first user interface object. For example, in FIG. 5I, contact 558 is detected on user interface object 552.

The device detects (906) movement of the first contact across the touch-sensitive display. For example, in FIG. 5I, movement 560 of contact 558 is detected.

The device moves (908) the first user interface object in accordance with the movement of the first contact. For example, in FIG. 5I, in response to detection of movement 560 of contact 558, user interface object 552 moves 561 in the same direction as movement 560; user interface object 552 is effectively dragged by contact 558.

While detecting (910) movement of the first contact across the touch-sensitive display, the device detects (912) a first finger gesture (e.g., a tap gesture) on a second user interface object in the plurality of user interface objects. For example, in FIG. 5I, while movement 560 of contact 558 is detected, gesture 562 is detected on user interface object 554.

In response to detecting (914) the first finger gesture on the second user interface object, the device selects (916) the second user interface object, moves (918) the second user interface object in accordance with movement of the first contact subsequent to detecting the first finger gesture, and continues (920) to move the first user interface object in accordance with the movement of the first contact. For example, in FIG. 5J, in response to detection of gesture 562 (FIG. 5I), user interface object 554 is selected (e.g., for grouping with user interface object 552 for moving). User interface object 554 moves 565 in the same direction as movement 564 (continuing from movement 560) of contact 558 after detection of gesture 562. User interface object 552 continues to move 565 in the same direction as movement 564 of contact 558.

In some embodiments, while detecting (910) movement of the first contact across the touch-sensitive display, the device detects (922) a second finger gesture (e.g., a tap gesture) on a third user interface object in the plurality of user interface objects. For example, in FIG. 5K, while movement 564 of contact 558 is detected, gesture 566 is detected on user interface object 556.

In response to detecting (924) the second finger gesture on the third user interface object, the device selects (926) the third user interface object, moves (928) the third user interface object in accordance with movement of the first contact subsequent to detecting the second finger gesture, continues (930) to move the second user interface object in accordance with the movement of the first contact, and continues (932) to move the first user interface object in accordance with the movement of the first contact. For example, in FIG. 5L, in response to detection of gesture 566 (FIG. 5K), user interface object 556 is selected (e.g., for grouping with user interface objects 552 and 554 for moving). User interface object 556 moves 570 in the same direction as movement 568 (continuing from movement 564) of contact 558 after detection of gesture 566. User interface objects 552, 554 continue to move 570 in the same direction as movement 568 of contact 558.

In some embodiments, while detecting (910) movement of the first contact across the touch-sensitive display, the device detects (934) a second finger gesture (e.g., a tap gesture) on the second user interface object in the plurality of user interface objects. For example, in FIG. 5O, while movement 574 (which may be a continuation of movement 564) of contact 558 is detected, gesture 578 is detected on user interface object 554.

In response to detecting (936) the second finger gesture on the second user interface object, the device deselects (938) the second user interface object, ceases to move (940) the second user interface object, and continues to move (942) the first user interface object in accordance with the movement of the first contact. For example, in FIG. 5P, in response to detection of gesture 578, user interface object 554 is deselected (e.g., no longer grouped with user interface object 552 for moving). User interface object 554 does not move in response to detection of movement 580 (continuing from movement 574) of contact 558 after detection of gesture 578. User interface object 552 continues to move 582 in the same direction as movement 580 of contact 558.

In some embodiments, while detecting (910) movement of the first contact across the touch-sensitive display, the device detects (944) a second finger gesture (e.g., a tap gesture) on the first user interface object in the plurality of user interface objects. In response to detecting (946) the second finger gesture on the first user interface object, the device deselects (948) the first user interface object, ceases to move (950) the first user interface object, and continues to move (952) the second user interface object in accordance with the movement of the first contact. For example, if, in FIGS. 5O-5P, while movement 574 (which may be a continuation of movement 564) of contact 558 is detected, gesture 578 is detected on user interface object 552 instead of user interface object 554, then in response to detection of gesture 578, user interface object 552 is deselected (e.g., no longer grouped with user interface object 554 for moving). User interface object 552 does not move in response to detection of movement 580 (continuing from movement 574) of contact 558 after detection of gesture 578, and user interface object 554 continues to move 582 in the same direction as movement 580 of contact 558.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The operations described above with reference to FIGS. 6A-6B, 7, 8, 9A-9C may be implemented by components depicted in FIGS. 1A-1C. For example, detection operations 604, 606 and moving operations 610, 614, 616 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 180 associated with the detection of the event or sub-event. Event handler 180 may utilize or call data updater 176 or object updater 177 to update the application internal state 192. In some embodiments, event handler 180 accesses a respective GUI updater 178 to update what is displayed by the application. Similarly, it would be clear to a person having ordinary skill in the art how other processes may be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
    a touch-sensitive display;
    one or more processors;
    memory; and
    one or more programs, wherein the one or more programs are stored in the memory and configured to be executed by the one or more processors, the one or more programs including instructions for:
        displaying a plurality of user interface objects on the touch-sensitive display, including a currently selected first user interface object;
        detecting a first contact on the first user interface object;
        detecting movement of the first contact across the touch-sensitive display;
        moving the first user interface object in accordance with the movement of the first contact;
        while detecting movement of the first contact across the touch-sensitive display:
            detecting a first finger gesture on a second user interface object in the plurality of user interface objects, the first finger gesture being made with a second contact distinct from the first contact;
            detecting liftoff of the second contact; and,
            in response to detecting the first finger gesture on the second user interface object:
                selecting the second user interface object;
                moving the second user interface object in accordance with movement of the first contact subsequent to detecting the first finger gesture such that the second user interface object follows the movement of the first contact subsequent to detecting the first finger gesture and the movement of the first contact causes the movement of the second user interface object; and
                continuing to move the first user interface object in accordance with the movement of the first contact, wherein the first user interface object and the second user interface object move as a group.

2. The device of claim 1, including instructions for:
    while detecting movement of the first contact across the touch-sensitive display:
        detecting a second finger gesture on a third user interface object in the plurality of user interface objects, the second finger gesture being made with a third contact distinct from the first contact;
        detecting liftoff of the second contact; and,
        in response to detecting the second finger gesture on the third user interface object:
            selecting the third user interface object;
            moving the third user interface object in accordance with movement of the first contact subsequent to detecting the second finger gesture such that the third user interface object follows the movement of the first contact subsequent to detecting the second finger gesture and the movement of the first contact causes the movement of the third user interface object;
            continuing to move the second user interface object in accordance with the movement of the first contact; and
            continuing to move the first user interface object in accordance with the movement of the first contact, wherein the first user interface object, the second user interface object, and the third user interface object move as a group.

3. The device of claim 1, including instructions for:
    while detecting movement of the first contact across the touch-sensitive display:
        detecting a second finger gesture on the second user interface object in the plurality of user interface objects; and,
        in response to detecting the second finger gesture on the second user interface object:
            deselecting the second user interface object;
            ceasing to move the second user interface object; and
            continuing to move the first user interface object in accordance with the movement of the first contact.

4. The device of claim 1, including instructions for:
    while detecting movement of the first contact across the touch-sensitive display:
        detecting a second finger gesture on the first user interface object in the plurality of user interface objects; and,
        in response to detecting the second finger gesture on the first user interface object:

deselecting the first user interface object;
ceasing to move the first user interface object; and
continuing to move the second user interface object in accordance with the movement of the first contact.

5. The device of claim 1, wherein the first finger gesture is a tap gesture.

6. A method, comprising:
at a computing device with a touch-sensitive display:
displaying a plurality of user interface objects on the touch-sensitive display, including a currently selected first user interface object;
detecting a first contact on the first user interface object;
detecting movement of the first contact across the touch-sensitive display;
moving the first user interface object in accordance with the movement of the first contact;
while detecting movement of the first contact across the touch-sensitive display:
detecting a first finger gesture on a second user interface object in the plurality of user interface objects, the first finger gesture being made with a second contact distinct from the first contact;
detecting liftoff of the second contact; and,
in response to detecting the first finger gesture on the second user interface object:
selecting the second user interface object;
moving the second user interface object in accordance with movement of the first contact subsequent to detecting the first finger gesture such that the second user interface object follows the movement of the first contact subsequent to detecting the first finger gesture and the movement of the first contact causes the movement of the second user interface object; and
continuing to move the first user interface object in accordance with the movement of the first contact, wherein the first user interface object and the second user interface object move as a group.

7. The method of claim 6, including:
while detecting movement of the first contact across the touch-sensitive display:
detecting a second finger gesture on a third user interface object in the plurality of user interface objects, the second finger gesture being made with a third contact distinct from the first contact;
detecting liftoff of the second contact; and,
in response to detecting the second finger gesture on the third user interface object:
selecting the third user interface object;
moving the third user interface object in accordance with movement of the first contact subsequent to detecting the second finger gesture such that the third user interface object follows the movement of the first contact subsequent to detecting the second finger gesture and the movement of the first contact causes the movement of the third user interface object;
continuing to move the second user interface object in accordance with the movement of the first contact; and
continuing to move the first user interface object in accordance with the movement of the first contact, wherein the first user interface object, the second user interface object, and the third user interface object move as a group.

8. The method of claim 6, including:
while detecting movement of the first contact across the touch-sensitive display:
detecting a second finger gesture on the second user interface object in the plurality of user interface objects; and,
in response to detecting the second finger gesture on the second user interface object:
deselecting the second user interface object;
ceasing to move the second user interface object; and
continuing to move the first user interface object in accordance with the movement of the first contact.

9. The method of claim 6, including:
while detecting movement of the first contact across the touch-sensitive display:
detecting a second finger gesture on the first user interface object in the plurality of user interface objects; and,
in response to detecting the second finger gesture on the first user interface object:
deselecting the first user interface object;
ceasing to move the first user interface object; and
continuing to move the second user interface object in accordance with the movement of the first contact.

10. The method of claim 6, wherein the first finger gesture is a tap gesture.

11. A non-transitory computer readable storage medium storing one or more programs, the one or more programs comprising instructions, which when executed by a computing device with a touch-sensitive display, cause the device to:
display a plurality of user interface objects on the touch-sensitive display, including a currently selected first user interface object;
detect a first contact on the first user interface object;
detect movement of the first contact across the touch-sensitive display;
move the first user interface object in accordance with the movement of the first contact;
while detecting movement of the first contact across the touch-sensitive display:
detect a first finger gesture on a second user interface object in the plurality of user interface objects, the first finger gesture being made with a second contact distinct from the first contact;
detecting liftoff of the second contact; and,
in response to detecting the first finger gesture on the second user interface object:
select the second user interface object;
move the second user interface object in accordance with movement of the first contact subsequent to detecting the first finger gesture such that the second user interface object follows the movement of the first contact subsequent to detecting the first finger gesture and the movement of the first contact causes the movement of the second user interface object; and
continue to move the first user interface object in accordance with the movement of the first contact, wherein the first user interface object and the second user interface object move as a group.

12. The computer readable storage medium of claim 11, including instructions that cause the device to:
while detecting movement of the first contact across the touch-sensitive display:
detect a second finger gesture on a third user interface object in the plurality of user interface objects, the second finger gesture being made with a third contact distinct from the first contact;

detecting liftoff of the second contact; and, in response to detecting the second finger gesture on the third user interface object:

select the third user interface object;

move the third user interface object in accordance with movement of the first contact subsequent to detecting the second finger gesture such that the third user interface object follows the movement of the first contact subsequent to detecting the second finger gesture and the movement of the first contact causes the movement of the third user interface object;

continue to move the second user interface object in accordance with the movement of the first contact; and continue to move the first user interface object in accordance with the movement of the first contact, wherein the first user interface object, the second user interface object, and the third user interface object move as a group.

13. The computer readable storage medium of claim 11, including instructions that cause the device to:

while detecting movement of the first contact across the touch-sensitive display:

detect a second finger gesture on the second user interface object in the plurality of user interface objects; and, in response to detecting the second finger gesture on the second user interface object:

deselect the second user interface object;

cease to move the second user interface object; and continue to move the first user interface object in accordance with the movement of the first contact.

14. The computer readable storage medium of claim 11, including instructions that cause the device to:

while detecting movement of the first contact across the touch-sensitive display:

detect a second finger gesture on the first user interface object in the plurality of user interface objects; and, in response to detecting the second finger gesture on the first user interface object:

deselect the first user interface object;

cease to move the first user interface object; and continue to move the second user interface object in accordance with the movement of the first contact.

15. The computer readable storage medium of claim 11, wherein the first finger gesture is a tap gesture.

* * * * *